(12) United States Patent
Xu et al.

(10) Patent No.: US 11,483,775 B2
(45) Date of Patent: Oct. 25, 2022

(54) ENHANCEMENT BY AGGRESSOR VICTIM RELATION

(71) Applicant: Qualcomm Incorporated, San Diego, CA (US)

(72) Inventors: Huilin Xu, San Diego, CA (US); Seyedkianoush Hosseini, San Diego, CA (US); Yuwei Ren, Beijing (CN); Alexandros Manolakos, Escondido, CA (US); Yiqing Cao, Beijing (CN); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/269,337

(22) PCT Filed: Sep. 26, 2019

(86) PCT No.: PCT/CN2019/108135
§ 371 (c)(1),
(2) Date: Feb. 18, 2021

(87) PCT Pub. No.: WO2020/063741
PCT Pub. Date: Apr. 2, 2020

(65) Prior Publication Data
US 2021/0410081 A1    Dec. 30, 2021

(30) Foreign Application Priority Data

Sep. 28, 2018  (WO) ................ PCT/CN2018/108322

(51) Int. Cl.
*H04W 52/14*  (2009.01)
*H04W 52/24*  (2009.01)
(Continued)

(52) U.S. Cl.
CPC ....... *H04W 52/243* (2013.01); *H04J 11/0056* (2013.01); *H04L 5/1469* (2013.01); *H04W 24/02* (2013.01); *H04W 52/143* (2013.01)

(58) Field of Classification Search
CPC . H04W 52/243; H04W 24/02; H04W 52/143; H04L 5/1469; H04J 11/0056
(Continued)

(56) References Cited

U.S. PATENT DOCUMENTS 9,226,173 B2    12/2015   Sadek et al.
2013/0094387 A1  4/2013   Susitaival et al.
2016/0014791 A1  1/2016   Liu et al.

FOREIGN PATENT DOCUMENTS

CN    103068050 A    4/2013
CN    103563477 A    2/2014
(Continued)

OTHER PUBLICATIONS

International Search Report and Written Opinion—PCT/CN2018/108322—ISA/EPO—dated Jul. 1, 2019.
(Continued)

*Primary Examiner* — Gbemileke J Onamuti
(74) *Attorney, Agent, or Firm* — Holland & Hart LLP

(57) ABSTRACT

Methods, systems, and devices for wireless communications are described. Generally, the described techniques provide for managing remote interference using a previously detected relationship between an aggressor base station and a victim base station. The described techniques provide for allocating reference signal sequences for various victim base stations to send to an aggressor base station. The victim base station may trigger the aggressor base station to perform reference signal monitoring based on the previously detected victim-aggressor relationship, and may transmit a reference signal carrying a unique identifier based on the triggering. The first base station may send a request that the second base station to transmit a reference signal for enabling the first base station to measure interference of a wireless channel, and performing interference mitigation techniques at the first
(Continued)

base station, the second base station, or both, to mitigate the remote interference.

30 Claims, 30 Drawing Sheets

(51) Int. Cl.
  *H04W 24/02* (2009.01)
  *H04L 5/14* (2006.01)
  *H04J 11/00* (2006.01)
(58) Field of Classification Search
  USPC .......................................................... 370/311
  See application file for complete search history.

(56) References Cited

FOREIGN PATENT DOCUMENTS

| | | | | |
|---|---|---|---|---|
| CN | 104247540 A | 12/2014 | | |
| CN | 105309032 A | 2/2016 | | |
| CN | 106716889 A | 5/2017 | | |
| EP | 2923510 A1 | 9/2015 | | |
| WO | WO-2013158934 | 10/2013 | | |
| WO | WO-2013178037 A1 | 12/2013 | | |
| WO | WO-2016040604 A1 * | 3/2016 | ........... | G05B 13/027 |
| WO | WO-2016048214 A1 * | 3/2016 | .......... | H04J 11/0056 |

OTHER PUBLICATIONS

International Search Report and Written Opinion—PCT/CN2019/108135—ISA/EPO—dated Jan. 2, 2020.

3GPP TR 38.866: "3rd Generation Partnership Project; Technical Specification Group Radio Access Network; Study on Remote Interference Management for NR (Release 16)", v0.0.0 (Aug. 2018), 3GPP Draft, R1-1809872, 3rd Generation Partnership Project (3GPP), Mobile Competence Centre, 650, Route Des Lucioles, F-06921, Sophia-Antipolis Cedex, France, Aug. 23, 2018 (Aug. 23, 2018), XP051517227, pp. 1-10, Retrieved from the Internet: URL: http://www.3gpp.org/ftp/tsg%5Fran/WG1%5FRL1/TSGR1%5F94/Docs/R1%2D1809872%2Ezip [retrieved on Aug. 23, 2018] sections 4.1,6.2, figures 6-1.
Catt: "Discussion on Identification of Strong gNB Interferers", 3GPP Draft, R1-1808409, 3GPP TSG RAN WG1 Meeting #94, 3rd Generation Partnership Project (3GPP), Mobile Competence Centre, 650, Route Des Lucioles, F-06921, Sophia-Antipolis Cedex, France, vol. RAN WG1, no. Gothenburg, Sweden, Aug. 20, 2018-Aug. 24, 2018, Aug. 11, 2018 (Aug. 11, 2018), XP051515791, 4 Pages, Retrieved from the Internet: URL: http://www.3gpp.org/ftp/tsg%5Fran/WG1%5FRL1/TSGR1%5F94/Docs/R1%2D1808409%2Ezip [retrieved on Aug. 11, 2018] pp. 4-5.
Supplementary European Search Report—EP19864108—Search Authority—Munich—dated May 13, 2022.
ZTE: "Consideration on RIM Framework and Mechanisms for Improving Network Robustness", 3GPP Draft, R1-1808325, 3GPP TSG-RAN WG1 Meeting #94, Consideration on RIM Framework and Mechanisms for Improving Network Robustness_Final, 3rd Generation Partnership Project (3GPP), Mobile Competence Centre, 650, Route Des Lucioles, F-06921, Sophia-Antipolis Cedex, France, vol. RAN WG1, no. Gothenburg, Sweden, Aug. 20, 2018-Aug. 24, 2018, Aug. 11, 2018 (Aug. 11, 2018), XP051515708, pp. 1-7, Retrieved from the Internet: URL: http://www.3gpp.org/ftp%5Fran/WGI%5FRLI/TSGRI%5F94/Docs/R1%2DI808325%2Ezip [retrieved on Aug. 11, 2018] pp. 4-5, Section 4.

* cited by examiner

ENHANCEMENT BY AGGRESSOR VICTIM RELATION

CROSS REFERENCE TO RELATED APPLICATIONS

The present Application is a 371 national phase filing of International Patent Application No. PCT/CN2019/108135 by XU et al., entitled "ENHANCEMENT BY AGGRESSOR VICTIM RELATION," filed Sep. 26, 2019; and to International Patent Application No. PCT/CN2018/108322 by XU et al., entitled "ENHANCEMENT BY AGGRESSOR VICTIM RELATION," filed Sep. 28, 2018, each of which is assigned to the assignee hereof and each of which is hereby incorporated by reference in its entirety.

BACKGROUND

The following relates generally to wireless communications, and more specifically to enhancement by aggressor victim relation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some wireless communications systems, multiple base stations may communicate with UEs in respective coverage areas. In such systems, communications between one base station and one set of UEs in a first coverage area may interfere with communications between another base station and another set of UEs in a second coverage area. Such interference occurring over a larger distance may be referred to as remote interference. Conventional techniques for managing remote interference may be deficient.

SUMMARY

The described techniques relate to improved methods, systems, devices, and apparatuses that support interference mitigation for remote interference management. Generally, the described techniques provide for managing remote interference using a previously detected relationship between an aggressor base station and a victim base station. In some examples, a first, victim, base station operating in a time division duplex (TDD) system may identify that downlink transmissions from a remote, aggressor, base station are causing interference to reception of uplink transmissions from at least one UE served by the victim base station. The victim base station may send a reference signal, including a unique identifier corresponding to the victim base station, which may be used to trigger the aggressor base station to perform remote interference mitigation (RIM).

In some cases, the aggressor may not know that it is causing remote interference, may not be monitoring for a reference signal from the victim base station, or may not expend the overhead to monitor for all potential victim base stations. So, the victim base station may trigger the aggressor base station to perform reference signal monitoring based on the previously detected victim-aggressor relationship, and may transmit a reference signal carrying an identifier of the victim based on the triggering. The aggressor base station may monitor for and receive the reference signal, identify the victim base station, and may perform RIM based on reference signal. The described techniques further provide for requesting the second base station to transmit a reference signal for enabling the first base station to measure interference of a wireless channel, and performing interference mitigation techniques at the first base station, the second base station, or both, to mitigate the remote interference.

A method of wireless communication by a first base station operating in a TDD system is described. The method may include identifying that downlink transmissions from at least one other base station are causing interference to reception of uplink transmissions from a first UE served by the first base station, and transmitting a first reference signal transmission based on at least one remote base station being triggered to perform reference signal monitoring due to a previously detected victim-aggressor relationship between the first base station and the at least one remote base station.

An apparatus for wireless communication by a first base station operating in a TDD system is described. The apparatus may include a processor, memory in electronic communication with the processor, and instructions stored in the memory. The instructions may be executable by the processor to cause the apparatus to identify that downlink transmissions from at least one other base station are causing interference to reception of uplink transmissions from a first UE served by the first base station, and transmit a first reference signal transmission based on at least one remote base station being triggered to perform reference signal monitoring due to a previously detected victim-aggressor relationship between the first base station and the at least one remote base station.

Another apparatus for wireless communication by a first base station operating in a TDD system is described. The apparatus may include means for identifying that downlink transmissions are causing interference to reception of uplink transmissions from a first UE served by the first base station, and transmitting a first reference signal transmission based on at least one remote base station being triggered to perform reference signal monitoring due to a previously detected victim-aggressor relationship between the first base station and the at least one remote base station.

A non-transitory computer-readable medium storing code for wireless communication by a first base station operating in a TDD system is described. The code may include instructions executable by a processor to identify that downlink transmissions from at least one other base station are causing interference to reception of uplink transmissions from a first UE served by the first base station, and transmit a first reference signal transmission based on at least one remote base station being triggered to perform reference signal monitoring due to a previously detected victim-aggressor relationship between the first base station and the at least one remote base station.

In some examples of the method, apparatuses, and non-transitory computer-readable medium described herein, triggering the at least one remote base station to perform reference signal monitoring further may include operations, features, means, or instructions for retrieving, from a database, an indication of the previously detected victim-aggressor relationship and transmitting, via wireless channel or a backhaul link, a request to the at least one remote base station based on an indication.

In some examples of the method, apparatuses, and non-transitory computer-readable medium described herein, triggering the at least one remote base station to perform reference signal monitoring further may include operations, features, means, or instructions for transmitting, via a backhaul link, a request to a network controller for identifying the at least one remote base station based on the previously detected victim-aggressor relationship and for instructing the at least one remote base station to perform reference signal monitoring.

Some examples of the method, apparatuses, and non-transitory computer-readable medium described herein may further include operations, features, means, or instructions for receiving, from the at least one remote base station, a relationship update indicating information related to the previously detected victim-aggressor relationship and updating a database record of the previously detected victim-aggressor relationship in a local database, a network controller database, or both, based on the relationship update.

In some examples of the method, apparatuses, and non-transitory computer-readable medium described herein, updating the database record may include operations, features, means, or instructions for sending report information associated with the detected reference signal to a network controller for updating the network controller database.

Some examples of the method, apparatuses, and non-transitory computer-readable medium described herein may further include operations, features, means, or instructions for transmitting a reference signal request for triggering the at least one remote base station to transmit a second reference signal transmission.

In some examples of the method, apparatuses, and non-transitory computer-readable medium described herein, transmitting the reference signal request further may include operations, features, means, or instructions for retrieving, from a database, an indication of the previously detected victim-aggressor relationship and transmitting, via a wireless channel or a backhaul link, the reference signal request to the at least one remote base station based on the indication.

In some examples of the method, apparatuses, and non-transitory computer-readable medium described herein, transmitting the reference signal request further may include operations, features, means, or instructions for transmitting, via a backhaul link, the reference signal request to a network controller for identifying the at least one remote base station based on the previously detected victim-aggressor relationship and for instructing the at least one remote base station to transmit the second reference signal transmission.

Some examples of the method, apparatuses, and non-transitory computer-readable medium described herein may further include operations, features, means, or instructions for monitoring for the second reference signal transmission based on the reference signal request, generating a measurement of an interference channel based on receiving the second reference signal transmission and transmitting, via a backhaul link, the measurement to the at least one remote base station.

Some examples of the method, apparatuses, and non-transitory computer-readable medium described herein may further include operations, features, means, or instructions for detecting an identifier assigned to the at least one remote base station based on a second reference signal transmission from the at least one remote base station, where the transmitting the measurement may be based on the identifier.

Some examples of the method, apparatuses, and non-transitory computer-readable medium described herein may further include operations, features, means, or instructions for determining a relationship update for information related to the previously detected victim-aggressor relationship based at least in part on the detected identifier and updating a database record of the previously detected victim-aggressor relationship in a local database, a network controller database, or both, based on the relationship update.

Some examples of the method, apparatuses, and non-transitory computer-readable medium described herein may further include operations, features, means, or instructions for receiving a second reference signal transmission that includes an identifier of a second remote base station of the at least one remote base station and classifying the second remote base station as an aggressor to the first remote base station based on the identifier.

Some examples of the method, apparatuses, and non-transitory computer-readable medium described herein may further include operations, features, means, or instructions for classifying the first base station as an aggressor to the second remote base station based on the identifier.

In some examples of the method, apparatuses, and non-transitory computer-readable medium described herein, classifying the second remote base station further may include operations, features, means, or instructions for classifying the second remote base station as an aggressor to the first remote base station based on the identifier and a downlink transmission power of the second remote base station satisfying a threshold.

In some examples of the method, apparatuses, and non-transitory computer-readable medium described herein, classifying the second remote base station further may include operations, features, means, or instructions for classifying the second remote base station as an aggressor to the first remote base station based on the identifier and a number of remote base stations associated with the identifier.

Some examples of the method, apparatuses, and non-transitory computer-readable medium described herein may further include operations, features, means, or instructions for receiving a second reference signal transmission that includes an identifier of a second remote base station of the at least one remote base station, classifying the second remote base station as having a first relation type to the first base station based on the identifier and classifying the first base station as having a second relation type to the second remote base station based on the identifier.

Some examples of the method, apparatuses, and non-transitory computer-readable medium described herein may further include operations, features, means, or instructions for receiving a second reference signal transmission that includes an identifier of a second remote base station of the at least one remote base station, where the identifier may be unique to the first remote base station.

Some examples of the method, apparatuses, and non-transitory computer-readable medium described herein may further include operations, features, means, or instructions for receiving a second reference signal transmission that includes an identifier of a second remote base station of the at least one remote base station, where the identifier may be shared by a set of remote base stations.

Some examples of the method, apparatuses, and non-transitory computer-readable medium described herein may further include operations, features, means, or instructions for monitoring an interference power level, an interference pattern, or both, of a second reference signal transmission of a second remote base station of the at least one remote base station and classifying the second remote base station as an aggressor based on the interference power level, the interference pattern, or both.

In some examples of the method, apparatuses, and non-transitory computer-readable medium described herein, transmitting the first reference signal transmission further may include operations, features, means, or instructions for receiving a reference sequence configuration from a network controller and transmitting the first reference signal transmission in accordance with the reference sequence configuration.

A method of wireless communication by a first base station operating in a time division duplex (TDD) system is described. The method may include receiving a request to perform reference signaling monitoring based on a previously detected victim-aggressor relationship between the first base station and a second base station and monitoring for a first reference signal transmission from the second base station based on the request.

An apparatus for wireless communication by a first base station operating in a TDD system is described. The apparatus may include a processor, memory in electronic communication with the processor, and instructions stored in the memory. The instructions may be executable by the processor to cause the apparatus to receive a request to perform reference signaling monitoring based on a previously detected victim-aggressor relationship between the first base station and a second base station and monitor for a first reference signal transmission from the second base station based on the request.

Another apparatus for wireless communication by a first base station operating in a TDD system is described. The apparatus may include means for receiving a request to perform reference signaling monitoring based on a previously detected victim-aggressor relationship between the first base station and a second base station and monitoring for a first reference signal transmission from the second base station based on the request.

A non-transitory computer-readable medium storing code for wireless communication by a first base station operating in a TDD system is described. The code may include instructions executable by a processor to receive a request to perform reference signaling monitoring based on a previously detected victim-aggressor relationship between the first base station and a second base station and monitor for a first reference signal transmission from the second base station based on the request.

In some examples of the method, apparatuses, and non-transitory computer-readable medium described herein, monitoring for the first reference signal transmission further may include operations, features, means, or instructions for performing remote interference management based on detecting the first reference signal transmission.

In some examples of the method, apparatuses, and non-transitory computer-readable medium described herein, monitoring for the first reference signal transmission further may include operations, features, means, or instructions for adjusting a priority in which the first base station monitors for the first reference signal transmission relative to a second reference signal transmission from a third base station based on the request.

In some examples of the method, apparatuses, and non-transitory computer-readable medium described herein, monitoring for the first reference signal transmission further may include operations, features, means, or instructions for adjusting a periodicity at which the first base station monitors for the first reference signal transmission based on the request.

In some examples of the method, apparatuses, and non-transitory computer-readable medium described herein, monitoring for the first reference signal transmission further may include operations, features, means, or instructions for adjusting a periodicity at which the first base station monitors for the first reference signal transmission based on failing to detect the first reference signal transmission within a defined amount of time.

In some examples of the method, apparatuses, and non-transitory computer-readable medium described herein, monitoring for the first reference signal transmission further may include operations, features, means, or instructions for de-prioritizing monitoring for the first reference signal transmission based on failing to detect the first reference signal transmission within a defined amount of time.

In some examples of the method, apparatuses, and non-transitory computer-readable medium described herein, receiving the request to perform reference signaling monitoring further may include operations, features, means, or instructions for receiving the request from a user equipment served by the first base station, the request indicating that the user equipment detected the first reference signal transmission.

In some examples of the method, apparatuses, and non-transitory computer-readable medium described herein, receiving the request to perform reference signaling monitoring further may include operations, features, means, or instructions for receiving the request from the second base station via a wireless channel or a backhaul link.

In some examples of the method, apparatuses, and non-transitory computer-readable medium described herein, receiving the request to perform reference signaling monitoring further may include operations, features, means, or instructions for receiving the request from a network controller via a backhaul link.

Some examples of the method, apparatuses, and non-transitory computer-readable medium described herein may further include operations, features, means, or instructions for transmitting a relationship update indicating information related to the previously detected victim-aggressor relationship and updating a database record related to the previously detected victim-aggressor relationship in a local database, a network controller database, or both, based on the relationship update.

Some examples of the method, apparatuses, and non-transitory computer-readable medium described herein may further include operations, features, means, or instructions for receiving, via a wireless channel or a backhaul link, a reference signal request for triggering the first base station to transmit a second reference signal transmission and transmitting the second reference signal transmission based on the reference signal request.

Some examples of the method, apparatuses, and non-transitory computer-readable medium described herein may further include operations, features, means, or instructions for receiving interference channel information based on transmitting the second reference signal transmission and performing remote interference management based on the interference channel information.

In some examples of the method, apparatuses, and non-transitory computer-readable medium described herein, the second reference signal transmission includes an identifier of the first base station.

Some examples of the method, apparatuses, and non-transitory computer-readable medium described herein may further include operations, features, means, or instructions for determining not to transmit a subsequent reference signal transmission based on determining that interference channel information may have not been received from the second base station within a defined amount of time.

Some examples of the method, apparatuses, and non-transitory computer-readable medium described herein may further include operations, features, means, or instructions for transmitting a second reference signal transmission that includes an identifier of the first base station.

In some examples of the method, apparatuses, and non-transitory computer-readable medium described herein, the identifier may be unique to the first remote base station.

In some examples of the method, apparatuses, and non-transitory computer-readable medium described herein, the identifier may be shared by a set of remote base stations.

In some examples of the method, apparatuses, and non-transitory computer-readable medium described herein, transmitting the second reference signal transmission further may include operations, features, means, or instructions for receiving a reference sequence configuration from a network controller and transmitting the second reference signal transmission in accordance with the reference sequence configuration.

A method of wireless communication by a network controller operating in a TDD system is described. The method may include receiving, from a first base station, a request to trigger reference signal monitoring by at least one remote base station, identifying a previously detected victim-aggressor relationship between the first base station and the at least one remote base station, and transmitting a monitoring request instructing the at least one remote base station to perform reference signal monitoring.

An apparatus for wireless communication by a network controller operating in a TDD system is described. The apparatus may include a processor, memory in electronic communication with the processor, and instructions stored in the memory. The instructions may be executable by the processor to cause the apparatus to receive, from a first base station, a request to trigger reference signal monitoring by at least one remote base station, identify a previously detected victim-aggressor relationship between the first base station and the at least one remote base station, and transmit a monitoring request instructing the at least one remote base station to perform reference signal monitoring.

Another apparatus for wireless communication by a network controller operating in a TDD system is described. The apparatus may include means for receiving, from a first base station, a request to trigger reference signal monitoring by at least one remote base station, identifying a previously detected victim-aggressor relationship between the first base station and the at least one remote base station, and transmitting a monitoring request instructing the at least one remote base station to perform reference signal monitoring.

A non-transitory computer-readable medium storing code for wireless communication by a network controller operating in a TDD system is described. The code may include instructions executable by a processor to receive, from a first base station, a request to trigger reference signal monitoring by at least one remote base station, identify a previously detected victim-aggressor relationship between the first base station and the at least one remote base station, and transmit a monitoring request instructing the at least one remote base station to perform reference signal monitoring.

In some examples of the method, apparatuses, and non-transitory computer-readable medium described herein, identifying the previously detected victim-aggressor relationship further may include operations, features, means, or instructions for retrieving, from a database, an indication of the previously detected victim-aggressor relationship, where transmitting the monitoring request may be based on the indication.

Some examples of the method, apparatuses, and non-transitory computer-readable medium described herein may further include operations, features, means, or instructions for receiving, from the at least one remote base station or the first base station, a relationship update indicating information related to the previously detected victim-aggressor relationship and updating a database record related to the previously detected victim-aggressor relationship in a database based on the relationship update.

Some examples of the method, apparatuses, and non-transitory computer-readable medium described herein may further include operations, features, means, or instructions for transmitting a reference signal request for triggering the at least one remote base station to transmit a reference signal transmission.

Some examples of the method, apparatuses, and non-transitory computer-readable medium described herein may further include operations, features, means, or instructions for configuring the first base station with a first identifier for transmission in a first reference signal transmission and configuring the at least one remote base station with a second identifier for transmission in a second reference signal transmission.

Some examples of the method, apparatuses, and non-transitory computer-readable medium described herein may further include operations, features, means, or instructions for identifying a second previously detected victim-aggressor relationship between a third base station and the at least one remote base station and allocating a first reference signal sequence to the first base station and a second reference signal sequence to the third base station based on the previously detected victim-aggressor relationship and the second previously detected victim-aggressor relationship.

Some examples of the method, apparatuses, and non-transitory computer-readable medium described herein may further include operations, features, means, or instructions for configuring the first base station to transmit a first reference signal transmission in first time and frequency resources and configuring the third base station to transmit a second reference signal transmission in second time and frequency resources.

In some examples of the method, apparatuses, and non-transitory computer-readable medium described herein, the first time and frequency resources may be distinct from the second time and frequency resources.

DETAILED DESCRIPTION

Figure 1:
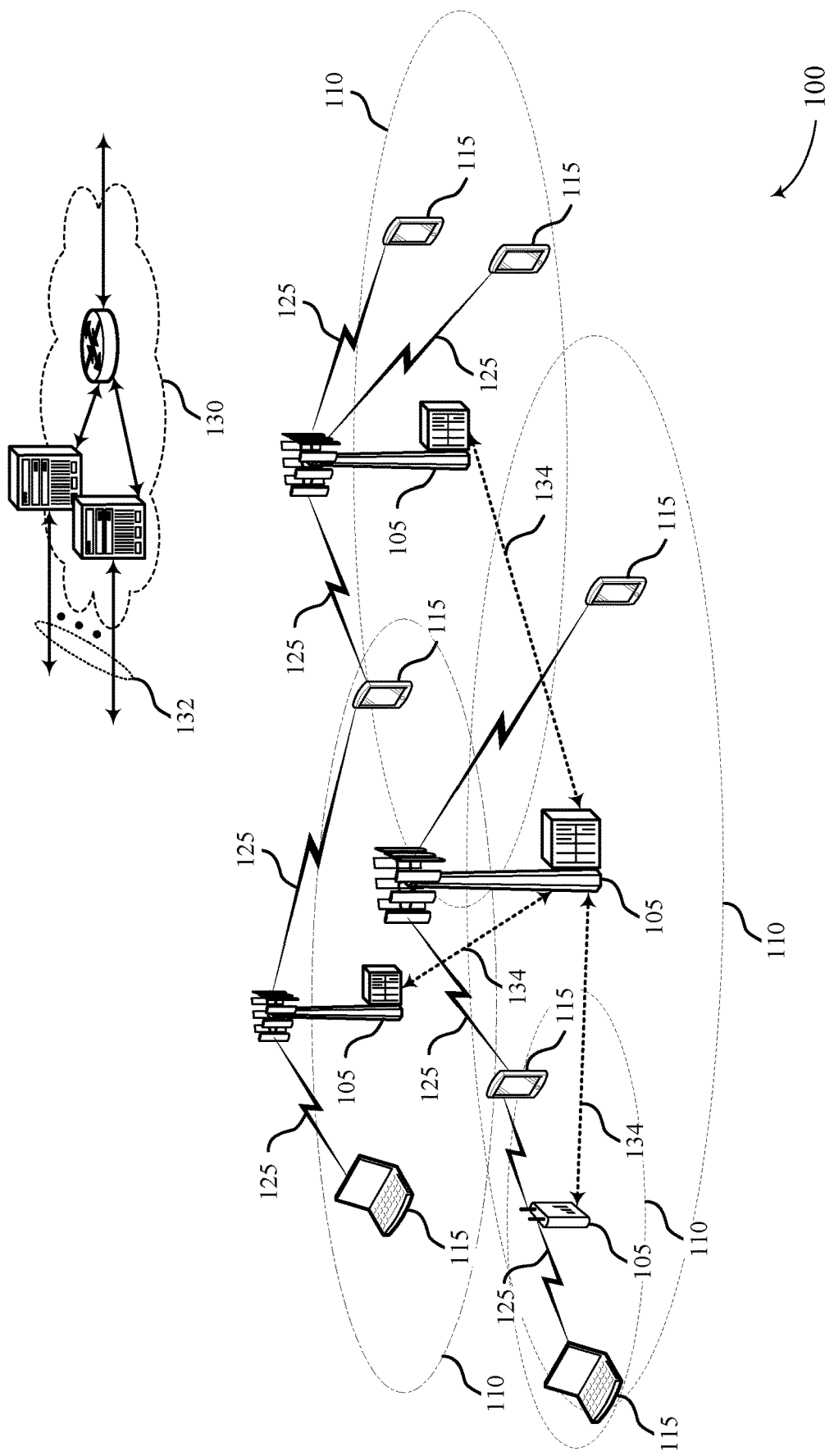
FIG. 1 illustrates an example of a system for wireless communications that supports enhancement by victim-aggressor relationship in accordance with aspects of the present disclosure.

The described techniques provide for using a previously detected victim-aggressor relationship to efficiently mitigate remote interference caused by downlink transmissions by an aggressor base station on uplink transmissions from a user equipment (UE) to be received by a victim base station. Interference mitigation techniques may be applied at the aggressor base station, the victim base station, or both.

Some wireless communications systems may support communications between base stations and UEs in different coverage areas. In some aspects, downlink transmissions from one base station may only be detectable by UEs within and around the edge of a respective coverage area. In other aspects, however, downlink transmissions from a base station may be detectable beyond the coverage area of the base station. For instance, the downlink transmissions may be detectable at a distance much larger than a coverage range (e.g., several hundred kilometers) due to, for example, reflection by mountains, ocean surface, or clouds, or due to atmospheric ducting.

In such aspects, downlink transmissions from an aggressor base station may interfere with communications between a victim base station and one or more UEs. This interference may be referred to as remote interference and may hinder communications between the victim base station and the one or more UEs. For instance, the victim base station may be unable to receive uplink transmissions from a UE, or a UE may be unable to synchronize with the victim base station using a random access procedure. Further, if the victim base station is impacted by similar interference from other base stations (i.e., multiple base stations), the victim base station may experience degraded or very low throughput. In some examples, one or more aggressor base stations may repeatedly cause interference with the same victim base station over time. As described herein, a wireless communications system may support efficient techniques for managing remote interference based on a previously detected aggressor-victim relationship. In particular, the wireless communications system may implement techniques described herein to mitigate remote interference.

Previously detected victim-aggressor relationships may be defined and stored to mitigate subsequent remote interference. A victim-aggressor relationship may include an indication of a pair of devices or groups of devices, at least one of which has caused remote interference on the other. If a first base station causes remote interference at a second base station, then the first and second base stations may be determined to have a victim-aggressor relationship. A victim-aggressor relationship may be defined based on individual cell identifiers, base station identifiers, or group identifiers. Thus, if an aggressor base station with a first unique identifier causes remote interference at a victim base station with a second unique identifier, then a victim-aggressor relationship may identify a victim base station and an aggressor base station. The victim-aggressor relationship may be locally stored at each base station 105, may be stored at a network database, or both. Victim-aggressor relationships may be defined between individual base stations, between groups of base stations, between individual base stations and one or more groups of base stations, or any combination thereof.

In some examples, one aggressor base station may cause remote interference to multiple victim base stations, and victim base stations may be configured to send a reference signal when it detects remote interference, which may trigger the aggressor base station to initiate remote interference mitigation (RIM). However, when one aggressor base station causes remote interference for multiple victim base stations, and each of the victim base stations transmits a reference signal, the multiple reference signals may interference with each other. Interference between the reference signals may impair or prevent the aggressor base station from receiving one or more of the multiple reference signals. In such cases, if the aggressor base station fails to successfully receive all of the reference signals from each victim base station, the aggressor may not initiate RIM, or may not initiate RIM in a way that improves remote interference at each victim base station.

As described herein, previously detected victim-aggressor relationships between victim base stations and aggressor base stations may be used to enhance RIM by allocating multiple reference signal sequences to decrease interference between the reference signal transmissions by the victim base station stations. Upon detecting remote interference, a victim base station may send a reference signal to an aggressor base station that is identified based on previously detected victim-aggressor relationships. A network controller may allocate different sequences for each reference signal (e.g., one sequence for each identified victim base station) such that the different sequences have little or no cross correlation, are transmitted in different time-frequency resources, different code division multiplexing (CDM) pattern resources, or any combination thereof. Each victim base station may transmit an allocated sequence to the identified aggressor base station, increasing the likelihood that the aggressor base station may be able to receive each individual reference signal sequence transmission because there is less cross-correlation between the reference signal sequences, because the reference signal sequences are located in different time-frequency resources, different CDM pattern resources, or any combination thereof.

In some examples, a victim base station may be configured to send a reference signal when it detects remote interference, which may initiate RIM at the aggressor base station. However, in conventional approaches, an aggressor base station may be configured to continuously monitor (monitor with a low density (i.e., monitor with a long periodicity)) for reference signals from a potential victim base station, may begin to monitor for reference signals upon detecting remote interference from the victim cell, or both.

However, if interference from the victim cell is not sufficiently strong to be detected by the aggressor base station, then the aggressor base station may not begin to monitor for reference signals and/or may fail to receive a transmitted reference signal. Or, an aggressor cell may be configured to monitor with a low periodicity, which may result in a long detection latency. Further, an aggressor base station may monitor for and detect all configured reference signals in the network, which may result in long reference signal detection latency. Beneficially, a fast monitoring procedure as described herein may enhance RIM and decrease reference signal detection latency. A base station may perform a fast monitoring procedure based on a previously detected victim-aggressor relationship. A victim base station may identify one or more aggressor base stations based on a previously detected victim-aggressor relationship, and may send a trigger initiating monitoring for reference signals by the one or more aggressor base station based on the previously detected victim-aggressor relationship. The aggressor base station may initiate monitoring for one or more reference signal transmissions from victim base stations based on the trigger, and the aggressor base station may perform RIM based on the trigger and the reference signal. Thus, utilizing information on a previously detected victim-aggressor relationship may enable a victim base station to efficiently identify a likely aggressor, and trigger the likely aggressor to monitor for a reference signal transmission from the victim for use in remote interference management.

In some examples, a victim base station may be configured to send a request to an aggressor base station, instructing the base station to transmit a reference signal so that the victim base station can perform interference channel measurements on the received reference signal, and initiate RIM procedures based thereon. However, if the request signal from the victim base station is weak, then the aggressor base station may not receive it, and may not transmit a reference signal. In such cases, the victim base station may not receive the reference signal, identify the aggressor base station, or measure the interference channel.

Additionally, or alternatively, the request may be sent in a broadcast manner, and all base stations that receive the signal may respond even if they are not aggressor base stations to the victim base station. Beneficially, previously detected victim-aggressor relationships as described herein may be used to trigger a transmission of the reference signal from the aggressor base station. A base station may perform a fast transmission procedure based on a previously detected victim-aggressor relationship. A victim base station may identify one or more aggressor base stations based on a previously detected victim-aggressor relationship, and may send a request to the aggressor base station requesting that the aggressor base station send a reference signal. One or more base stations may perform RIM based at least in part on the requested reference signal. Thus, utilizing information on a previously detected victim-aggressor relationship may enable a victim base station to efficiently identify a likely aggressor, and trigger the likely aggressor to transmit a reference signal for use in remote interference management.

Aspects of the disclosure are initially described in the context of a wireless communications system. Aspects of the disclosure are further illustrated by and described with reference to interference scenarios, reference signal sequence allocation schemes, fast monitoring procedures, victim-aggressor relationship storage schemes, fast transmitting procedures, and process flows. Aspects of the disclosure are further illustrated by and described with reference to apparatus diagrams, system diagrams, and flowcharts that relate to enhancement by victim-aggressor relationship.

FIG. 1 illustrates an example of a wireless communications system 100 that supports enhancement by victim-aggressor relationship in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Generally, the described techniques provide for managing remote interference using a previously detected relationship between an aggressor base station and a victim base station. In some examples, a first, victim, base station 105 operating in a TDD system may identify that downlink transmissions from a remote, aggressor, base station 105 are causing interference to reception of uplink transmissions from at least one UE 115 served by the victim base station 105. The described techniques further provide for identifying, by a first, victim, base station 105, current remote interference from a second, aggressor, base station 105, and identifying the aggressor base station 105 based on a previously detected victim-aggressor relationship.

The victim base station 105 may send a reference signal, including a unique identifier corresponding to the victim base station, which may be used by the aggressor base station to perform RIM. However, the aggressor base station 105 may not know that it is causing remote interference, may not be monitoring for a reference signal from the victim base station 105, or may not expend the overhead to monitor for all potential victim base stations 105. So, the victim base station 105 may trigger the aggressor base station 105 to perform reference signal monitoring based on the previously detected victim-aggressor relationship, and may transmit a reference signal carrying a unique identifier based on the triggering. The aggressor base station 105 may monitor for and receive the reference signal, identify the victim base station 105, and may perform RIM based on reference signal. The described techniques further provide for requesting the second base station 105 to transmit a reference signal for enabling the first base station 105 to measure interference of a wireless channel, and performing interference mitigation techniques at the first base station 105, the second base station 105, or both.

Figure 2:
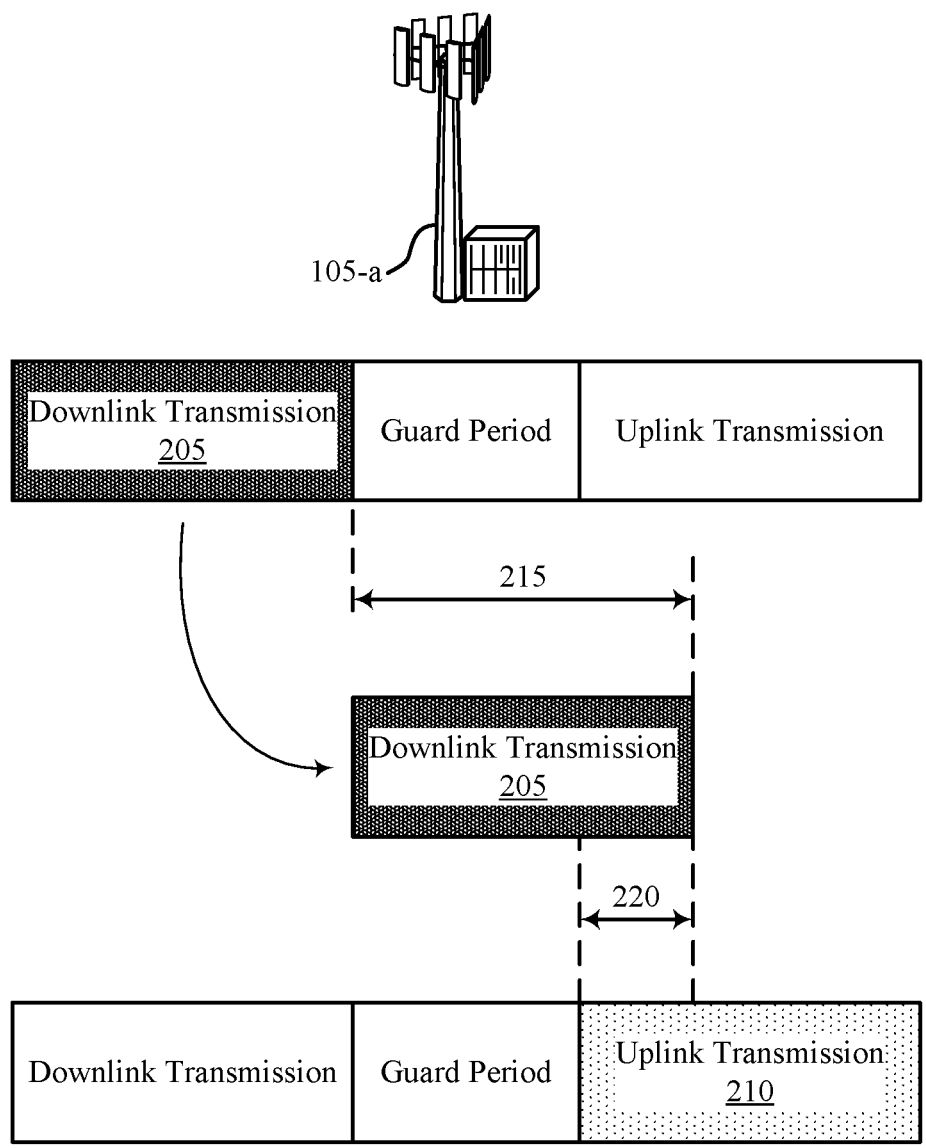
FIG. 2 illustrates an example of a wireless communications system that supports enhancement by victim-aggressor relationship in accordance with aspects of the present disclosure.

FIG. 2 illustrates an example of a wireless communications system 200 that supports enhancement by victim-aggressor relationship in accordance with aspects of the present disclosure. In some examples, wireless communications system 200 may implement aspects of wireless communications system 100. In some examples, the wireless communications system 200 may implement aspects of wireless communications system 100.

The wireless communications system 200 may include base station 105-*a* and base station 105-*b*, which may each be an example of a base station 105 as described herein. Base station 105-*b* may experience remote interference due to a downlink transmission 205 from a base station 105-*a*. Base station 105-*b* may be referred to as the victim and base station 105-*a* may be referred to as the aggressor.

In the example of FIG. 2, base station 105-*a* and base station 105-*b* may communicate using TDD (e.g., where the TDD configurations at base station 105-*a* may be synchronized (as shown) or unsynchronized). Due to the distance between base station 105-*a* and base station 105-*b*, however, a downlink transmission 205 from base station 105-*a* may be delayed by a time period 215, and downlink transmission 205 may overlap and interfere with a portion of uplink transmission 210 to be received by base station 105-*b* during time period 220. Such remote interference may hinder communications between base station 105-*b* and one or more UEs 115 served by base station 105-*b*. For instance, the base station 105-*b* may be unable to receive uplink data from a UE 115, or a UE 115 may be unable to synchronize with base station 105-*b* using a random access procedure. Further, if base station 105-*b* is impacted by similar interference from other base stations 105 (e.g., in addition to base station 105-*a*), base station 105-*b* may experience degraded or very low throughput.

To reduce impact of the remote interference, the base stations 105 may implement aggressor interference mitigation techniques, victim interference mitigation techniques, or both. Aggressor interference techniques may be implemented at the base station 105-*a* to reduce the potential interference to the uplink transmission 210 by a UE 115 to base station 105-*b*. In an example of aggressor interference mitigation techniques, base station 105-*a* may reduce its transmission power, such that the downlink transmission 205, when transmitted with reduced power, does not greatly affect base station 105-*b* and reception of the uplink transmission 210. In another example, base station 105-*a* may stop or terminate transmission of the downlink transmission 205 early, such that the end of the downlink transmission 205 coincides with the start of the uplink transmission 210 (not shown).

Additionally, or alternatively, base station 105-*a* and base station 105-*b* may implement victim interference mitigation techniques. For example, base station 105-*b* may adjust a configuration at the UE 115 which transmits the uplink transmission 210. For example, base station 105-*b* may configure UE 115 to increase its transmission power for uplink transmission 210 to the base station 105-*b*. Increasing the transmission power of the UE 115 may improve detection of the uplink transmission 210 at base station 105-*b*. Or, in another example, base station 105-*b* may delay or postpone when the UE 115 is scheduled to transmit the uplink transmission 210 (not shown). By postponing transmission of the uplink transmission 210, downlink transmission 205 may not collide with the uplink transmission 210, and base station 105-*b* may receive the uplink transmission 210 without experiencing, or lessening the impact of, interference from base station 105-*a*. In another example, the base station 105-*b* may identify a receive beam impacted during at least one symbol by the remote interference, and determine not to schedule the UE 115 to transmit an uplink transmission using the impacted receive beam at least in the at least one symbol or configure the UE 115 to increase transmission power for a transmission beam corresponding to the receive beam at least in the at least one symbol.

Wireless communications system 100 may support efficient techniques for managing remote interference. For example, wireless communications system 100 may support signaling techniques for initiating, adjusting, and stopping mitigation techniques.

Conventional techniques for addressing remote interference only rely on interference caused by currently received signals, and do not maintain nor utilize information about previously detected victim-aggressor relationships between cells where remote interference has existed in the past. The techniques described herein advantageously may store and utilize information about previously detected victim-aggressor relationships to identify and mitigate remote interference when it emerges again. The techniques described herein beneficially may be based on the assumption that a victim cell is more likely to be impacted by a cell that was previously detected as an aggressor to the victim cell in the past. The techniques described herein may leverage that not every cell is impacted by every other cell in the network with equal probabilities. In some examples of network topology, geographic conditions, antenna setups for each cell in the network, or the like, some cells in the network (e.g., cells that have created remote interference in the past) may be more likely to cause remote interference to other cells in the network, and may repeatedly cause interference over time.

Previously detected victim-aggressor relationships may be defined and stored to mitigate subsequent remote interference. A victim-aggressor relationship may include an indication of a pair of devices or groups of devices, at least one of the pair having caused remote interference on the other. If base station 105-*a* causes remote interference at a base station 105-*b*, then base station 105-*a* and base station 1-5-*b* may be determined to have a victim-aggressor relationship. A victim-aggressor relationship may be defined based on individual cell identifiers, base station identifiers, or group identifiers. For example, base station 105-*a* may have a first unique identifier (e.g., ID1) and base station 105-*b* may have a second unique identifier (ID2). Where base station 105-*a* is an aggressor base station causing remote interference for victim base station 105-*b*, a victim-aggressor relationship pair (e.g., (ID1, ID2)) may define the victim-aggressor relationship between aggressor base station 105-*a* and victim base station 105-*a*. In some examples, the ordering of two IDs in a pair may correspond to the ordering of aggressor and victim. The phrases "victim-aggressor" and "aggressor-victim" as discussed herein may be used interchangeably to refer to a relationship between an aggressor and a victim. In some examples, an aggressor base station may be listed first in a victim-aggressor relationship pair. In other examples, an aggressor base station may be listed second in a victim-aggressor relationship pair. For instance, for victim-aggressor relationship pair (ID1, ID2) where the aggressor is listed first, base station 105-*a* is listed first in the pair and hence is the aggressor. Base station 105-*b* is listed second, and hence is the victim. In another example, the aggressor may be the base station 105 listed second in a victim-aggressor relationship pair, and the victim may be the base station 105 listed first in the victim-aggressor relationship pair.

In some cases, each cell listed in a victim-aggressor relationship pair may be both a victim cell and an aggressor cell, just an aggressor cell, or just a victim cell. A network controller, or a base station 105, or both may signal how to interpret which cell in a victim-aggressor relationship pair is the aggressor cell, which is the victim cell, or if a cell is both victim and aggressor.

In some examples, base station 105-*a* may be part of a group of base stations 105 that share an identifier (e.g., ID1) and second base station 105-*b* may be a part of a group of base station 105 that share another identifier (e.g., ID2). In such examples, a victim-aggressor relationship pair (e.g., (ID1, ID2)) may define a victim-aggressor relationship between at least one base station 105 of the group of base stations 105 (base station 105-*a*) and at least one base station 105 of the second group of base stations 105 (base station 105-*b*). Victim-aggressor relationships may be locally stored at each base station 105, may be stored at a network database, or both.

In some examples, aggressor base station 105-*a* may cause remote interference for multiple victim base stations 105-*b*, and victim base stations including base station 105-*b* may be configured to send a reference signal when it detects remote interference, which may initiate RIM at the aggressor base station 105-*b*. However, when one aggressor base station 105-*a* causes remote interference for multiple victim base stations 105-*b*, and each of the victim base stations 105-*b* transmit a reference signal, the multiple reference signals may cause interference with each other. In such cases, if the aggressor base station 105-*a* may fail to successfully receive all of the reference signals from each victim base station.

Beneficially, as described herein, previously detected victim-aggressor relationships between victim base stations 105-*b* and aggressor base stations 105-*a* may be used to enhance remote RIM by using the previously detected victim-aggressor relationships for allocating multiple reference signal sequences to decrease interference. Upon detecting remote interference, a victim base station 105-*b* may send a reference signal to an aggressor base station 105-*a* that is identified based on previously detected victim-aggressor relationships. A network controller may allocate different sequences for each reference signal (e.g., one sequence for each identified victim base station 105-*b*) such that the different sequences have little or no cross correlation, are located in different time-frequency or code division multiplexing (CDM) pattern resources, or both. Each victim base station 105-*b* may transmit an allocated sequence to the identified aggressor base station 105-*a*, and the aggressor base station 105-*a* may be able to receive each individual sequence because there is less cross-correlation between the reference signal sequences, because the reference signal sequences are located in different time-frequency or CDM pattern resources, or both.

In some examples, a victim base station 105-*b* may be configured to send a reference signal when it detects remote interference, which may initiate RIM at the aggressor base station 105-*a*. However, in conventional approaches, an aggressor base station 105-*a* may be configured to continuously monitor (monitor with a low density (e.g., monitor with a long periodicity)) for reference signals from potential victim base stations, or may begin to monitor for reference signals upon detecting remote interference from the victim base station 105-*b*.

If interference from the victim base station 105-*b* is not sufficiently strong to be detected by the aggressor base station 105-*a*, then the aggressor base station 105-*a* may not begin to monitor for reference signals and may fail to receive a transmitted reference signal. Or, an aggressor base station 105-*a* may be configured to monitor with a low periodicity, which may result in a long detection latency. Further, an aggressor base station 105-*a* may monitor for and detect all configured reference signals in the network, which may result in long reference signal detection latency. Beneficially, a fast monitoring procedure as described herein may enhance RIM efficiency and decrease reference signal detection latency. A base station 105 may perform a fast monitoring procedure based on a previously detected victim-aggressor relationship. A victim base station 105-*b* may identify one or more aggressor base stations 105-*a* based on previously detected victim-aggressor relationships, and may send a trigger initiating the one or more aggressor base stations 105-*a* to monitor for reference signals by the victim base station 105-*b*. The aggressor base station 105-*a* may initiate monitoring for one or more reference signal transmissions from victim base stations 105-*b* based on the trigger, and the aggressor base station 105-*a* may perform RIM based on the trigger and the reference signal. Thus, utilizing information on a previously detected victim-aggressor relationship may enable a victim base station 105-*b* to efficiently identify a likely aggressor, and trigger the likely aggressor to monitor for a reference signal transmission from the victim for use in remote interference management.

In some examples, a victim base station 105-*b* may be configured to send a request to an aggressor base station 105-*a*, instructing the aggressor base station 105-*a* to send a reference signal so that the victim base station 105-*b* can perform interference channel measurements, and perform RIM procedures based thereon. However, if the request signal from the victim base station 105-*b* is weak, then the aggressor base station 105-*a* may not receive it, and may not transmit a reference signal. In such cases, the victim base station 105-*b* may not receive the reference signal, identify the aggressor base station 105-*a*, or measure the interference channel. Additionally, or alternatively, the request may be sent in a broadcast manner, and all base stations 105 that receive the signal may respond even if they are not aggressor base stations 105 to the victim base station 105-*b*.

Beneficially, previously detected victim-aggressor relationships as described herein may be used to trigger a transmission of the reference signal from the aggressor base station 105-*a*. A victim base station 105-*b* may perform a fast transmission procedure based on a previously detected victim-aggressor relationship. A victim base station 105-*b* may identify one or more aggressor base stations 105-*a* based on a previously detected victim-aggressor relationship, and may send a request to the aggressor base station 105-*a* requesting that the aggressor base station 105-*a* send a reference signal. One or more base stations 105 may perform RIM based at least in part on the requested reference signal. Thus, utilizing information on a previously detected victim-aggressor relationship may enable a victim base station 105-*b* to efficiently identify a likely aggressor, and trigger the likely aggressor to transmit a reference signal for use in remote interference management.

Figure 3:
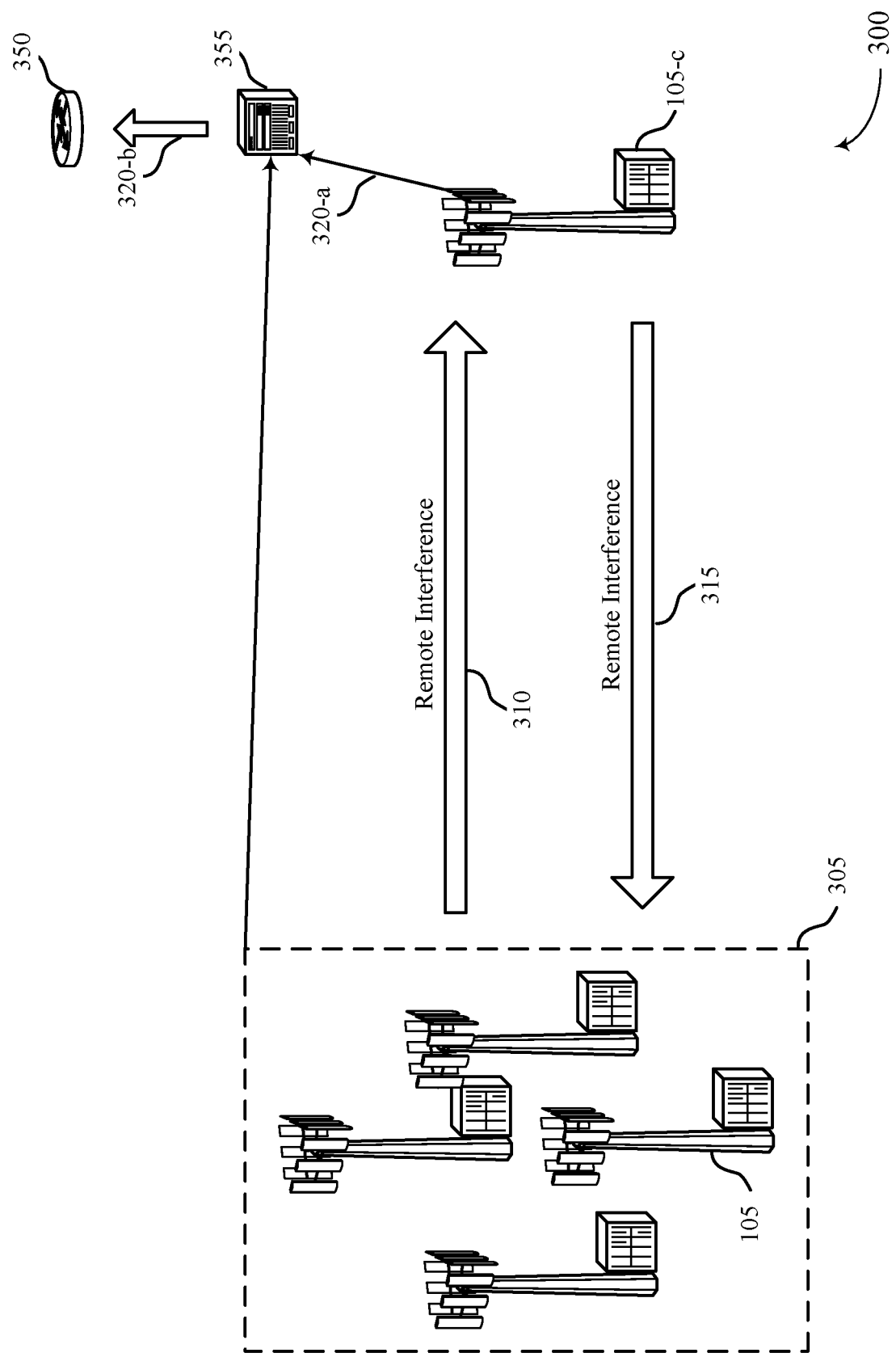
FIG. 3 illustrates an example of an interference scenario that supports enhancement by victim-aggressor relationship in accordance with aspects of the present disclosure.

FIG. 3 illustrates an example of an interference scenario 300 that supports enhancement by victim-aggressor relationship in accordance with aspects of the present disclosure. In some examples, interference scenario 300 may implement aspects of wireless communications system 100. The interference scenario 300 may include a first base station 105-*c*, which may be an example of a victim of remote interference, and a group 305 of aggressor base stations 105.

As described in FIG. 2, a base station 105 of the group 305 may cause remote interference 310 to base station 105-*c*. Upon detecting the remote interference 310, base station 105-*c* may perform one or more procedures, as described in greater detail with respect to FIGS. 4-11. Similarly, base station 105-*c* may cause remote interference 315 to one or more base station 105 of group 305. In some cases, a victim-aggressor relationship may be detected between group 305 and another group of base stations 105, or between group 305 and a single base station 105-*c*, or between base station 105-*c* and a single base station 105 of a group 305, or any combination thereof. In some examples, an aggressor base station 105 may cause remote interference 310. In some examples, base station 105-*c* may also be an aggressor base station, and may cause remote interference 315 to one or more base stations 105 of group 305.

In an example where a base station 105 causes remote interference 310, the aggressor base station 105 may be more likely to cause remote interference 310 again than other base stations 105 that have not previously caused remote interference. One or more base stations 105 may detect victim-aggressor relationships. One or more base station 105 may store the detected victim-aggressor relationships. In some examples, a base station 105-*c* may detect a victim-aggressor relationship, and may store the victim-aggressor relationship at a network storage database 350. For instance, base station 105-*c* may send an indication 320-*a* of a victim-aggressor relationship to a network controller 355, and the network controller 355 may forward the indication 320-*b* to the network storage database 350. In other examples, base station 105-*c* may store the victim-aggressor relationship locally. In some examples, base station 105-*c* may utilize the previously detected victim-aggressor relationships for enhanced RIM procedures, as described below.

In a first example, each base station 105 may include or operate one or more cells, and each cell may be assigned an identifier. In some examples described herein, the terms cell and base station may be used interchangeably. In some frameworks, an identifier for a base station (e.g., a cell) may be detected, and stored to indicate either an aggressor, a victim, or both, in a previously detected victim-aggressor relationship. For instance, in framework 2.1 and framework 2.2 (as described in greater detail with respect to FIGS. 14 and 15) a base station 105 may transmit a reference signal that carries an identifier assigned to base station 105. In frameworks 0 or 1 (as described in greater detail with respect to FIGS. 12 and 13) base stations 105 may transmit a reference signal without an assigned identifier. In some examples, either or both of frameworks 0 and 1 may be modified to allow each base station to transmit a reference signal that carries an assigned identifier.

In some frameworks, a network controller may configure each base station to transmit a unique detectable signal and may configure other base stations 105 to detect this signal. If the signal is detected, other base stations 105 may, in some cases, determine that the transmitting base station 105 is an aggressor base station 105. In some frameworks, a network controller may configure each base station 105 to transmit downlink signals and other base stations 105 may stop transmitting during a period of time. In such examples, if an interference power is detected (e.g., during the period of time when other base stations 105 have stopped transmitting) then other base stations 105 may, in some examples, determine that the transmitting base station 105 is an aggressor.

In some cases, an identifier may be assigned to a group 305 of cells or base stations 105, and reference signals transmitted by any base station 105 of group 305 may carry the same group identifier. In such cases, if the victim-aggressor relationship is determined by reference signal detection, then the victim-aggressor relationship may reflect that at least one base station 105 of group 305 is an aggressor base station 105. In cases where the cell or base station grouping technique is used, victim-aggressor relationships may be represented by an identifier pair (e.g., ID1, ID2) which may indicate that base stations 105 in group 305 (or cells in the cell group) with ID2 can receive interference from base stations 105 in another group (or cells in cell group with ID1).

In a TDD system, a wireless channel between two cells is normally reciprocal. That is, conditions of a wireless channel from a first cell to a second cell may be the same, or nearly the same, as the conditions of a wireless channel from the second cell to the first cell. If a first cell (e.g., base station 105) is an aggressor to a second cell (e.g., base station 105-*c*), then the first cell may be a victim to the second cell. However, even though the wireless channel conditions in each direction may be similar, interference power from the first cell to the second cell and interference power from the second cell to the first cell may be different due to various reasons. For instance, one cell may transmit using a higher (e.g., stronger) downlink transmission power than one or more other cells. In another example where two cell groups cause interference to each other, the number of cells in one group may be much larger than the number cells in the other group. In some cases, interference received by one cell may be too weak to be detectable whereas interference received by the other cell is strong.

Interference asymmetry may be included or excluded when identifying whether a cell is a victim, an aggressor, or both in a previously detected victim-aggressor relationship. In one example, a victim-aggressor pair identifier (e.g., ID1, ID2) may indicate that a cell with assigned ID1 may be both aggressor and victim to a cell with assigned ID2, and vice versa. In some examples, the victim-aggressor relationship may be established in this manner as long as one cell above detects interference (e.g., including regular downlink signal and reference signal with an assigned identifier) from the other cell. In some cases, such victim-aggressor pair identifiers may be used for RIM enhancements as described herein.

In another example, an order of a pair of identifiers in a victim-aggressor relationship (e.g., ID1, ID2) may indicate that a cell with assigned ID1 is aggressor to a cell with assigned ID2, and the cell with ID2 is a victim to the cell with ID1. This relationship may be established, for example, if the cell with ID2 is able to detect interference from the cell with ID1.

In some examples, the cell with ID2 may or might not be considered an aggressor to the cell with ID1. For example, the victim-aggressor relationship identifier pair (ID1, ID2) may indicate a relation type for identifier. For instance, a relation type may be a strong relationship type, which may indicate that the cell with ID1 is the aggressor and the cell with ID2 is the victim. The relationship type may be a weak relationship type, which may indicate that the cell with ID2 is the aggressor and the cell with ID1 is the victim if a victim-aggressor identifier (ID2, ID1) does not already exist in the database 350. Both strong relation types and weak relation types may be used for RIM procedures as described herein. In some examples, a strong relation type may have a higher priority than a weak type relation.

For example, a base station 105 may initiate an enhanced RIM procedure as described below with respect to FIGS. 4-11, based on previously detected victim-aggressor relationships. A base station 105-c may detect remote interference 310, and may send, for example, a reference signal to a set of base stations 105 that have been identified as aggressor base stations 105. If a first base station 105 is the first ID in a victim-aggressor pair and is identified in a strong relationship type (e.g., the first base station 105 is an aggressor base station in a victim-aggressor relationship identifier pair), and a second base station 105 is the first ID in a victim-aggressor pair and is identified in a weak relationship type (e.g., the second base station 105 is a victim base station), then priority may be given to the first base station 105 (e.g., the first base station may be included in the set of potential aggressor base stations 105).

Previously detected victim-aggressor relationships may be stored in a database 350, and subsequently retrieved for enhanced RIM procedures. In some examples, base station 105-c may identify a victim-aggressor relationship with a base station 105. A base station 105 may cause remote interference 310, which may be detected by base station 105-c. Base station 105-c may determine that the base station 105 is an aggressor base station 105 and that base station 105-c is the victim. Base station 105-c may perform one or more procedures (e.g., fast monitoring, fast transmitting, or the like, as described herein in greater detail with respect to FIGS. 4-11) and may receive a reference signal from the aggressor base station 105, which may include a unique identifier.

Base station 105-c may identify the victim-aggressor relationship (e.g., victim-aggressor relationship pair (ID1, ID2), where ID1 corresponds to the aggressor base station 105 and ID2 corresponds to the victim base station 105-c). Base station 105-c may send an indication 320-a of the victim-aggressor relationship to a network controller 355. Network controller 355 may forward an indication 320-b the victim-aggressor relationship to database 350. In some examples, detected victim-aggressor relationships may be stored locally (e.g., at each base station 105) instead of via the network controller 355 or in a central network database 350. Upon detecting remote interference again, base station 105-c may perform enhanced RIM based on the victim-aggressor relationships stored in database 350. Enhanced RIM procedures using previously detected victim-aggressor relationships are described with respect to FIGS. 4-10.

Figure 4:
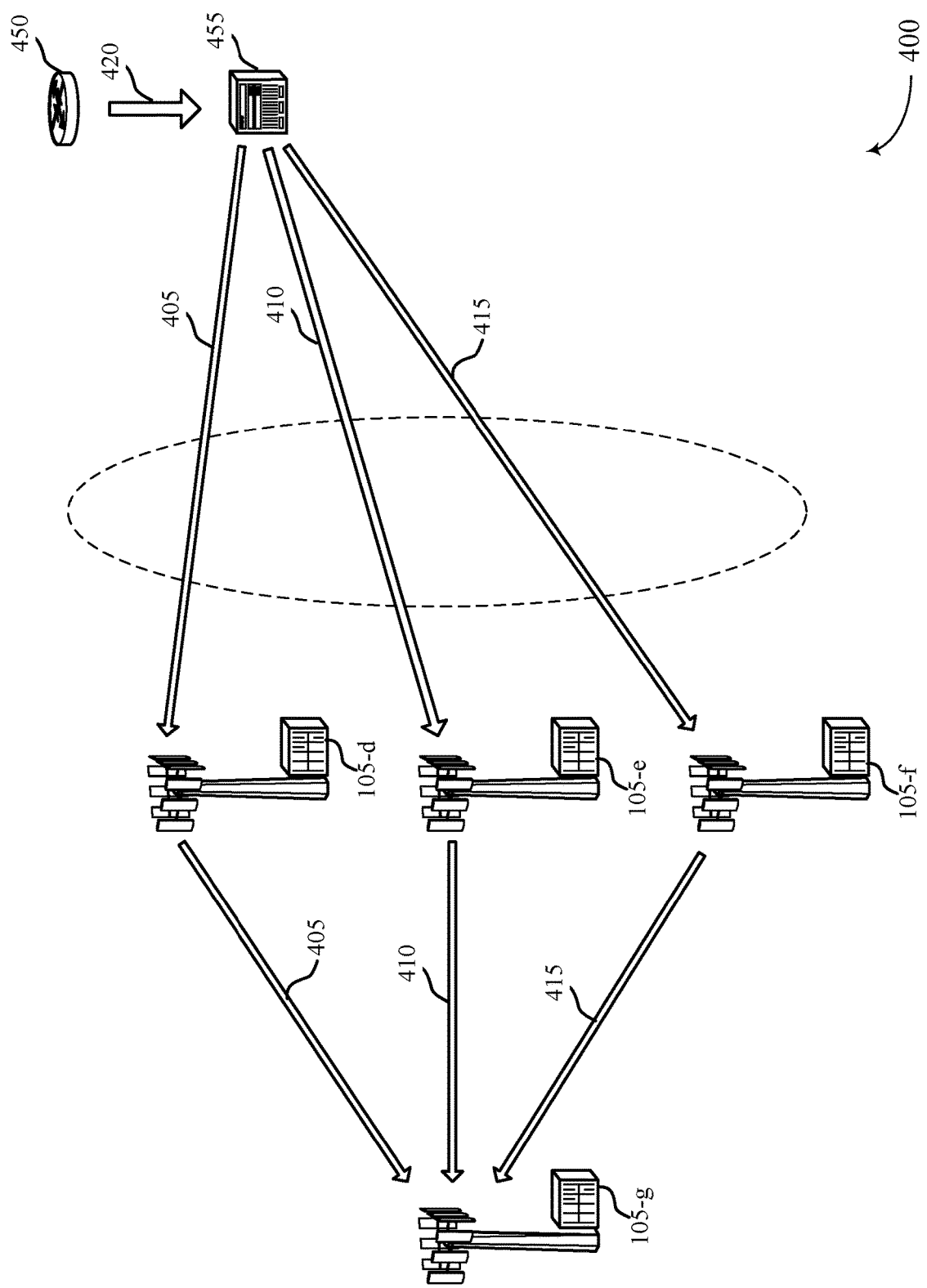
FIG. 4 illustrates an example of a reference signal sequence allocation scheme that supports enhancement by victim-aggressor relationship in accordance with aspects of the present disclosure.

FIG. 4 illustrates an example of a reference signal sequence allocation scheme 400 that supports enhancement by victim-aggressor relationship in accordance with aspects of the present disclosure. In some examples, reference signal sequence allocation scheme 400 may implement aspects of wireless communications systems 100 and 200. The reference signal sequence allocation scheme 400 may include base station 105-d, base station 105-e, and base station 10-5-f, which may be examples of victims of remote interference, and a base station 105-g, which may be an example of an aggressor base stations, as well as a network controller 445 and a network database 450, all of which may be examples of corresponding devices with respect to FIG. 1.

In some examples, a base station (e.g., aggressor base station 105-g or another base station 105) may cause remote interference for multiple victim base stations 105 (e.g., base station 105-d, base station 105-e, and base station 105-f). Victim base stations 105 may be configured to send a reference signal when they detect remote interference, which may initiate RIM at the aggressor base station 105-g. However, when one aggressor base station 105-g causes remote interference for multiple victim base stations 105, and each of the victim base stations 105 transmits a reference signal, the multiple reference signals may cause interference with each other. That is, when previously detected victim-aggressor relationships are not considered, multiple reference signals may be transmitted by multiple victim base stations 105, resulting in interference between the reference signals that degrades the ability of aggressor base station 105-g to detect reference signal transmissions from multiple victim base stations 105. In such cases, the aggressor base station 105-a may fail to successfully receive all of the reference signals from each victim base station. Beneficially, as described herein, previously detected victim-aggressor relationships between base station 105-d, base station 105-e, and base station 105-f, and aggressor base stations 105-g may be used to enhance RIM by decreasing interference between multiple reference signals. A network controller 445 may utilize previously detected victim-aggressor relationships stored in a network database 450 to allocate different reference signal sequences to decrease interference.

In some examples, a network controller may allocate sequences for reference signals based on previously detected victim-aggressor relationships to perform enhanced RIM. One or more base stations 105 may send reference signals to one or more other base stations 105 when certain conditions are met. For instance, upon detecting interference, a base station 105 may send a reference signal to one or more potential aggressor base stations 105 for triggering the aggressor(s) to perform RIM. The reference signals may carry a unique identifier, and RIM may be performed by the aggressor base station 105, the victim base station 105, or both based on the identifiers and reference signals. Conditions and procedures in which a base station 105 may send a reference signal are described in greater detail with respect to FIGS. 5-15.

In some examples, a network controller 455 may configure one or more base stations 105 (e.g., base station 105-d, base station 105-e, and base station 105-f) to send reference signals, such as reference signal sequence 405, reference signal sequence 410, and reference signal sequence 415 to one or more other base stations 105 (e.g., base station 105-g). For instance, base station 105-g may be an aggressor base station 105-g. The network controller 455 may access the database 450 to identify a previously-detected victim-aggressor relationship 420 between aggressor base station 105-g and each of base stations 105-d, 105-e, and 105-f, due to aggressor base station 105-g having caused remote interference to victim base stations 105-d, 105-e, and 105-f in the past.

Each of reference signal sequence 405, reference signal sequence 410, and reference signal sequence 415 may carry a unique identifier (ID) assigned to a base station 105, a cell, or a group of base stations 105. In some examples, a network controller 455 may configure additional cells or groups of cells (second cells) to simultaneously transmit reference signal sequences (second sequences) to other cells. The reference signal sequences may each carry another unique ID. That is, the network controller 455 may configure each of base station 105-d, base station 105-e, and base station 105-f to send, respectively, reference signal sequence 405, reference signal sequence 410, and reference signal sequence 415. Each of reference signal sequence 405, reference signal sequence 410, and reference signal sequence 415 may carry unique identifiers corresponding to, respectively, base station 105-d, base station 105-e, and base station 105-f.

A network controller 445 may determine, based on previously detected victim-aggressor relationships 420 stored at network database 450, that base station 105-g has a victim-aggressor relationship with each of base station 105-d, base station 105-e, and base station 105-f. In such examples, when aggressor base station 105-g causes remote interference to base station 105-d, base station 105-e, and base station 105-f, network controller 445 may identify aggressor base station 105-f based on the previously detected victim-aggressor relationship stored at network database 450, allocate reference signal sequences 405, 410, and 415 to base station 105-d, base station 105-e, and base station 105-f, respectively, and base station 105-d, base station 105-e, and base station 105-f may send reference signals with the allocated reference signal sequences 405, 410, and 415 to aggressor base station 105-g.

The network controller 455 may allocate reference signal sequence 405, reference signal sequence 410, and reference signal sequence 415 to base station 105-d, base station 105-e, and base station 105-f based on the previously detected victim-aggressor relation in such a way that interference between the detection of reference signal sequence 405, reference signal sequence 410, and reference signal sequence 415 is within an acceptable range (e.g., small or negligible). That is, the network controller 455 may allocate reference signal sequence 405, reference signal sequence 410, and reference signal sequence 415 to decrease or limit cross-correlation between reference signal sequence 405, reference signal sequence 410, and reference signal sequence 415. In some examples, the network controller 455 may allocate reference signal sequence 405, reference signal sequence 410, and reference signal sequence 415 in non-overlapping time and frequency resources. In such examples, base station 105-g may receive reference signal sequence 405, reference signal sequence 410, and reference signal sequence 415 and may successfully decode each reference signal sequence. Having received reference signal sequence 405, reference signal sequence 410, and reference signal sequence 415 and decoded the unique identifiers corresponding to base station 105-d, base station 105-e, and base station 105-f, base station 105-g may perform RIM. In some examples, one or more of base station 105-d, base station 105-e, and base station 105-f may also perform RIM.

A network controller 455 may store previously detected victim-aggressor relationships between cells in database 450 (e.g., store a record that includes one or more pairs of cell identifiers corresponding to a victim cell and one or more aggressor cells). Network controller 455 may access the previously detected victim-aggressor relationships 420 from the database 450. Network controller 455 may access the database 450 to determine how to allocate reference signal sequence 405, reference signal sequence 410, and reference signal sequence 415. As described herein, multiple base stations (e.g., base station 105-d, base station 105-e, and base station 105-f) may transmit reference signal sequences to one base station (e.g., base station 105-g). Each of reference signal sequence 405, reference signal sequence 410, and reference signal sequence 415 may carry a unique identifier assigned to the transmitting base station 105-d, base station 105-d, and base station 105-e. In some examples, base station 105-d, base station 105-e, and base station 105-f, may have individual identifiers, or may be in one or more groups of cells (e.g., where the network uses a cell grouping technique).

Figure 14:
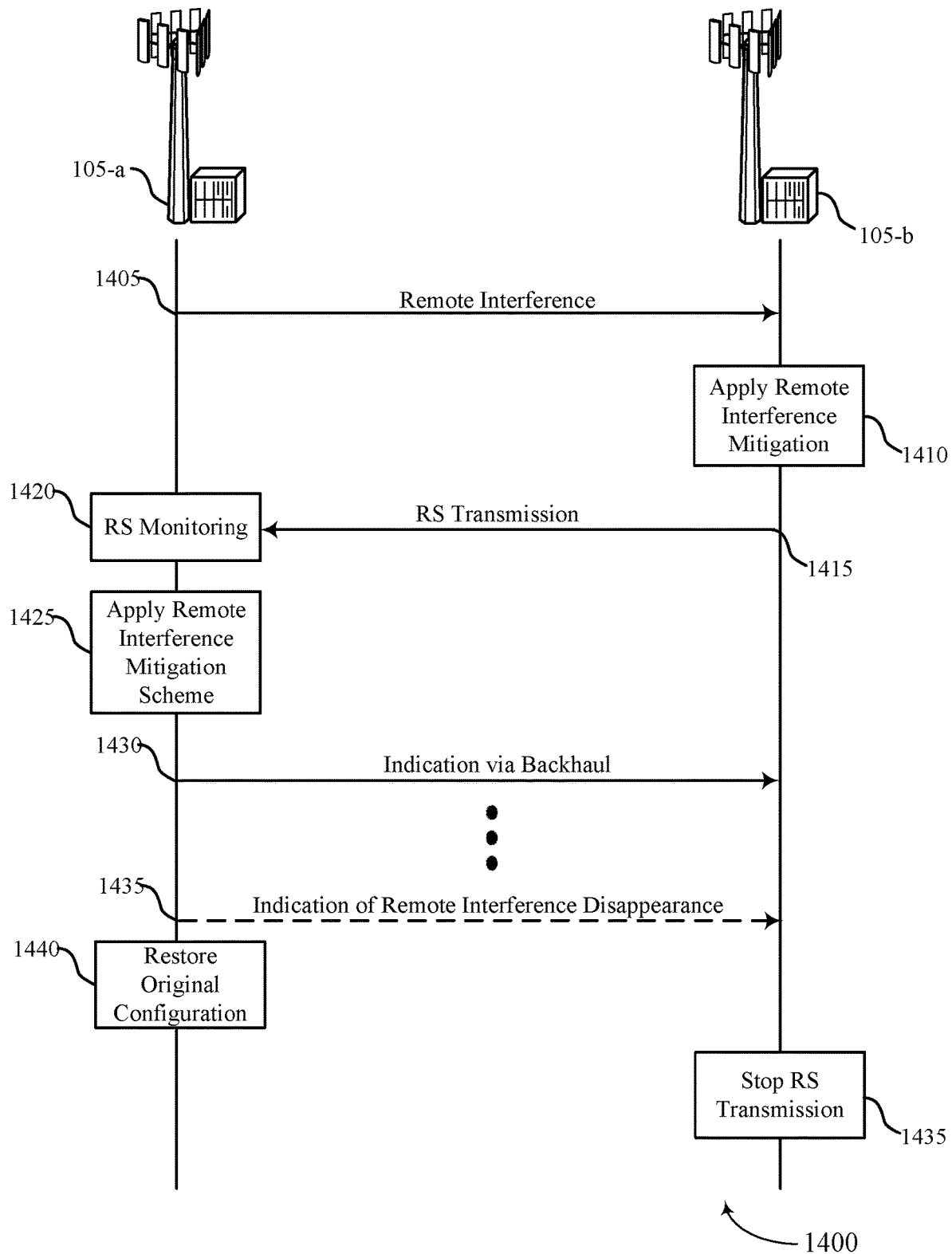
FIG. 14 illustrates an example of a process flow that supports enhancement by victim-aggressor relationship in accordance with aspects of the present disclosure.
Figure 15:
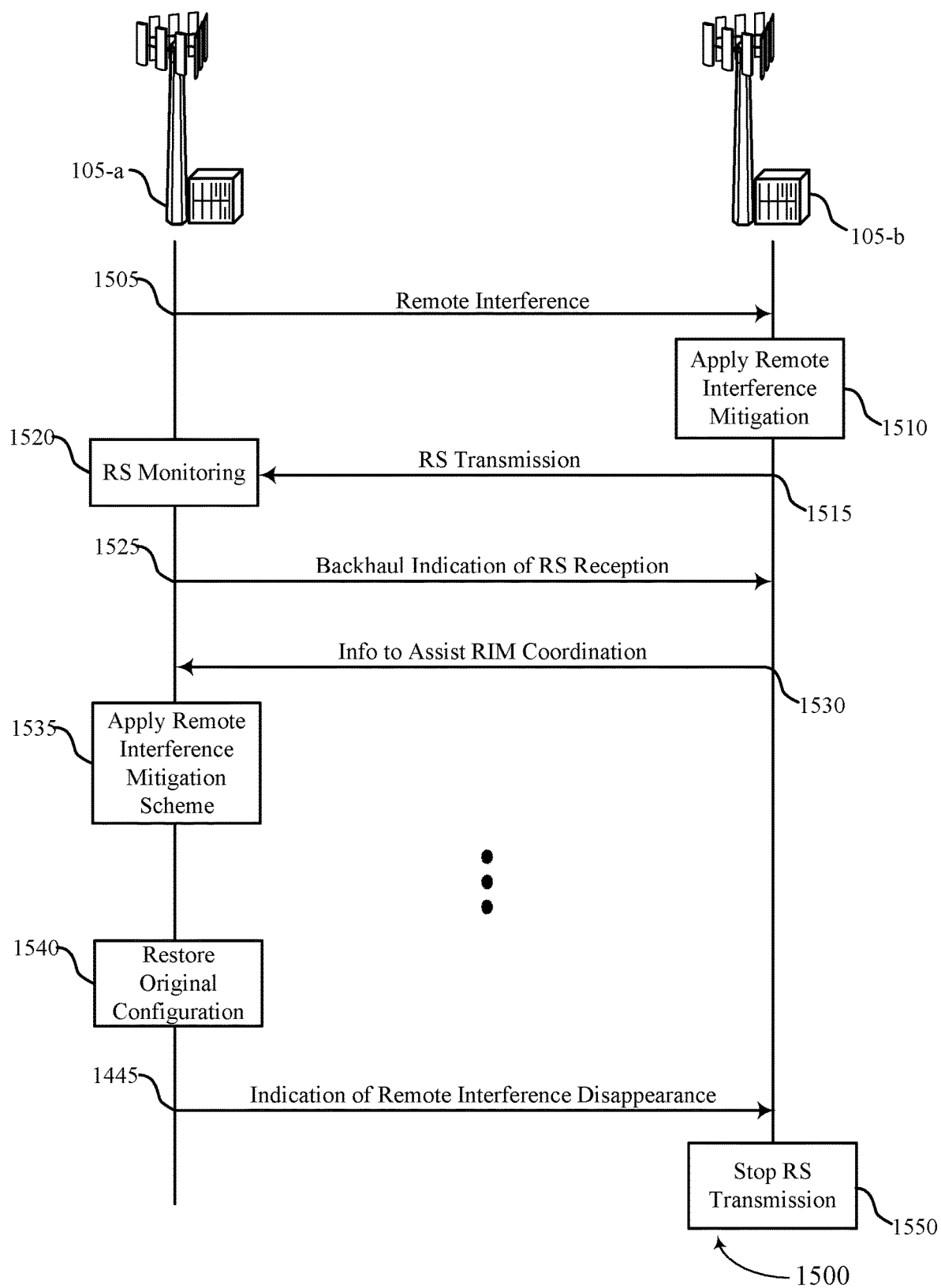
FIG. 15 illustrates an example of a process flow that supports enhancement by victim-aggressor relationship in accordance with aspects of the present disclosure.

In some examples a victim base station 105 may operate in a framework such as framework 2.1 and 2.2 (as described in greater detail with respect to FIGS. 14 and 15). For example, once victim base station 105-d identifies remote interference (e.g., observes "sloping" like IoT), victim base station 105-d starts to transmit its allocated reference signal sequence to one or more aggressor cell(s) (e.g., base station 105-g), and the allocated reference signal sequence carries an ID assigned to the victim base station 105-d. Victim base station 105-d may send reference signals to the same remote base station 105 (e.g., base station 105-g) that is causing the interference, or may send the reference signals to a different aggressor base station 105. There may be another victim cell (e.g., victim base station 105-e) transmitting its allocated reference signal sequence to the same aggressor cell(s). In this example, the network controller 445 may allocate the respective reference signal sequences within different time/frequency resources based on previously detected victim-aggressor relationships so that aggressor base station 105-g may be able to detect the two reference signal sequences in non-overlapping time/frequency resources, so that transmission of the two reference signal sequences do not interfere, or do not substantially interfere, with each other. In another example, the network controller 445 may allocate the respective reference signal sequences within different CDM pattern resources based on previously detected victim-aggressor relationships so that aggressor base station 105-g may be able to detect the two reference signal sequences in non-overlapping CDM pattern resources, so that transmission of the two reference signal sequences do not interfere, or do not substantially interfere, with each other.

Figure 5:
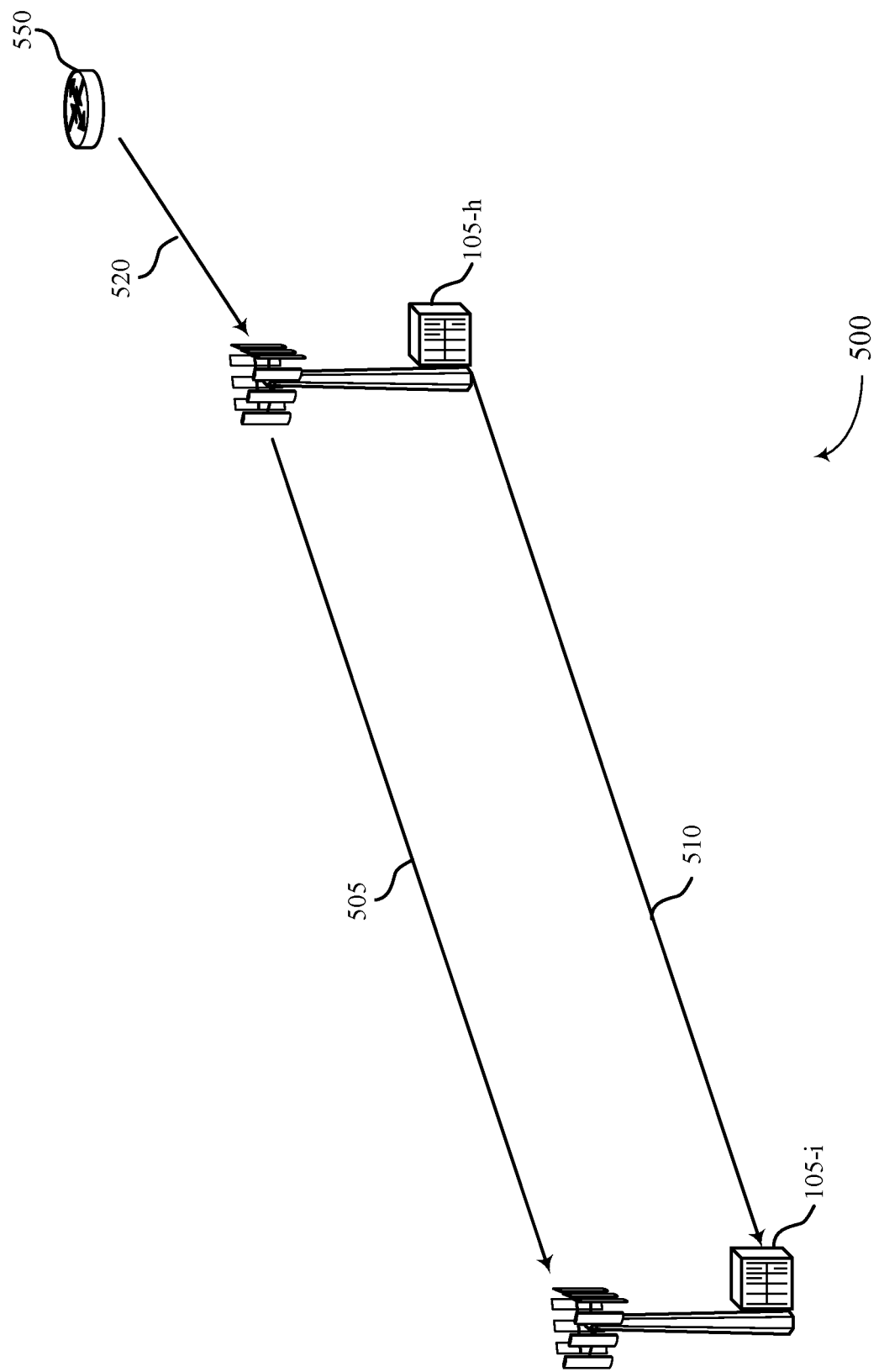
FIG. 5 illustrates an example of a fast monitoring procedure that supports enhancement by victim-aggressor relationship in accordance with aspects of the present disclosure.

FIG. 5 illustrates an example of a fast monitoring procedure 500 that supports enhancement by victim-aggressor relationship in accordance with aspects of the present disclosure. In some examples, fast monitoring procedure 500 may implement aspects of wireless communications system 100. Fast monitoring procedure 500 may include a base station 105-h, which may be an examples of a victim of remote interference, and a base station 105-g, which may be an example of an aggressor base stations, as well as a network database 550, all of which may be examples of corresponding devices with respect to FIG. 1.

In some examples of a RIM framework, a victim base station 105-h may be configured to transmit a reference signal upon detecting remote interference. Potential aggressor cells (e.g., a base station 105-$i$) may be configured to monitor for and detect reference signals, and perform RIM procedures based on the received reference signals. In one example of a conventional procedure, an operations, administration, and management (OAM) component of the network (e.g., a component of network controller 455) may configure potential aggressor base stations 105-$i$ to always or continuously monitor for reference signals. To avoid excessive overhead for the always-on or continuous reference signal monitoring, the OAM component of a network may configure the reference signal monitoring with a low density (e.g., with a long periodicity).

In another example of a conventional procedure, a potential aggressor base station 105-$i$ may detect remote interference power or a remote interference pattern from at least one victim base station 105-$h$, and may initiate reference signal monitoring based thereon. Base station 105-$i$ may monitor for an interference power level within a detection window, and determine whether a detected interference power level satisfies a threshold (e.g., interference power is less than a threshold). If the threshold is not satisfied, the base station 105-$i$ may activate interference mitigation. In another example, an interference pattern may correspond to downlink transmission power in two or more symbols (e.g., consecutive symbols) by two or more aggressors, and the base station 105-$i$ may determine whether a particular pattern (e.g., a power slope in consecutive symbols) can be detected. If the interference pattern is detected, then the base station 105-$i$ may activate interference mitigation. The detection window may be a first few uplink symbol periods of uplink transmission 210 that occur after a downlink to uplink guard period (see also FIG. 2). For example, the detection window may be one, two, three, four, etc., symbol periods of the uplink transmission 210 that occurs after the guard period. A victim base station 105-$h$ may similarly monitor for interference power level and/or an interference pattern for identifying remote interference. However, if interference from victim base station 105-$h$ is not strong, then base station 105-$i$ may not be able to detect the interference power or the interference pattern (which is a non-coherent detection) even if base station 105-$h$ can detect remote interference from aggressor base station 105-$i$ (which is a coherent detection that requires low power).

In such examples, where aggressor base station 105-$i$ does not sense the remote interference from victim base station 105-$h$, aggressor base station 105-$i$ may not initiate reference signal monitoring, may not receive the reference signal (or may receive the reference signal after a long delay) and may not initiate RIM procedures. Additionally, or alternatively, reference signal monitoring configured by the OAM component may have a low density (e.g., a relatively long period of time elapses between each instance of reference signal monitoring occurs) resulting in long reference signal detection latency. Without additional information (e.g., previously detected victim-aggressor relationships) an aggressor base station 105-$i$ may monitor for and detect a large number of configured reference signals within a network (e.g., all configured reference signals transmitted by base stations within a defined distance), which may result in a long reference signal detection latency.

As described in greater detail below, utilizing previously detected victim-aggressor relationships, which may be stored at database 550, to identify aggressor base station 105-$i$ and trigger reference signal monitoring at aggressor base station 105-$i$ may decrease reference signal detection latency, or increase the probability that aggressor base station 105-$i$ will detect a reference signal transmitted by victim base station 105-$h$, or both.

First base station 105-$h$ may be a victim base station 105, and may detect remote interference from a second base station 105-$i$, which may be an aggressor base station. Second base station 105-$i$ may cause remote interference at first base station 105-$h$. In some examples, second base station 105-$i$ may have caused remote interference in the past, and a victim-aggressor relationship between first base station 105-$h$ and second base station 105-$i$ may be stored in database 550.

In some examples, previously detected victim-aggressor relationships may be used to achieve faster and more reliable triggering of reference signal monitoring at one or more base stations 105 of a second cell. That is, second base station 105-$i$ may not receive a transmitted reference signal 505 if it has not initiated reference signal monitoring, or may cause unacceptable latency in detecting reference signal 505 if it is monitoring for reference signals from a large number (e.g., all within a defined distance)) base stations 105 in a network. However, if it is triggered to initiate reference signal monitoring for victim base station 105-$i$, aggressor base station 105-$i$ may monitor for and receive reference signal 505. When certain conditions are satisfied (e.g., remote interference is detected), a first base station 105-$h$ may transmit reference signal 505 (e.g., to the base station 105 that is causing the interference, or to another base station). For instance, reference signal 505 may be an over the air transmission (e.g., transmitted via a wireless channel). First base station 105-$h$ may also send a request 510 to base stations 105 that have been identified as aggressor cells (such as second base station 105-$i$), triggering monitoring for reference signals at the second base station 105-$i$. In some examples, first base station 105-$h$ may send request 510 directly to second base station 105-$h$ via a backhaul link.

Second base station 105-$i$ may receive request 510 from first base station 105-$h$, and may perform one or more actions based thereon. For example, if an operations, administration, and management (OAM) component of the network has configured reference signal monitoring at second base station 105-$i$ (e.g., of a second cell) or if second base station 105-$i$ detect interference power or an interference pattern and started reference signal monitoring, then the second base station 105-$i$ may prioritize (e.g., detect the reference signal before reference signals transmitted by other base stations 105) the monitoring of the specific reference signal transmitted by first base station 105-$h$ (i.e., the first base station 105-$h$ that sent request 510 to second base station 105-$i$) or detect reference signal 505 for frequency (e.g., reduce the monitoring periodicity). In such examples, if second base station 105-$h$ does not detect reference signal 505 after a period of time, then second base station 105-$h$ may de-prioritize the monitoring of reference signals 505 sent from first base station 105-$h$, or reduce or stop the reference signal monitoring density, or both. That is, second base station 105-$h$ may decrease the amount of times it monitors for reference signals during a period of time, or may decrease the periodicity with which it monitors for reference signals.

In some examples, if second base station 105-$i$ has not started monitoring any reference signals because OAM has not configured second base station 105-$i$ to perform monitoring, or if the second base station 105-$i$ has not detected an interference power or interference pattern, then the second base station 105-$i$ may start detecting at least reference signal 505 transmitted by a first cell (e.g., base station 105-$h$) that sent request 510. In such examples, if second base station 105-*i* does not detect reference signal 505 after a period of time, it may stop detecting reference signal 505 or stop detecting any reference signal or reduce the reference signal monitoring density. The fast reference signal monitoring mechanism may also apply if UEs 115 of a second cell associated with second base station 105-*i* detect reference signal 505.

Figure 6:
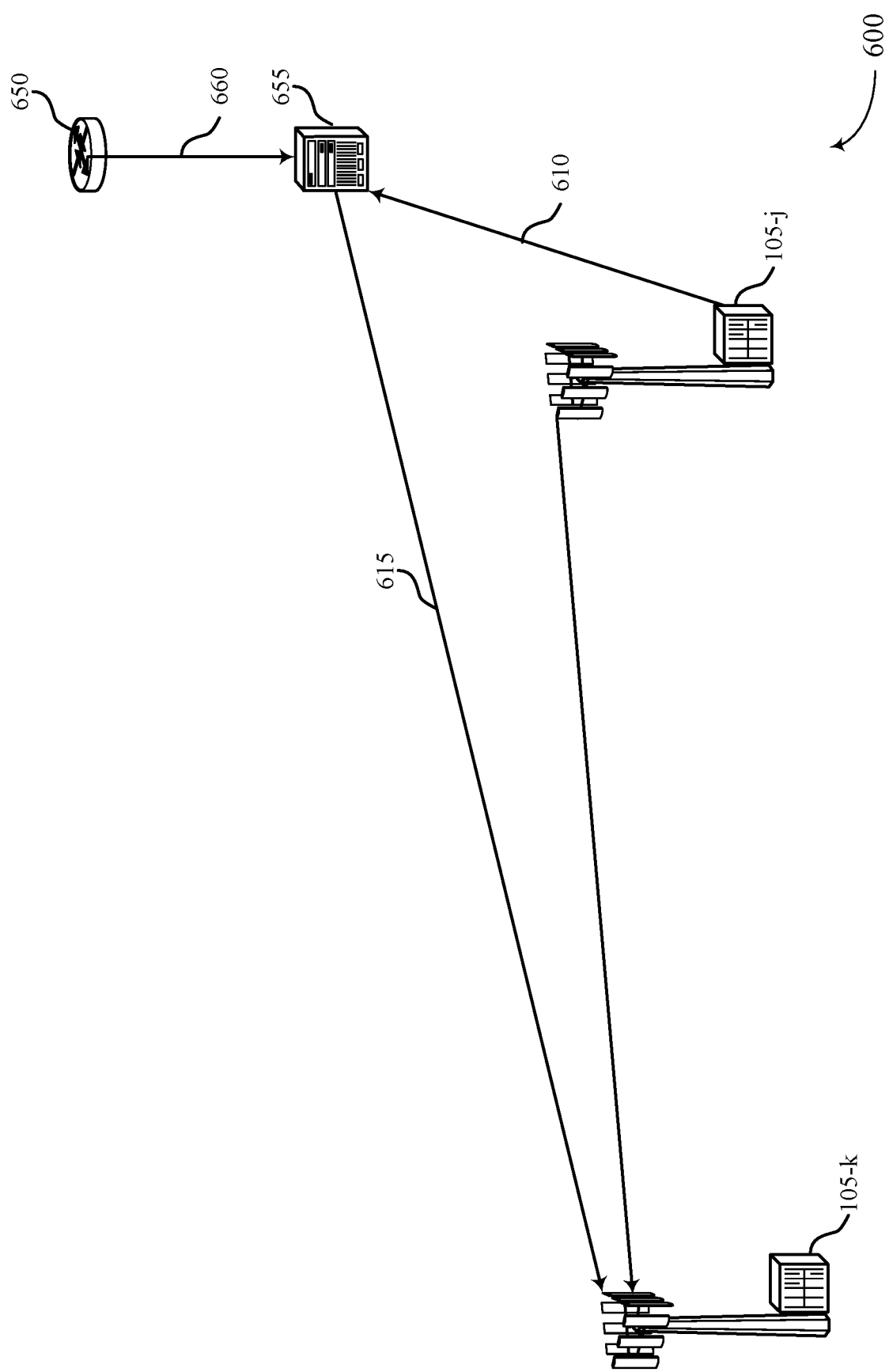
FIG. 6 illustrates an example of a fast monitoring procedure that supports enhancement by victim-aggressor relationship in accordance with aspects of the present disclosure.

FIG. 6 illustrates an example of a fast monitoring procedure 600 that supports enhancement by victim-aggressor relationship in accordance with aspects of the present disclosure. In some examples, fast monitoring procedure 600 may implement aspects of wireless communications system 100. Fast monitoring procedure 600 may include a base station 105-*j*, which may be an examples of a victim of remote interference, and a base station 105-*k*, which may be an example of an aggressor base stations, as well as a network database 650, and a network controller 655, all of which may be examples of corresponding devices with respect to FIG. 1.

In some examples of a RIM framework, a victim base station 105-*j* may be configured to transmit a reference signal upon detecting remote interference. Potential aggressor cells (e.g., base station 105-*k*) may be configured to monitor for and detect reference signals, and perform RIM procedures based on the received reference signals. In one example of a conventional procedure, an OAM procedure may configure potential aggressor base stations 105-*i* to always or continuously monitor for reference signals. To avoid excessive overhead for the always-on or continuous reference signal monitoring, the OAM procedure may configure the reference signal monitoring with a low density (e.g., with a long periodicity).

In another example of a conventional procedure, a potential aggressor base station 105-*k* may detect remote interference power or a remote interference pattern from at least one victim base station 105-*j*, and may initiate reference signal monitoring based thereon. However, if interference from victim base station 105-*j* is not strong, then base station 105-*i* may not be able to detect the interference power or the interference pattern (which is a non-coherent detection) even if base station 105-*j* can detect remote interference from aggressor base station 105-*i* (which is a coherent detection that requires low power). In such examples, where aggressor base station 105-*k* does not sense the remote interference from victim base station 105-*j*, aggressor base station 105-*k* may not initiate reference signal monitoring, may not receive the reference signal (or may receive the reference signal after a long delay) and may not have the chance to perform subsequent RIM steps.

Additionally, or alternatively, reference signal monitoring configured by OAM procedures to have a low density may result in long reference signal detection latency. Without additional information (e.g., previously detected victim-aggressor relationships) an aggressor base station 105-*i* may monitor for and detect all configured reference signals within a network, which may result in a long reference signal detection latency.

As described in greater detail below, utilizing previously detected victim-aggressor relationships, which may be stored at database 650, to identify aggressor base station 105-*i* and trigger reference signal monitoring at aggressor base station 105-*i* may decrease reference signal detection latency, or increase the probability that aggressor base station 105-*i* will detect a reference signal transmitted by victim base station 105-*h*, or both.

First base station 105-*j* may be a victim base station 105, and may detect remote interference from a second base station 105-*k*. In some examples, second base station 105-*k* may have caused remote interference in the past, and a victim-aggressor relationship between first base station 105-*j* and second base station 105-*k* may be stored in network database 650.

In some examples, previously detected victim-aggressor relationships may be used to achieve faster and more reliable triggering of reference signal monitoring at one or more aggressor base stations 105. When remote interference is identified, a first base station 105-*j* may transmit reference signal 605. In some cases, reference signal 605 may be an over the air transmission. First base station 105-*j* may also request that base stations 105 which have been identified as aggressor cells (such as second base station 105-*k*), begin monitoring for reference signals.

In some examples, first base station 105-*j* may send request 610 via a backhaul link to network controller 655. Network controller 655 may receive indication 660 of previously detected victim-aggressor relationships. Network controller 655 may forward request 615 to second base station 105-*k* that has a previously detected victim-aggressor relationship with first base station 105-*j*. In some examples, network controller 655 may maintain database 650 of previously detected victim-aggressor relationships between cells or base stations 105. If the network has no access to previously detected victim-aggressor relationship information then first base station 105-*j* may provide this information to network controller 655. For instance, first base station 105-*j* may send report information associated with reference signal 605, indication 660, or both, to network controller 655. In some examples, first base station 105-*j* may maintain its own local database of victim-aggressor relationships. In such examples, first base station 105-*j* may send request 610 and victim-aggressor relationship information to network controller 655. In some examples, victim-aggressor relationships may be stored or updated in a database 650, as described in greater detail with respect to FIG. 7.

Figure 7:
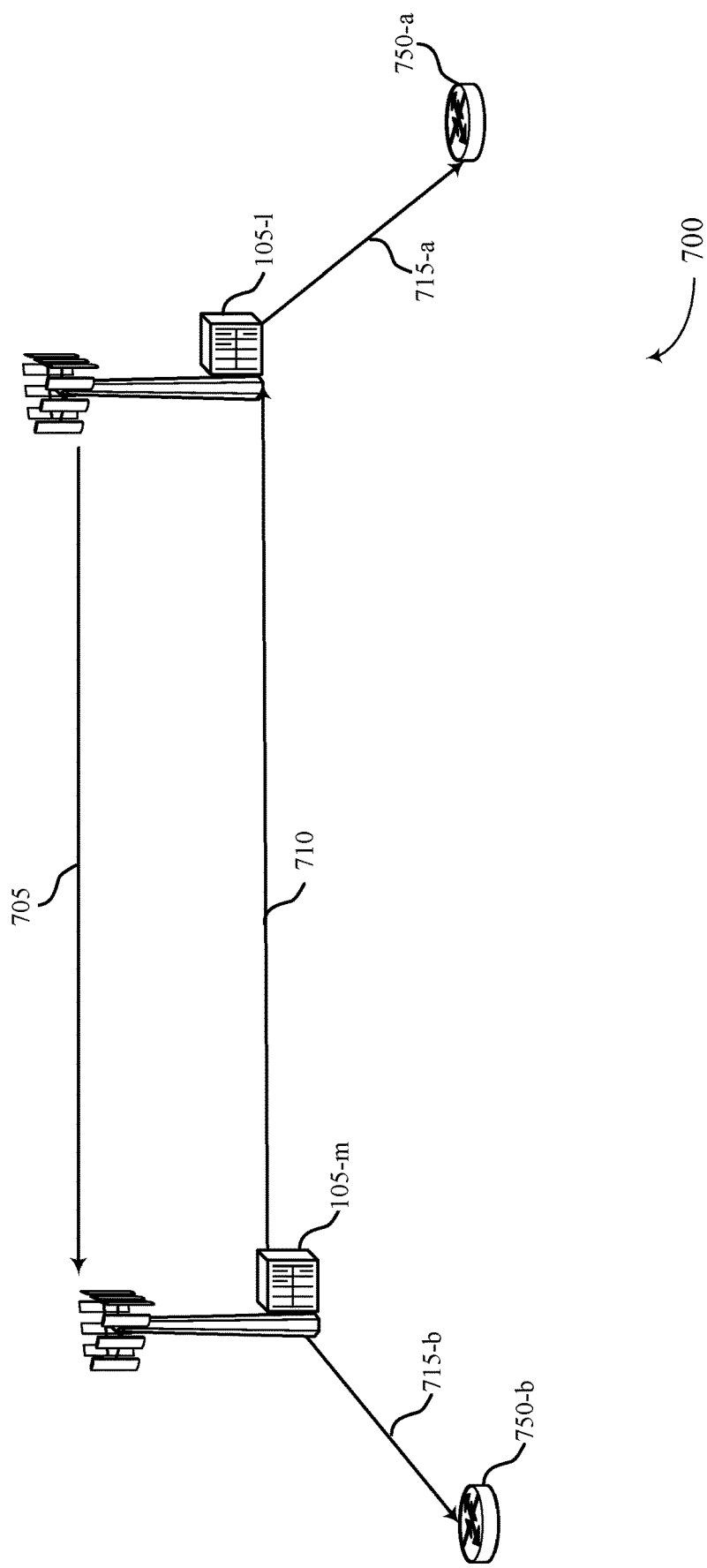
FIG. 7 illustrates an example of a victim-aggressor relationship storage scheme that supports enhancement by victim-aggressor relationship in accordance with aspects of the present disclosure.

FIG. 7 illustrates an example of a victim-aggressor relationship storage scheme 700 that supports enhancement by victim-aggressor relationship in accordance with aspects of the present disclosure. In some examples, victim-aggressor relationship storage scheme 700 may implement aspects of wireless communications system 100. Victim-aggressor relationship storage scheme 700 may include a base station 105-*l*, which may be an example of a victim of remote interference, and a base station 105-*m*, which may be an example of an aggressor base stations, as well as local databases 750, all of which may be examples of corresponding devices with respect to FIG. 1.

In some examples, a base station 105 may cause remote interference at another base station 105. Other base stations 105 may not cause remote interference. As time passes, the base station 105 that has caused remote interference at another base station 105 in the past is more likely to cause remote interference again than other base stations 105. Identifying such aggressor base stations 105 and their relationships to victim base stations 105 may enhance RIM procedures, as described herein. Victim-aggressor relationship information 715 may be stored locally in databases 750.

In some examples, second base station 105-*m* may detect a reference signal 705 transmitted from first base station 105-*l*. For example, first base station 105-*l* may be a victim base station 105, and may detect remote interference from second base station 105-*m*. In response, first base station 105-*l* may transmit a reference signal 705. Reference signal 705 may carry an identifier assigned to first base station 105-*l*. Second base station 105-*m* may receive reference signal 705, including the identifier, and may obtain a victim-aggressor relationship between first base station 105-*l* and second base station 105-*m*. In such examples, second base station 105-*m* may update database 755. That is, base station may send victim-aggressor relationship information 715-*b* to local database 750-*a*. In some examples, first base station 105-*l* and second base station 105-*m* may not have a previous aggressor-victim relationship recorded in the database. In such examples, first base station 105-*l* may not have sent a request to trigger fast reference signal monitoring at second base station 105-*m*. Reference signal monitoring at second base station 105-*m* may have been triggered by, for example, a conventional procedure (e.g., OAM configured reference signal monitoring, or reference signal monitoring based on detected interference power or a detected interference pattern).

If victor-aggressor relationships stored in database 750 does not include a victim-aggressor relationship (e.g., a victim-aggressor pair including the identifier for the first base station 105-*l* and the second base station 105-*m*) or equivalent information that indicates the victim-aggressor relationship between the first base station 105-*l* and the second base station 105-*m*, then this information may be added to local database 750. If the victim-aggressor database has already included the victim-aggressor relationship between first base station 105-*l* and second base station 105-*m*, then related victim-aggressor relationship information 715 may be updated. For example, a counter of interference occurrences between first base station 105-*l* and second base station 105-*m* may be incremented for a database record of the previously-de victim-aggressor relationship, the probability of the occurrence of remote interference between first base station 105-*l* and second base station 105-*m* that reflects how often remote interference occurs between first base station 105-*l* and second base station 105-*m* may be updated for the database record, or the like, or any combination thereof.

In some examples, victim-aggressor relationship information may be stored locally at each cell or base station 105 in a network. First base station 105-*l* may transmit reference signal 705 to second base stations 105-*m*, as described in greater detail with respect to, for example, FIG. 6. Second base stations 105-*m* may receive reference signal 705, and may update local database 750-*b*. For instance, second base station 105-*m* may receive reference signal 705, identify first base station 105-*l* as a victim base station 105, and may send victim-aggressor relationship information 715-*b* to local database 750-*b*. Similarly, upon detecting remote interference, or upon receiving a reference signal 710 (as described in greater detail with respect to FIG. 9) first base station 105-*l* may identify second base station 105-*m* as an aggressor base station 105, and may send victim-aggressor relationship information 715-*a* to local database 750-*a*. If, for example, base station 105-*m* is one of multiple base stations 1-05 in a group sharing a group identifier (e.g., the identifier that is carried by reference signal 705), then a local database 750-*a* or 750-*b* may be maintained and shared on a cell group level or base station 105 group level.

Figure 8:
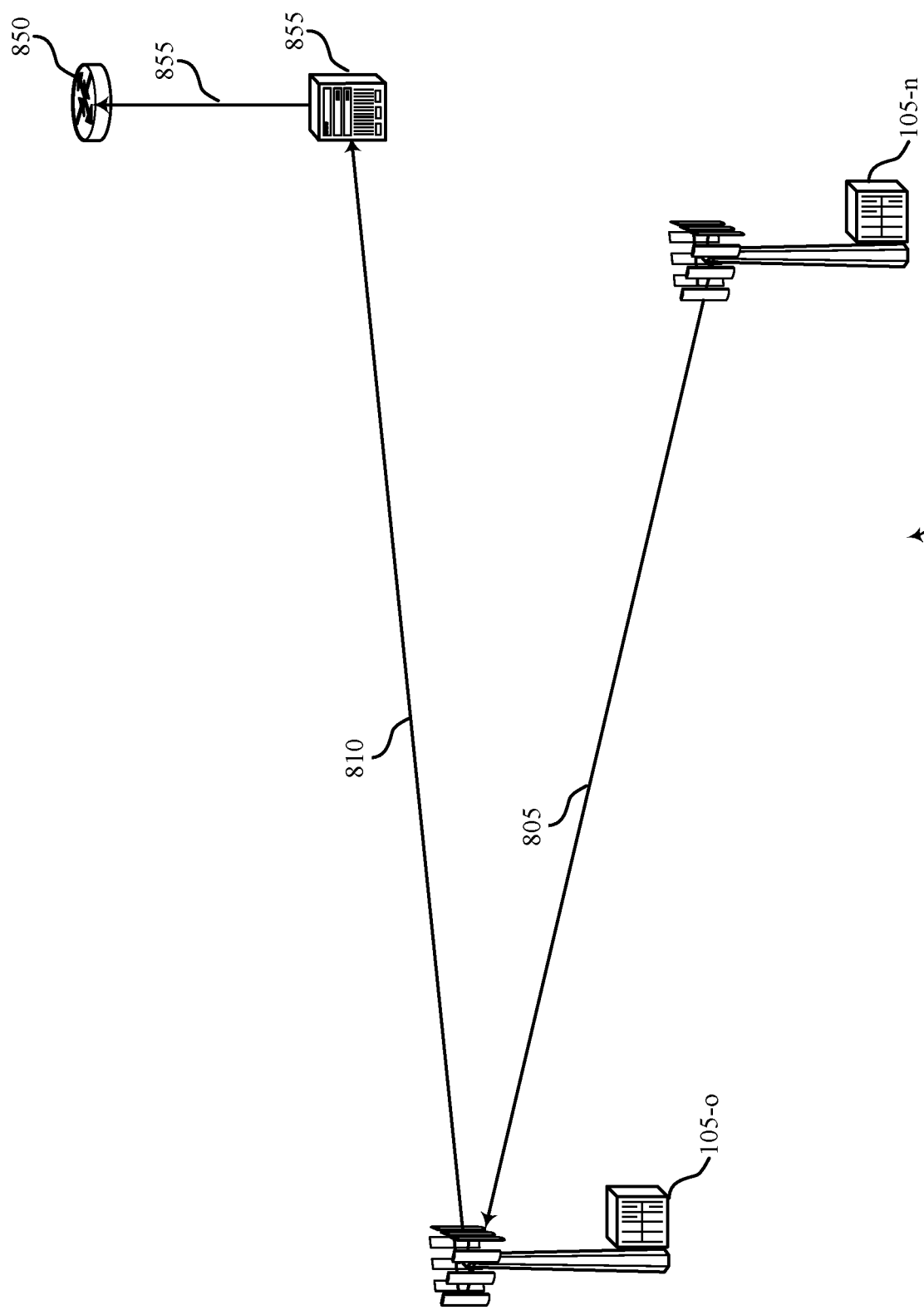
FIG. 8 illustrates an example of a victim-aggressor relationship storage scheme that supports enhancement by victim-aggressor relationship in accordance with aspects of the present disclosure.

FIG. 8 illustrates an example of a victim-aggressor relationship storage scheme 800 that supports enhancement by victim-aggressor relationship in accordance with aspects of the present disclosure. In some examples, victim-aggressor relationship storage scheme 800 may implement aspects of wireless communications system 100. Victim-aggressor relationship storage scheme 800 may include a base station 105-*n*, which may be an example of a victim of remote interference, and a base station 105-*o*, which may be an example of an aggressor base station, as well as a network database 850, and a network controller 855, all of which may be examples of corresponding devices with respect to FIG. 1.

In some examples, victim-aggressor relationship information may be stored at network database 850, as opposed to a local database 750, as described with respect to FIG. 7. First base station 105-*n* may transmit reference signal 805 to second base stations 105-*o*, as described in greater detail with respect to, for example, FIG. 6. Second base stations 105-*o* may receive reference signal 805, and may identify first base station 105-*n* as a victim base station 105, and may send victim-aggressor information 810 network controller 855. Network controller 855 may forward victim-aggressor information 815 to network database 850. Similarly, upon detecting remote interference, or upon receiving a reference signal (as described in greater detail with respect to FIG. 9) first base station 105-*n* may identify second base station 105-*o* as an aggressor base station 105, and may send victim-aggressor relationship information (e.g., may send report information, including or based on reference signal 805) to network controller 855. If, for example, base station 105-*o* is one of multiple base stations 105 in a group with a group identifier or a group of cells with a group identifier (e.g., the identifier that is carried by reference signal 805) and the group identifier is a single group identifier assigned to the cell group, then a network database 850 may be maintained and shared on a cell group level or base station 105 group level.

Figure 9:
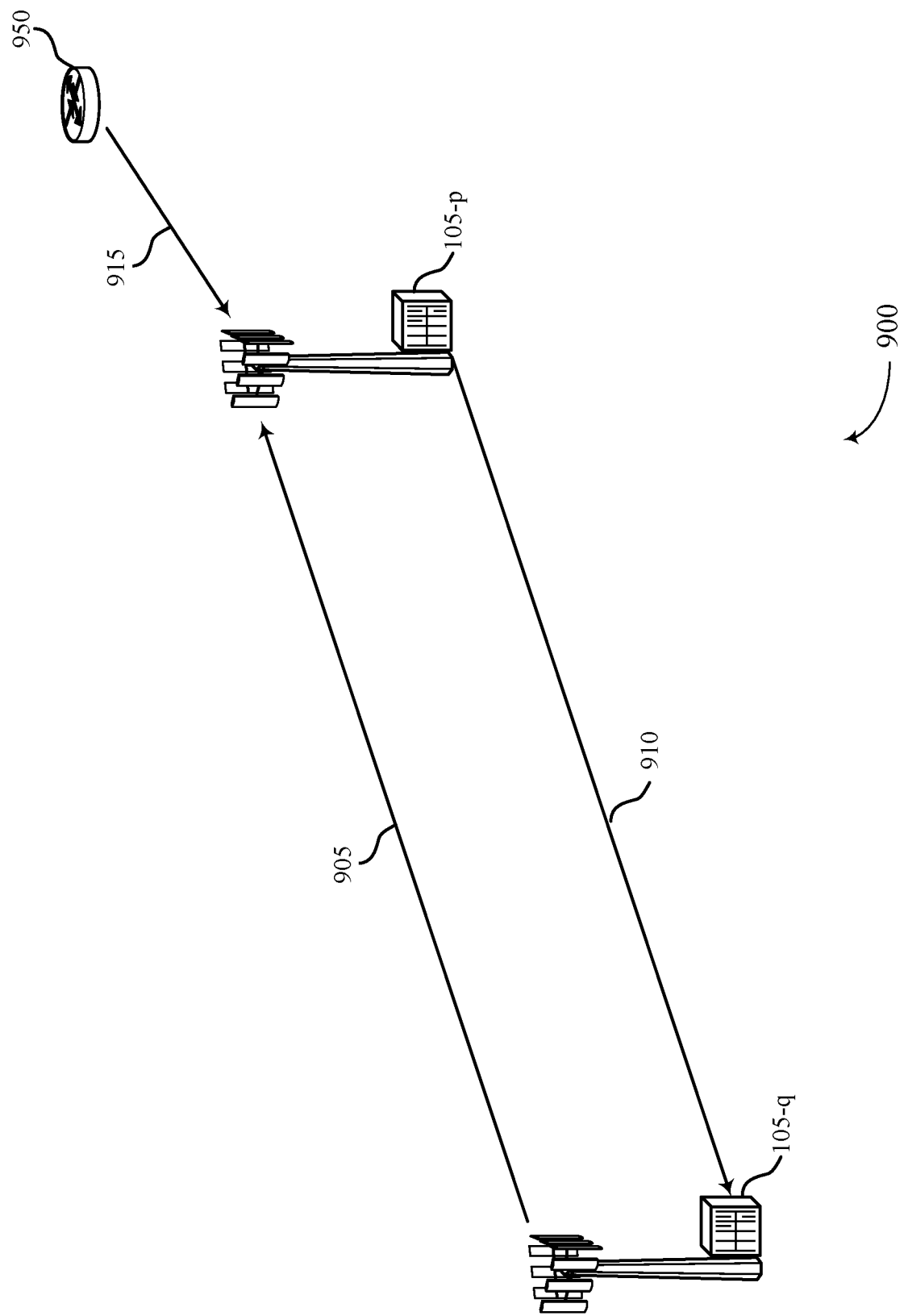
FIG. 9 illustrates an example of a fast transmitting procedure that supports enhancement by victim-aggressor relationship in accordance with aspects of the present disclosure.

FIG. 9 illustrates an example of a fast transmission procedure 900 that supports enhancement by victim-aggressor relationship in accordance with aspects of the present disclosure. In some examples, fast transmission procedure 900 may implement aspects of wireless communications system 100. Fast transmission procedure 900 may include a base station 105-*p*, which may be an example of a victim of remote interference, and a base station 105-*q*, which may be an example of an aggressor base station, as well as a network database 950, all of which may be examples of corresponding devices with respect to FIG. 1.

In some examples of an RIM framework (e.g., in some conventional approaches), second base station 105-*q* may transmit a reference signal 905 over the air to first base station 105-*p* upon reception of an over the air or broadcast backhaul request signal from first base station 105-*p*. For instance, first base station 105-*p* may receive interference from second base station 105-*q*. First base station 105-*p* may send a request 910 to trigger transmission of reference signal 905 from second base station 105-*q*.

When first base station 105-*p* receives reference signal 905, first base station 105-*p* may use reference signal 905 to identify second base station 105-*q*, measure the interference channel from the second base station 105-*q* to the first base station 105-*p*, or both. First base station 105-*p* may send request 910 over the air, or through a backhaul link.

Upon reception of request 910, second base station 105-*q* may transmit reference signal 905 (e.g., immediately transmit or transmit in response to receiving request 910) or transmit the reference signal 905 after performing a few other RIM operations. However, in conventional approaches, if request 910 is sent by first base station 105-*p* over the air and interference from first base station 105-*p* to second base station 105-*q* is very weak, then second base station 105-*q* may not receive the over the air signal. In such cases, second base station 105-*q* may not transmit reference signal 905 in reply. As a result, the first base station 105-*p* may not have a chance to identify the second base station 105-*q* or measure the interference channel. Or, if request 910 is sent in a broadcast manner, up to all base stations 105 that receive the signal may send a reference signal 905 as a response even though not all of them are aggressor base stations 105 to first base station 105-*p*.

To avoid these problems, previously detected victim-aggressor relationship information may be used to trigger transmission of reference signal 905 to second base station 105-*q*. For instance, first base station 105-*p* may send request 910 to request that second base station 105-*q* (and any other base station 105 identified as a potential aggressor base station 105 based on previously detected victim-aggressor relationship information) transmit reference signal 905 when certain conditions are met. The request 910 may be sent over the air, or in a broadcast manner without targeting certain base stations 105. First base station 105-*p* may also send the request 910 to second base station 105-*q* based on having previously detected a victim-aggressor relationship between first base station 105-*p* and second base station 105-*q*. First base station 105-*p* may perform these actions prior to the conventional approach described above. In one example, first base station 105-*p* may send request 910 to second base station 105-*q* via a backhaul link.

Upon reception of request 910 from first base station 105-*p*, second base station 105-*q* may transmit a reference signal 905. When first base station 105-*p* receives reference signal 905, first base station 105-*p* may detect, from reference signal 905, an identifier assigned to the second base station 105-*q*, and may measure the reference signal 905 to determine the interference channel from the second base station 105-*q* to the first base station 105-*p*. First base station 105-*p* may send channel information through a backhaul link or over the air to second base station 105-*q*, and second base station 105-*q* may perform RIM.

If second base station 105-*q* has sent a reference signal 905, but does not receive interference channel information or any other response after a period of time from first base station 105-*p*, then second base station 105-*q* may stop transmitting reference signal 905. In some examples, this may indicate that remote interference did not occur between the two base stations 105 and/or is within an acceptable limit for remote interference.

In some examples, first base station 105-*p* may receive reference signal 905 from second base station 105-*q*, and may detect the identifier. from reference signal 905 assigned to the second base station 105-*q*, and may confirm that second base station 105-*q* and first base station 105-*p* have a victim-aggressor relationship at the current time. This information may be used to update the victim-aggressor relationship database 950, or a local database. For instance, base station 105-*p* may send victim-aggressor relationship information 915 to network database 950. In some examples, the base station 105-*p* may send report information (e.g., the identifier detected from the reference signal 905) to the network database 950.

Figure 10:
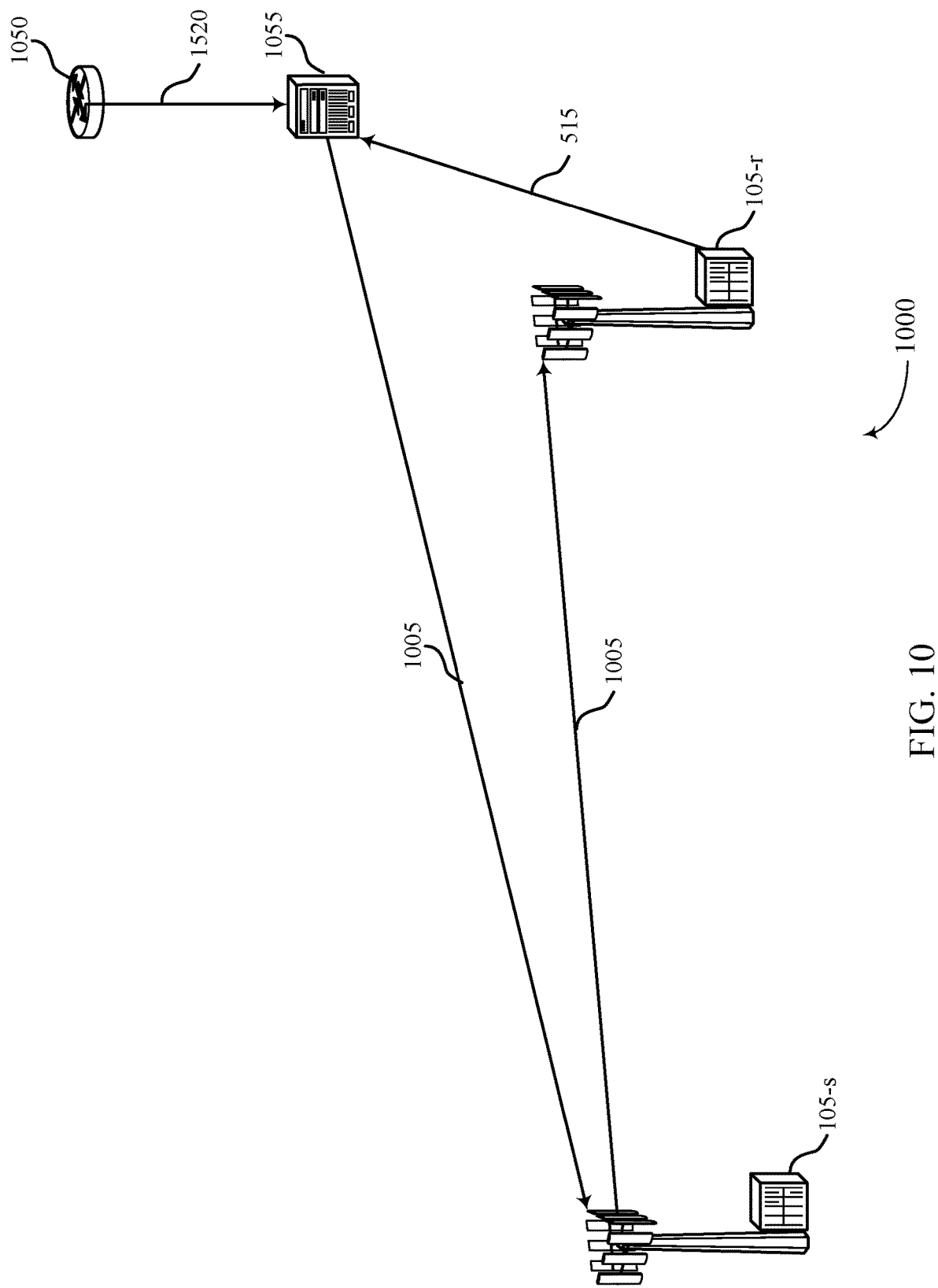
FIG. 10 illustrates an example of a fast transmitting procedure that supports enhancement by victim-aggressor relationship in accordance with aspects of the present disclosure.

FIG. 10 illustrates an example of a fast transmission procedure 1000 that supports enhancement by victim-aggressor relationship in accordance with aspects of the present disclosure. In some examples, fast transmission procedure 1000 may implement aspects of wireless communications system 100. Fast transmission procedure 1000 may include a base station 105-*r*, which may be an example of a victim of remote interference, and a base station 105-*s*, which may be an example of an aggressor base station, as well as a network database 1050, all of which may be examples of corresponding devices with respect to FIG. 1.

In some examples, as described above with respect to FIG. 9, a first base station 105-*r* may send request 1010 to second base station 105-*s* to send reference signal 1005. In some examples, first base station 105-*r* may send request 1010 via a backhaul link to network controller 1055. Network controller 1055 may forward request 1015 to second base station 105-*s*. In some examples, network controller 1055 may identify second base station 105-*s* as an aggressor base station 105 based on previously detected victim-aggressor relationship information 1020, which it may obtain from network storage 1050, or local storage. A network controller may maintain a database 1050 with previously detected victim-aggressor relationships. Or, first base station 105-*r* may provide the information that second base station 105-*r* has a previously detected victim-aggressor relationship with first base station 105-*s*.

Figure 11:
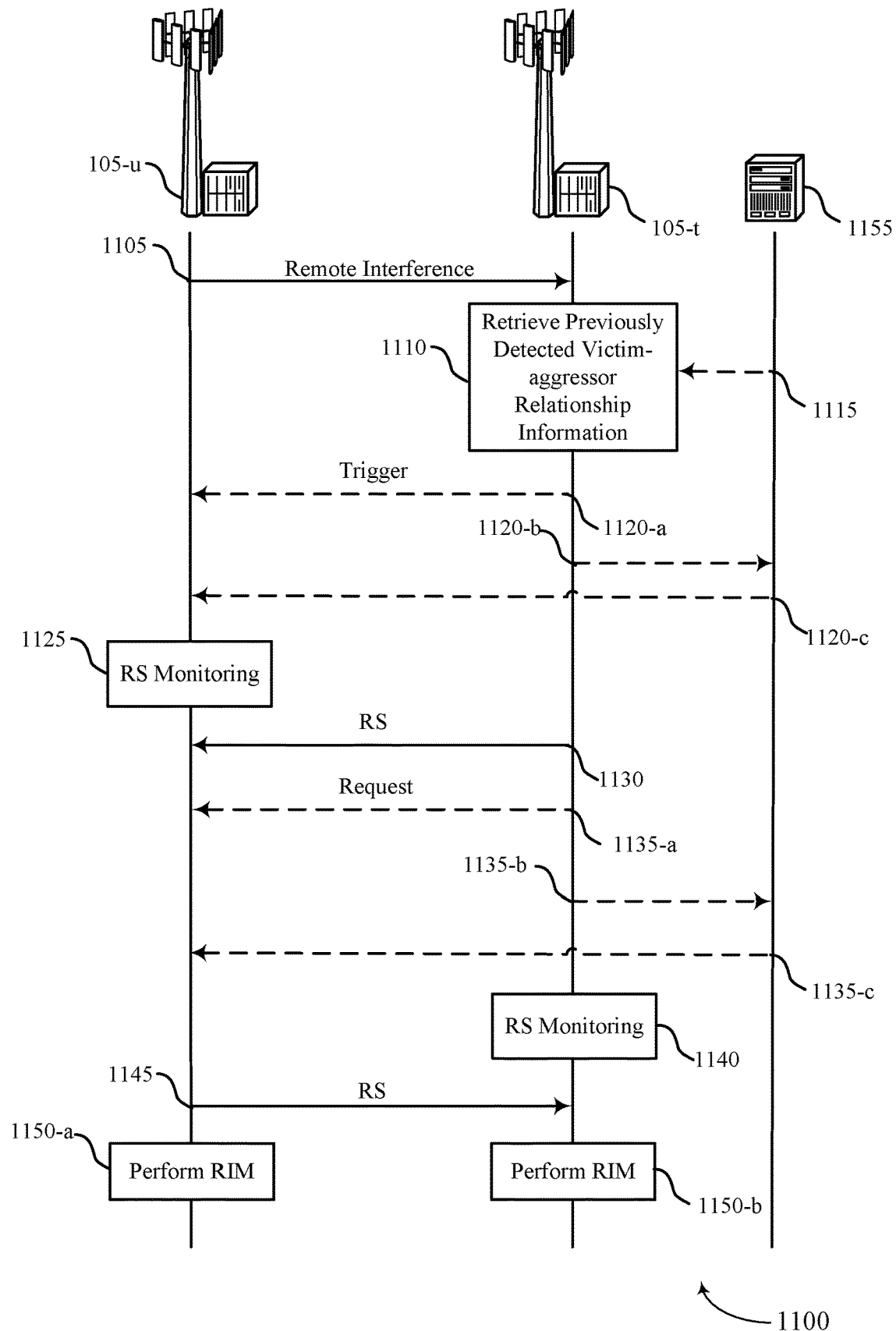
FIG. 11 illustrates an example of a process flow that supports enhancement by victim-aggressor relationship in accordance with aspects of the present disclosure.

FIG. 11 illustrates an example of a process flow 1100 that supports enhancement by victim-aggressor relationship in accordance with aspects of the present disclosure. In some examples, process flow 1100 may implement aspects of wireless communications system 100. Process flow 1100 may include a base station 105-*t*, which may be an example of a victim of remote interference, and a base station 105-*u*, which may be an example of an aggressor base station, as well as a network database 1155, all of which may be examples of corresponding devices with respect to FIG. 1.

At 1105, first base station 105-*t* (e.g., a victim base station 105 or a base station 105 corresponding to a first victim cell) may detect remote interference caused by second base station 105-*u*. For instance, first base station 105-*t* may identify that downlink transmissions from base station 105-*u* are causing interference to reception of uplink transmissions for a UE 115 served by first base station 105-*t*. For example, the first base station 105-*t* may monitor interference power, an interference pattern, or both, as described herein At 110, base station 105-*t* may retrieve an indication of previously detected victim-aggressor relationship (e.g., from a local or remote database). For instance, second base station 105-*u* may have caused remote interference in the past, and first base station 105-*t*, second base station 105-*u*, or both, may have identified a victim-aggressor relationship between first base station 105-*t* and second base station 105-*u*. In some examples, first base station 105-*t* may receive, from second base station 105-*u*, a relationship update indicating information related to previously detected victim-aggressor relationships, and may update a database record of previously detected victim-aggressor relationships in a local database, a network control 1155 database, or both, based on the relationship update.

If the victim-aggressor relationships were stored at a network storage database, then at 1115, network controller 1155 may send the indication of previously detected victim-aggressor relationships to first base station 105-*t*. Otherwise, first base station 105-*t* may retrieve the victim-aggressor relationships information from a local storage database.

At 1120, first base station 105-*t* may send a trigger, initiating reference signal monitoring at second base station 105-*u*. In one example, first base station 105-*t* may send an over the air transmission at 1120-*a*, triggering second base station 105-*u* to perform reference signal monitoring based on previously detected victim-aggressor relationships. For instance, first base station 105-*t* may identify second base station 105-*u* as a potentiation aggressor base station 105 based on the previous victim-aggressor relationship, and may send the trigger at 1120 based thereon.

In another example, first base station 105-*t* may send the request at 1120-*b*, via a backhaul link, to network controller

1155 requesting that the network controller 1155 second base station 105-*u* based on a previously detected victim-aggressor relationship, the trigger instructing second base station 105-*u* to perform reference signal monitoring. In such examples, network controller 1155 may receive the request to trigger reference signal monitoring by at least one remote base station, and may identify a previously detected victim-aggressor relationships and transmit, at 1120-*c*, the trigger, instructing second base station 105-*u* or other identified aggressor base stations 105 to perform reference signal monitoring.

At 1125, base station 105-*u* may perform reference signal monitoring based on the trigger, and at 1130, second base station 105-*u* may receive a reference signal transmitted by first base station 105-*t*.

In some examples, second base station 105-*ue* may take measurements regarding the interference channel, may identify first base station 105-*t* as a victim base station 105, may update victim-aggressor relationship information (e.g., store the updates internally or send them to a network controller 1155 database), may perform RIM at 1145-*a* based on the reference signal monitoring at 1125, or the like.

In some examples, at 1135, first base station 105-*a* may transmit a reference signal request. The reference signal request may trigger transmission of a reference signal by second base station 105-*u*. For example, first base station 105-*t* may identify remote interference at 1105, and may identify second base station 105-*u* as a potential aggressor base station 105 at 110 and 1115. Based on a previously identified victim-aggressor relationship, base station 105-*t* may send the request at 1135. In some examples, first base station 105-*t* may send the request at 1135-*a* over a wireless channel. In some examples, first base station 105-*t* may send the request at 1135-*b* to network controller 1155. The request at 1135-*b* may request that network controller 1155 identify potential aggressor base stations 105 based on previously detected victim-aggressor relationships, and send the request instructing second base station 105-*u* to send a reference signal to base station 105-*u* at 1135-*c*.

At 1140, first base station 105-*t* may monitor for the reference signal based on the request. At 1145, first base station 105-*t* may receive the reference signal transmitted by second base station 105-*u*. The reference signal may include a unique identifier, which may be unique to second base station 105-*u* or may be shared by a group of base stations 105. In some examples, first base station 105-*t* may perform measurement of an interference channel based at least in part on receiving the reference signal at 1145. In some examples, first base station 105-*t* may transmit the generated measurement to second base station 105-*u*, and second base station 105-*u* may perform RIM at 1150-*a* based on the received measurements. In some examples, first base station 105-*t* may perform RIM at 1150-*b* based on the reference signal received at 1140. First base station 105-*t* may detect an identifier assigned to second base station 105-*u* based on the reference signal received at 1145, and may transmit the measurement based on the identifier.

In some examples, reference signal monitoring at 1140 (or monitoring at 1125) may include adjusting a priority in which monitoring base station 105 monitors for the reference signal transmission relative to another reference signal transmission from another base station 105 based at least in part on the request. In some examples, a monitoring base station 105 may adjust a periodicity at which the base station 105 monitors for a reference signal reference signal transmission based at least in part on the request. In some examples, a monitoring base station 105 may de-prioritizing monitoring for the reference signal transmission based at least in part on failing to detect the first reference signal transmission within a defined amount of time. In some examples, reference signal monitoring may include receiving a request from a UE 115 served by the base station 105, the request indicating that the UE 115 detected a reference signal transmission. In some examples, a base station 105 may determine not to transmit a subsequent reference signal transmission based at least in part on determining that interference channel information has not been received from the second base station within a defined amount of time.

First base station 105-*t* may determine or update a victim-aggressor relationship based on a unique identifier included in the reference signal received at 1140, and may update a database record of previously detected victim-aggressor relationship in a local database, a network controller database, or both, based at least in part on the relationship update. For instance, first base station 105-*t* may classify second base station 105-*u* as an aggressor base station based on the identifier. In some examples, first base station 105-*t* may determine that it is an aggressor base station 105 and that second base station 105-*u* is a victim base station 105 based at least in part on the identifier. In some cases, first base station 105-*t* and second base station 105-*u* may both be aggressor base stations 105 and victim base stations 105. In some cases, first base station 105-*t* or second base station 105-*u* or both may classify second base station 105-*u* as an aggressor to the first remote base station based on the identifier and a downlink transmission power of second base station 105-*u*, or based on a number of remote base stations 105 associated with the identifier. In some examples, first base station 105-*t* may have a first classification type (e.g., weak or strong) and second base station 105-*u* may have a second classification type (e.g., weak or strong), which may be the same or different.

At 1150-*a*, 1150-*b*, or both, one or more base stations 105 may perform RIM techniques. Additionally, or alternatively, base station 105-*t* may implement victim interference mitigation techniques. For example, base station 105-*t* may adjust a configuration at served UEs 115 which transmits uplink transmissions. For example, base station 105-*t* may configure one or more UEs 115 to increase their transmission power for uplink transmissions to the base station 105-*t*. Increasing the transmission power of the UEs 115 may improve detection of the uplink transmissions at base station 105-*t*. Or, in another example, base station 105-*t* may delay or postpone when the UEs 115 are scheduled to transmit uplink transmissions. By postponing transmission of the uplink transmissions, interfering downlink transmissions may not collide with the uplink transmissions, and base station 105-*t* may receive the uplink transmissions without experiencing, or lessening the impact of, interference from base station 105-*u*.

In another example, the base station 105-*t* may identify a receive beam impacted during at least one symbol by the remote interference, and determine not to schedule UEs 115 to transmit an uplink transmission using the impacted receive beam at least in the at least one symbol or configure the UE 115 to increase transmission power for a transmission beam corresponding to the receive beam at least in the at least one symbol. In some examples, base station 105-*u* may mute or cease transmissions, or decrease transmission power on downlink transmissions that cause remote interference at 1105.

Figure 12:
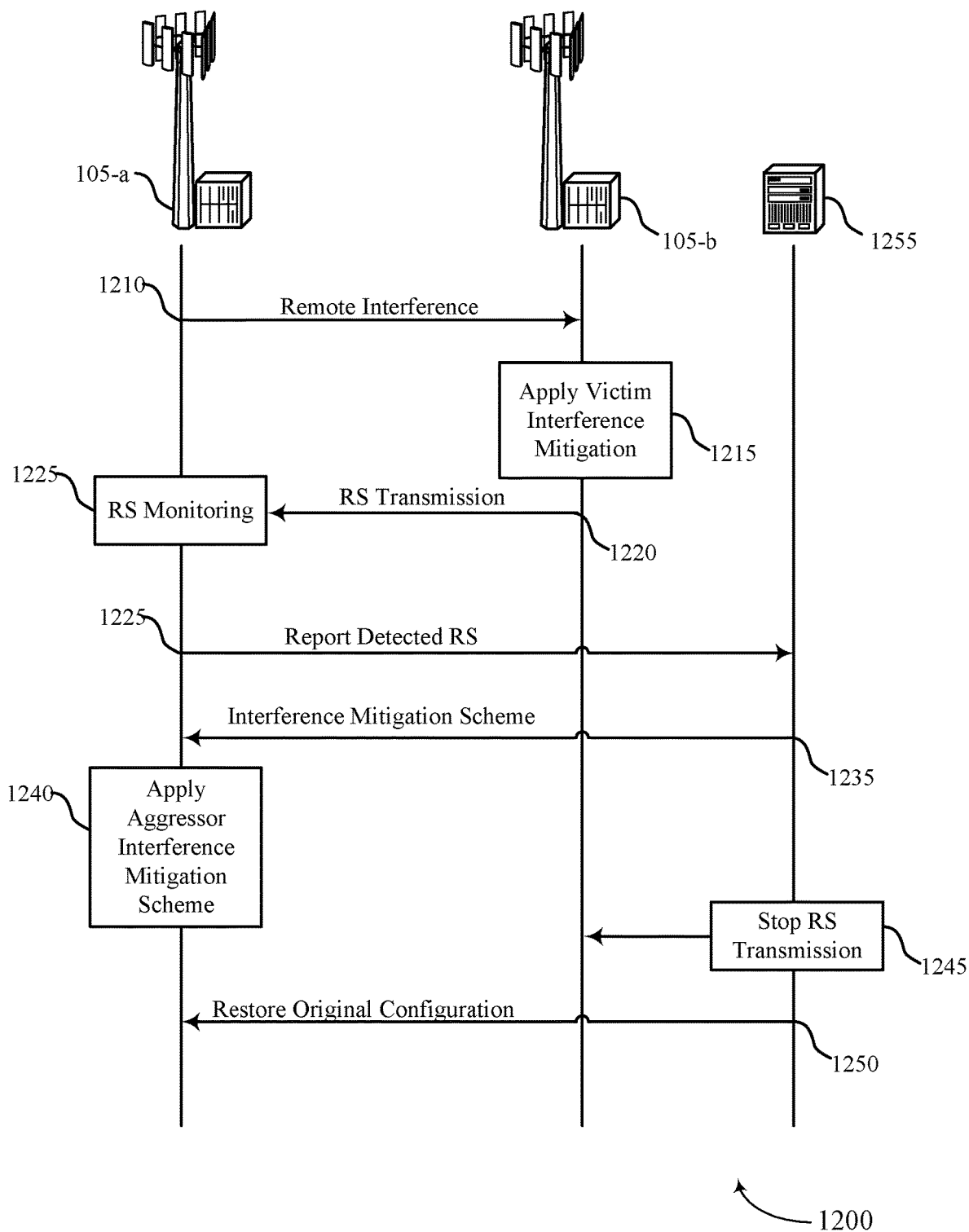
FIG. 12 illustrates an example of a process flow that supports enhancement by victim-aggressor relationship in accordance with aspects of the present disclosure.

FIG. 12 illustrates an example of a process flow 1200 that supports enhancement by aggressor victim relation in accordance with aspects of the present disclosure. In some examples, process flow 1200 may implement aspects of wireless communications system 100. Process flow 1200 may include a base station 105-*b,* which may be an example of a victim of remote interference, and a base station 105-*a,* which may be an example of an aggressor base station, as well as a network database 1255, all of which may be examples of corresponding devices with respect to FIG. 1.

At 1210, base station 105-*a* may cause remote interference at base station 105-*b.* In some cases, an atmospheric ducting phenomenon may occur, which causes remote interference from an aggressor to appear at a victim. In some cases, there may be multiple aggressors, multiple victims, or multiple of both aggressors and victims.

Base station 105-*b* may detect the remote interference, activate victim interference mitigation, and determine to trigger the aggressor base station 105-*a* to activate aggressor interference mitigation at 1215. Base station 105-*b* may identify that downlink transmissions from base station 105-*a* are causing interference to reception of uplink transmissions from at least one UE 115 served by base station 105-*b.* Base station 105-*b* may activate, based on the identifying, victim interference mitigation at base station 105-*b* for mitigating interference caused by base station 105-*a.* In some cases, base station 105-*b* may apply victim interference mitigation to more quickly apply attempt to lessen remote interference.

As described herein, base station 105-*b* may in some cases monitor for an interference power level, monitor for an interference pattern, or monitor for both an interference power level and an interference pattern, within a detection window. Activating the victim interference mitigation at the first base station may be based on detecting the interference power level within the window, detecting the interference pattern within the window, or detecting both within the window. In some examples, base station 105-*b* may experience a sloping-like interference over thermal noise increase based on the remote interference. In some cases, base station 105-*b* may receive, from the network controller 1205 or a second base station 105, a request to activate the victim interference mitigation. In some examples, the second base station 105 may be another victim of remote interference from base station 105-*a.*

Victim interference mitigation technique may include, for example, base station 105-*b* stopping uplink reception over the impacted beams during the impacted symbols. Additionally, or alternatively, base station 105-*b* may increase uplink transmission power (e.g., of a UE 115) over the impacted beam during the impacted symbols.

In some cases, base station 105-*b* may trigger remote interference mitigation by identifying a previously detected aggressor-victim relationship with base station 105-*a,* and may trigger base station 105-*a* directly or via network controller 1255 to monitor for a reference signal transmission by base station 105-*a.* At 1220, base station 105-*b* may transmit a reference signal to base station 105-*a* to indicate the presence of remote interference for triggering (e.g., activating) aggressor interference mitigation. In some examples, a network controller 1255 may allocate a reference signal sequence to base station 105-*b* within different time-frequency or CDM pattern resources than another victim base station so that the aggressor base station 105-*a* may detect the two reference signals in non-overlapping time-frequency or CDM pattern resources without interference, or having limited interference, from each other, or having limited cross-correlation, as described in greater detail with respect to FIG. 4. Base station 105-*a* may monitor for the reference signal transmission at 1225 as configured by the network controller 1205. In some cases, process flow 1200 may correspond to a Framework-0, and the reference signal transmission may not include an identifier of victim base station 105-*b.*

At 1230, base station 105-*a,* upon reception of the reference signal, may report the detected reference signal to the network controller 1205. The network controller 1205 may configure the base station 105-*a* with a remote aggressor interference mitigation scheme at 1235. The aggressor interference mitigation scheme may perform the mitigation techniques as described herein and may, for example, limit in which resources the base station 105-*a* can schedule downlink transmissions, adjust a power level for downlink transmissions, or the like.

At 1240, base station 105-*a* may apply the aggressor remote interference mitigation scheme. Once the aggressor interference mitigation takes effect at one or multiple aggressors, the sloping-like interference over thermal noise ratio may start to reduce at base station 105-*b.* Then, base station 105-*b* may change its mitigation until the sloping-like interference over thermal noise ratio disappears. For example, base station 105-*b* may make adjustments to the victim interference mitigation as described herein. Once the interference over thermal noise ratio is undetectable or below a threshold, base station 105-*b* may stop applying or deactivate the victim interference mitigation.

If the network controller 1205 determines that the remote interference is mitigated, the network controller 1205 may instruct the victim base station 105-*b* to stop transmitting reference signal transmission at 1245. For example, the victim base station 105-*b,* the network controller 1205, or other base station, may monitor for remote interference using the techniques described herein (e.g., determine that sloping like IoT reduces or no longer is detected), and the network controller 1205 may determine that the remote interference has been mitigated. At 1250, the network controller 1205 may restore the original configuration at base station 105-*a.*

Figure 13:
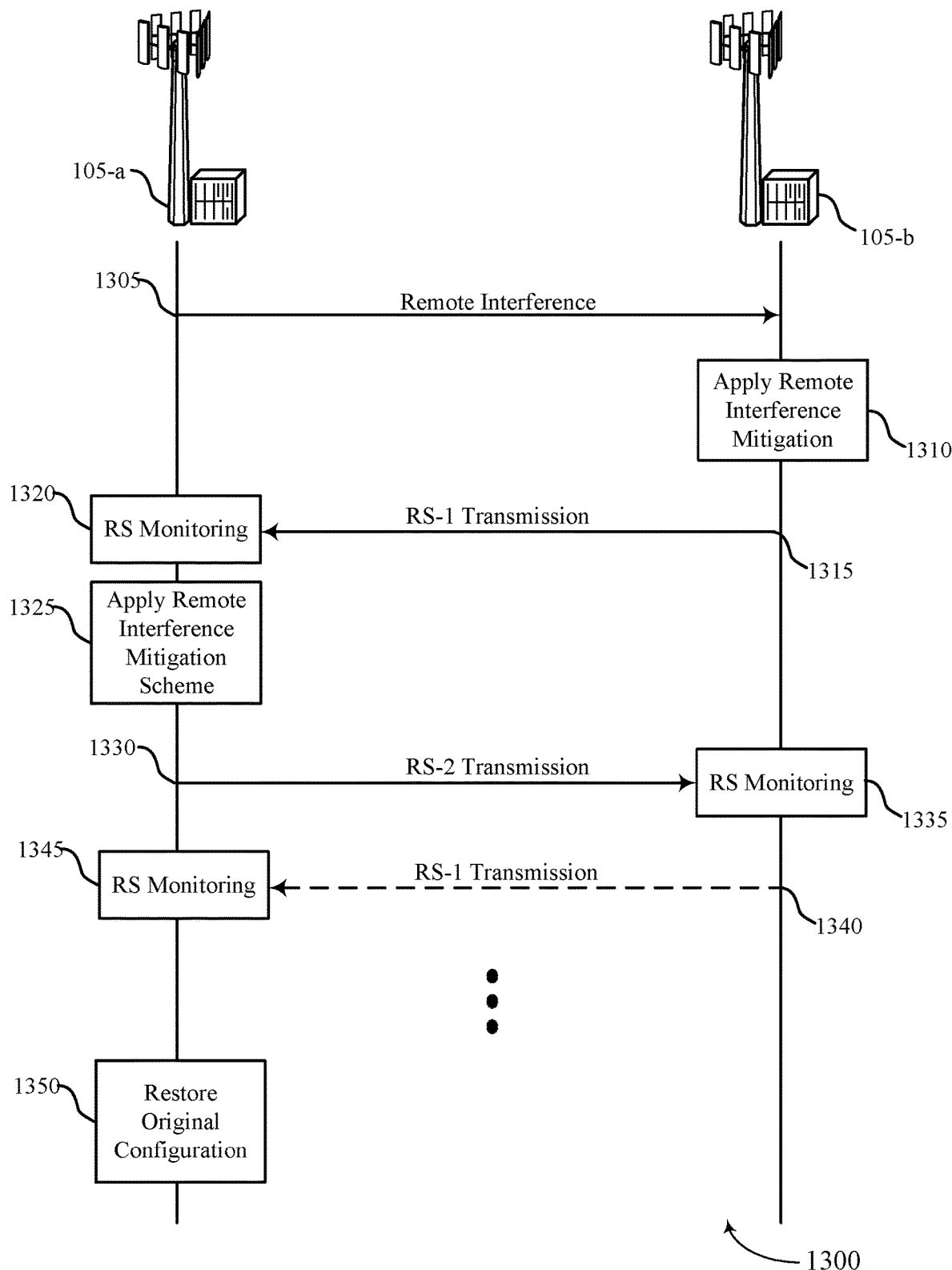
FIG. 13 illustrates an example of a process flow that supports enhancement by victim-aggressor relationship in accordance with aspects of the present disclosure.

FIG. 13 illustrates an example of a process flow 1300 that supports enhancement by aggressor victim relation in accordance with aspects of the present disclosure. In some examples, process flow 1300 may implement aspects of wireless communications system 100. Process flow 1300 may include a base station 105-*b,* which may be an example of a victim of remote interference, and a base station 105-*a,* which may be an example of an aggressor base station, as well as a network database 1355, all of which may be examples of corresponding devices with respect to FIG. 1.

At 1305, base station 105-*a* may cause remote interference at base station 105-*b.* In some cases, an atmospheric ducting phenomenon may occur, which causes remote interference from an aggressor to appear at a victim. In some cases, there may be multiple aggressors, multiple victims, or multiple of both aggressors and victims.

Base station 105-*b* may detect the remote interference and may activate victim interference mitigation at 1310. Base station 105-*b* activate remote interference mitigation by identifying a previously detected aggressor-victim relationship with base station 105-*a,* and may trigger base station 105-*a* to monitor for a reference signal transmission by base station 105-*a.*

As described herein, base station 105-*b* may in some cases monitor for an interference power level, monitor for an interference pattern, or monitor for both an interference power level and an interference pattern, within a detection window. Activating the victim interference mitigation at the first base station may be based on detecting the interference power level within the window, detecting the interference pattern within the window, or detecting both within the window. In some examples, base station 105-*b* may experience a sloping-like interference over thermal noise increase based on the remote interference. In some cases, base station 105-*b* may receive, from a network controller or a second base station 105, a request to activate the victim interference mitigation as described herein.

In some cases, base station 105-*b* may trigger aggressor interference mitigation. Base station 105-*b* activate remote interference mitigation by identifying a previously detected aggressor-victim relationship with base station 105-*a*, and may trigger base station 105-*a* via transmitting a request, via a wireless channel, to trigger base station 105-*b* to initiate monitoring for a reference signal transmission by base station 105-*a*. At 1315, base station 105-*b* may transmit a reference signal to base station 105-*a* to indicate the presence of remote interference. The reference signal, referred to as reference signal-1 in some cases, may be used to assist the aggressor in recognizing that they are causing remote interference to the victim and to detect or deduce how many uplink resources of the victim are impacted by the aggressor. In some examples, a network controller may allocate a reference signal sequence to base station 105-*b* within different time-frequency or CDM pattern resources than another victim base station so that the aggressor base station 105-*a* may detect the two reference signals in non-overlapping time-frequency or CDM pattern resources without interference, or having limited interference, from each other, or having limited cross-correlation, as described in greater detail with respect to FIG. 4. Base station 105-*a* may monitor for the reference signal transmission at 1320 as configured by the network controller. In some cases, the process flow 1300 may correspond to Framework-1, and the reference signal transmission (e.g., reference signal-1) may not include an identifier of base station 105-*b*.

In some examples, reference signal-1, reference signal-2, reference signal-3, or the like, may not carry an identifier. However, without the identifiers, the framework may not be able to obtain victim-aggressor relationships. In order to benefit from the enhancements described herein, the victim-aggressor relationship may be generated in a separate procedure that may detect identifiers for a transmitting base station 105 that sends a reference signal sequence carrying the identifier. The additional procedure may be performed during regular network operations or once per a period of time in a training mode. Alternatively, or additionally, the framework described herein with respect to FIG. 13 may be modified to allow cells to transmit reference signals with identifiers.

At 1325, base station 105-*a*, upon detection of reference signal-1, may apply remote interference mitigation techniques as described herein. For example, base station 105-*a* may skip transmitting (e.g., mute) one or more downlink transmission symbols, terminate some downlink transmissions early, or the like.

At 1330, base station 105-*a* may transmit a reference signal, in some cases referred to as reference signal-2, to base station 105-*b*. In some examples, the base station 105-*b* may perform the fast reference signal techniques described herein to identify base station 105-*a* based on a previously detected aggressor-victim relationship and to trigger base station 105-*a* to transmit a reference signal. Reference signal-2 may be used to assist base station 105-*b* in determining whether the channel conditions which caused the remote interference, such as an atmospheric ducting phenomenon, are still present. Reference signal-2 may be used to indicate the existence of atmospheric ducting. In some examples, base station 105-*b* may maintain interference mitigation over symbols impacted by reference signal-2 even when sloping-like interference over thermal noise lessens and/or disappears. In some cases, reference signal-2 may not carry an ID to the victim. Base station 105-*b* may monitor for reference signal-2 at 1335.

Once the aggressor interference mitigation takes effect at one or multiple aggressors, the sloping-like interference over thermal noise ratio may start to reduce at base station 105-*b*. Then, base station 105-*b* may change its mitigation until the sloping-like interference over thermal noise ratio reduces to an acceptable level and/or disappears. For example, base station 105-*b* may make adjustments to the victim interference mitigation as described herein.

Base station 105-*b* may continue reference signal-1 transmission as long as it receives reference signal-2, as this may indicate that the channel conditions for the remote interference still exist. For example, if the channel conditions are still present at 1340, base station 105-*b* may transmit reference signal-1 to base station 105-*a*. Base station 105-*a* may monitor for the second transmission of reference signal-1 at 845. In some cases, once base station 105-*b* stops receiving reference signal-2, base station 105-*b* may deactivate the victim interference mitigation. In some cases, base station 105-*b* may stop applying interference mitigation when sloping-like interference over thermal noise and/or reference signal-2 are not detected or are within an acceptable level. At 1350, base station 105-*a* may restore its original configuration.

FIG. 14 illustrates an example of a process flow 1400 that supports enhancement by aggressor victim relation in accordance with aspects of the present disclosure. In some examples, process flow 1400 may implement aspects of wireless communications system 100. Process flow 1400 may include a base station 105-*b*, which may be an example of a victim of remote interference, and a base station 105-*a*, which may be an example of an aggressor base station, as well as a network database 1455, all of which may be examples of corresponding devices with respect to FIG. 1.

At 1405, base station 105-*a* may cause remote interference at base station 105-*b*. In some cases, an atmospheric ducting phenomenon may occur, which causes remote interference from an aggressor to appear at a victim. In some cases, there may be multiple aggressors, multiple victims, or multiple of both aggressors and victims.

Base station 105-*b* may detect the remote interference and apply a victim interference mitigation at 1410. Base station 105-*b* may identify that downlink transmissions from base station 105-*a* are causing interference to reception of uplink transmissions from at least one UE 115 served by base station 105-*b*. Base station 105-*b* may trigger reference signal monitoring at base station 105-*a* based on a previously detected aggressor-victim relationship.

As described herein, base station 105-*b* may in some cases monitor for an interference power level, monitor for an interference pattern, or monitor for both an interference power level and an interference pattern, within a detection window. Activating the victim interference mitigation at the first base station may be based on detecting the interference power level within the window, detecting the interference pattern within the window, or detecting both within the window. In some examples, base station 105-*b* may experience a sloping-like interference over thermal noise increase based on the remote interference. In some cases, base station 105-*b* may receive, from a network controller or a second base station 105, a request to activate the victim interference mitigation. In some examples, the second base station 105 may be another victim of remote interference from base station 105-*a*. In some examples, when a victim base station 105 detects sloping-like interference (e.g., IoT) the victim base station 105 may initiate transmission of reference signal sequences to one or more aggressive cells. The reference signal transmission at, for example, 1415, may include an identifier assigned to the victim base station 105. In some examples, another victim base station 105 may also be transmitting reference signal sequences to the same aggressor base station 105. In such examples, a network controller may allocate two reference signal sequences within different time-frequency or CDM pattern resources so that the aggressor base station 105 may detect the two reference signals in non-overlapping time-frequency or CDM pattern resources without interference, or having limited interference, from each other, or having limited cross-correlation, as described in greater detail with respect to FIG. 4.

Examples of a victim interference mitigation technique may include stopping uplink reception over the impacted beams during the impacted symbols. Additionally, or alternatively, base station 105-*b* may increase uplink transmission power (e.g., of a UE 115) over the impacted beam during the impacted symbols.

In some cases, base station 105-*b* may trigger aggressor interference mitigation. At 1415, base station 105-*b* may transmit a reference signal to base station 105-*a* to indicate the presence of remote interference. The reference signal may include an ID of base station 105-*b*, and the ID may be unique or shared among cells in a same set of cells. In some cases, the process flow 1400 may correspond to Framework-2.1, and a set of base stations 105 may use the same reference signal, which may carry a set ID for the base stations 105 in the set. At 1420, base station 105-*a* may monitor for the reference signal.

Upon receipt of the reference signal at 1415, base station 105-*a* may apply remote interference mitigation techniques. For example, base station 105-*a* may mute some downlink transmission symbols. Base station 105-*a* may inform base station 105-*b*, or the set of base stations including base station 105-*b*, of the reception of the reference signal through backhaul at 1430. In some cases, base station 105-*b* may stop applying interference mitigation after receipt of the backhaul indication at 1430. In some other examples, base station 105-*b* may continue to apply victim interference mitigation, for example in the case of having multiple aggressors.

In some examples, the reference signal transmission at 1415 by a victim base station 105-*b* may carry an identifier (or a group identifier of cell group that the victim base station 105-*b* belongs to) assigned to the victim base station 105-*b*. The victim-aggressor relationship may be obtained at 1420 where base station 105-*a* detects the reference signal.

Once the aggressor interference mitigation takes effect at one or multiple aggressors, the sloping-like interference over thermal noise ratio may start to reduce at base station 105-*b*. Then, base station 105-*b* may change its mitigation until the sloping-like interference over thermal noise ratio disappears. For example, base station 105-*b* may make adjustments to the victim interference mitigation as described in FIG. 5.

At 1435, base station 105-*a* may transmit an indication of remote interference disappearance to base station 105-*b*. The indication at 1435 may be transmitted using a backhaul link. Base station 105-*a* may restore its original configuration and stop monitoring for reference signals at 1440. At 1445, base station 105-*b* may stop transmitting reference signals based on the indication received at 1435. In some cases, base station 105-*b* may stop victim interference mitigation based on the indication received at 1435.

FIG. 15 illustrates an example of a process flow 1500 that supports enhancement by aggressor victim relation in accordance with aspects of the present disclosure. In some examples, process flow 1500 may implement aspects of wireless communications system 100. Process flow 1500 may include a base station 105-*b*, which may be an example of a victim of remote interference, and a base station 105-*a*, which may be an example of an aggressor base station, as well as a network database 1555, all of which may be examples of corresponding devices with respect to FIG. 1.

At 1505, base station 105-*a* may cause remote interference at base station 105-*b*. In some cases, an atmospheric ducting phenomenon may occur, which causes remote interference from an aggressor to appear at a victim. In some cases, there may be multiple aggressors, multiple victims, or multiple of both aggressors and victims.

Base station 105-*b* may detect the remote interference and apply a victim interference mitigation at 1510. Base station 105-*b* may identify that downlink transmissions from base station 105-*a* are causing interference to reception of uplink transmissions from at least one UE 115 served by base station 105-*b*. Base station 105-*b* may trigger base station 105-*a* to perform remote interference mitigation based on a previously detected aggressor-victim relationship.

As described herein, base station 105-*b* may in some cases monitor for an interference power level, monitor for an interference pattern, or monitor for both an interference power level and an interference pattern, within a detection window. Activating the victim interference mitigation at the first base station may be based on detecting the interference power level within the window, detecting the interference pattern within the window, or detecting both within the window. In some examples, base station 105-*b* may experience a sloping-like interference over thermal noise increase based on the remote interference. In some cases, base station 105-*b* may receive, from a network controller or a second base station 105, a request to activate the victim interference mitigation. In some examples, the second base station 105 may be another victim of remote interference from base station 105-*a*.

In some cases, base station 105-*b* may trigger aggressor interference mitigation. At 1515, base station 105-*b* may transmit a reference signal to base station 105-*a* to indicate the presence of remote interference. The reference signal may include an ID of base station 105-*b*, and the ID may be unique or shared. In some examples, a network controller may allocate a reference signal sequence to base station 105-*b* within different time-frequency or CDM pattern resources than another victim base station so that the aggressor base station 105-*a* may detect the two reference signals in non-overlapping time-frequency or CDM pattern resources without interference, or having limited interference, from each other, or having limited cross-correlation, as described in greater detail with respect to FIG. 4. In some cases, the process flow 1500 may correspond to Framework-2.2, a set of base stations 105 may use the same reference signal, which may carry a set ID for the base stations 105 in the set. At 1520, base station 105-*a* may monitor for the reference signal.

In some examples, the reference signal transmission at 1515 by a victim base station 105-*b* may carry an identifier (or a group identifier of cell group that the victim base station 105-*b* belongs to) assigned to the victim base station 105-*b*. The victim-aggressor relationship may be obtained at 1520 where base station 105-*a* detects the reference signal. Reference signal signaling including unique identifiers is described herein.

Base station 105-*a* may inform base station 105-*b*, or the set of base stations including base station 105-*b*, of the reception of the reference signal through backhaul at 1525. In some cases, base station 105-*b* may stop applying victim interference mitigation after receipt of the backhaul indication at 1525. In some other examples, base station 105-*b* may continue to apply victim interference mitigation, for example in the case of having multiple aggressors.

In response to the backhaul indication received at 1525, base station 105-*b* may transmit additional information to base station 105-*a* to assist remote interference mitigation coordination (e.g., RIM coordination). Upon receipt of the assistance information, base station 105-*a* may apply remote interference mitigation techniques at 1535. For example, base station 105-*a* may mute some downlink transmission symbols.

Once the aggressor interference mitigation takes effect at one or multiple aggressors, the sloping-like interference over thermal noise may start to decrease. Then, base station 105-*b* may change its mitigation until the sloping-like interference over thermal noise disappears or is below a threshold.

After some time, the remote interference may be mitigated, or channel conditions may change such that the remote interference is stopped. At 1545, base station 105-*a* may transmit an indication of a disappearance of reference signals (e.g., similar to those received at 1515) to base station 105-*b*. The indication at 1545 may be transmitted using a backhaul link. Base station 105-*a* may restore its original configuration and stop monitoring for reference signals at 1540. At 1550, base station 105-*b* may stop transmitting reference signals based on the indication received at 1545. In some cases, base station 105-*b* may stop victim interference mitigation based on the indication received at 1545. For example, base station 105-*b* may deactivate the victim interference mitigation.

Figure 16:
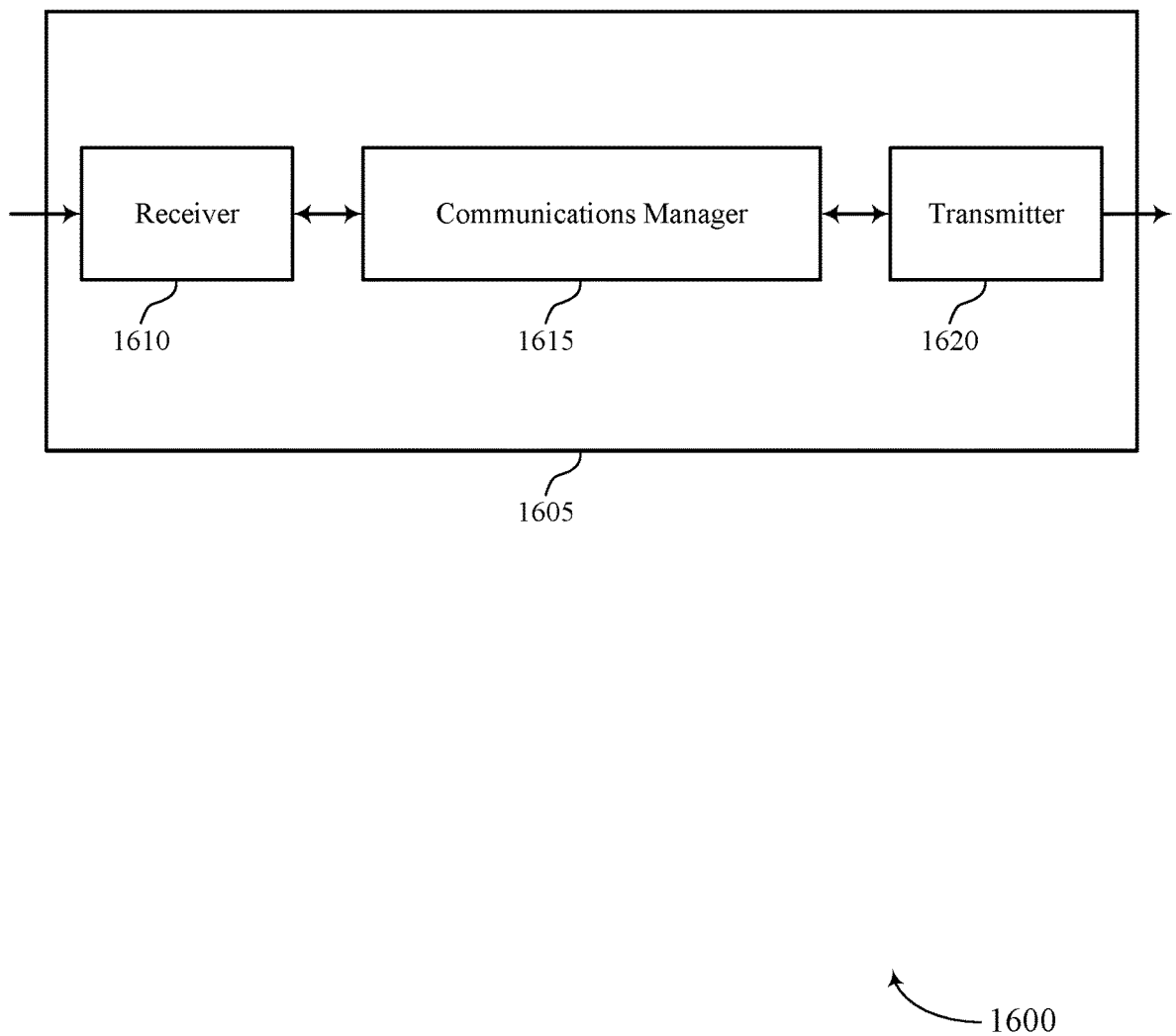
FIGS. 16 and 17 show block diagrams of devices that support enhancement by victim-aggressor relationship in accordance with aspects of the present disclosure.

FIG. 16 shows a block diagram 1600 of a device 1605 that supports enhancement by aggressor victim relation in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses). In some examples, communications manager 1615 may be implemented by a modem. Communications manager 1615 may communicate with transmitter 1620 via a first interface. Communications manager 1615 may output signals for transmission via the first interface. Communications manager 1615 may interface with receiver 1610 via a second interface. Communications manager 1615 obtain signals via the second interface. In some examples, the modem may implement, via the first interface and the second interface, the techniques and methods described herein. Such techniques may result in decreased interference, improved overall system efficiency, more efficient power usage for a chipset, improved use of computational resources, and improved user experience.

The receiver 1610 may receive information such as packets, user data, or control information associated with various information channels (e.g., control channels, data channels, and information related to enhancement by aggressor victim relation, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may identify that downlink transmissions from at least one other base station are causing interference to reception of uplink transmissions from a first UE served by the first base station, and transmit a first reference signal transmission based on at least one remote base station being triggered to perform reference signal monitoring due to a previously detected victim-aggressor relationship between the first base station and the at least one remote base station. The communications manager 1615 may also receive a request to perform reference signaling monitoring based on a previously detected victim-aggressor relationship between the first base station and a second base station and monitor for a first reference signal transmission from the second base station based on the request. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
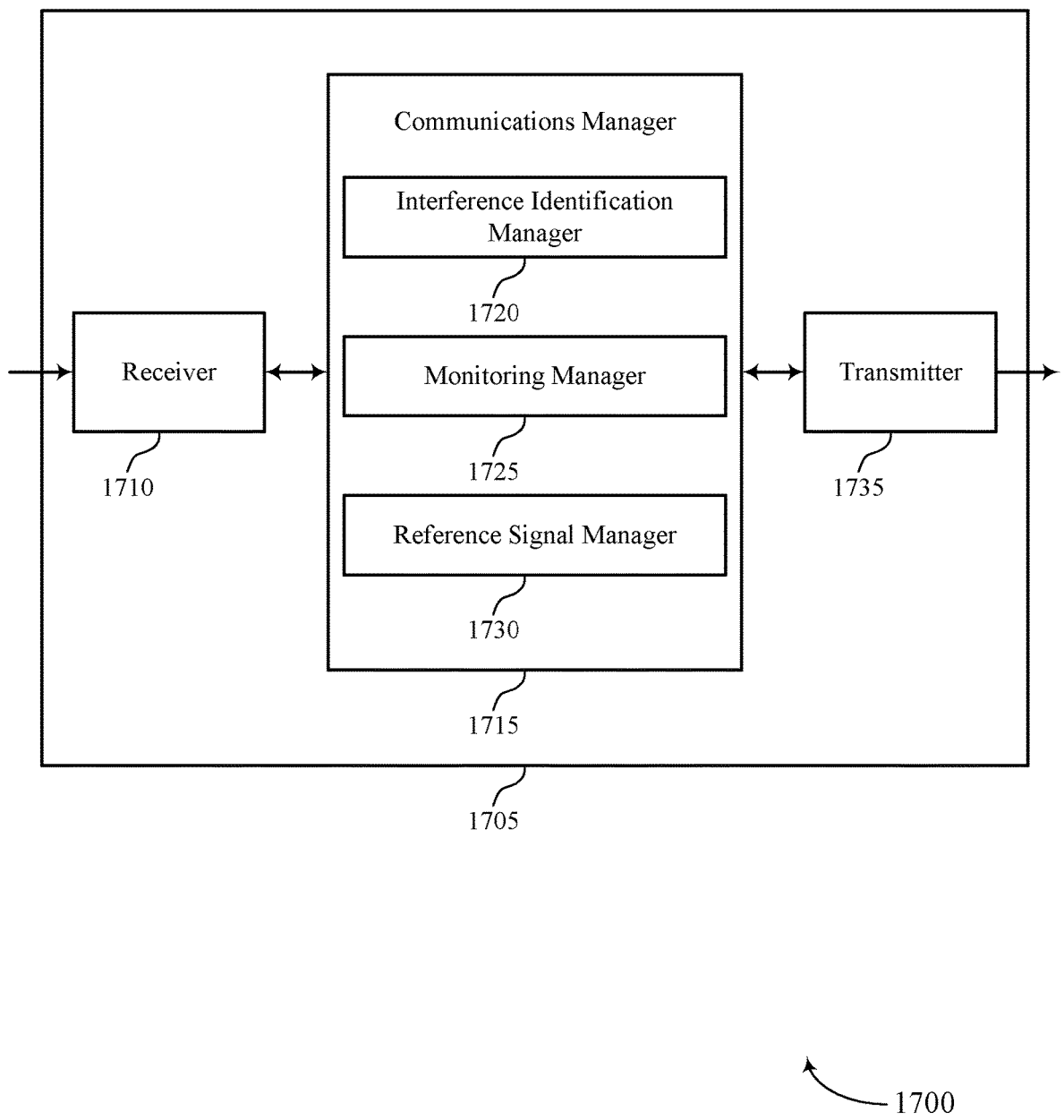

FIG. 17 shows a block diagram 1700 of a device 1705 that supports enhancement by aggressor victim relation in accordance with aspects of the present disclosure. The device 1705 may be an example of aspects of a device 1605, or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to enhancement by aggressor victim relation, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include an interference identification manager 1720, a monitoring manager 1725, and a reference signal manager 1730. The communications manager 1715 may be an example of aspects of the communications manager 1910 described herein.

The interference identification manager 1720 may identify that downlink transmissions (e.g., from at least one other base station) are causing interference to reception of uplink transmissions from a first UE served by the first base station. The monitoring manager 1725 may trigger at least one remote base station to perform reference signal monitoring based on a previously detected victim-aggressor relationship between the first base station and the at least one remote base station. The reference signal manager 1730 may transmit a first reference signal transmission based on at least one remote base station being triggered to perform reference signal monitoring due to a previously detected victim-aggressor relationship between the first base station and the at least one remote base station.

The reference signal manager 1730 may receive a request to perform reference signaling monitoring based on a previously detected victim-aggressor relationship between the first base station and a second base station. The monitoring manager 1725 may monitor for a first reference signal transmission from the second base station based on the request.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
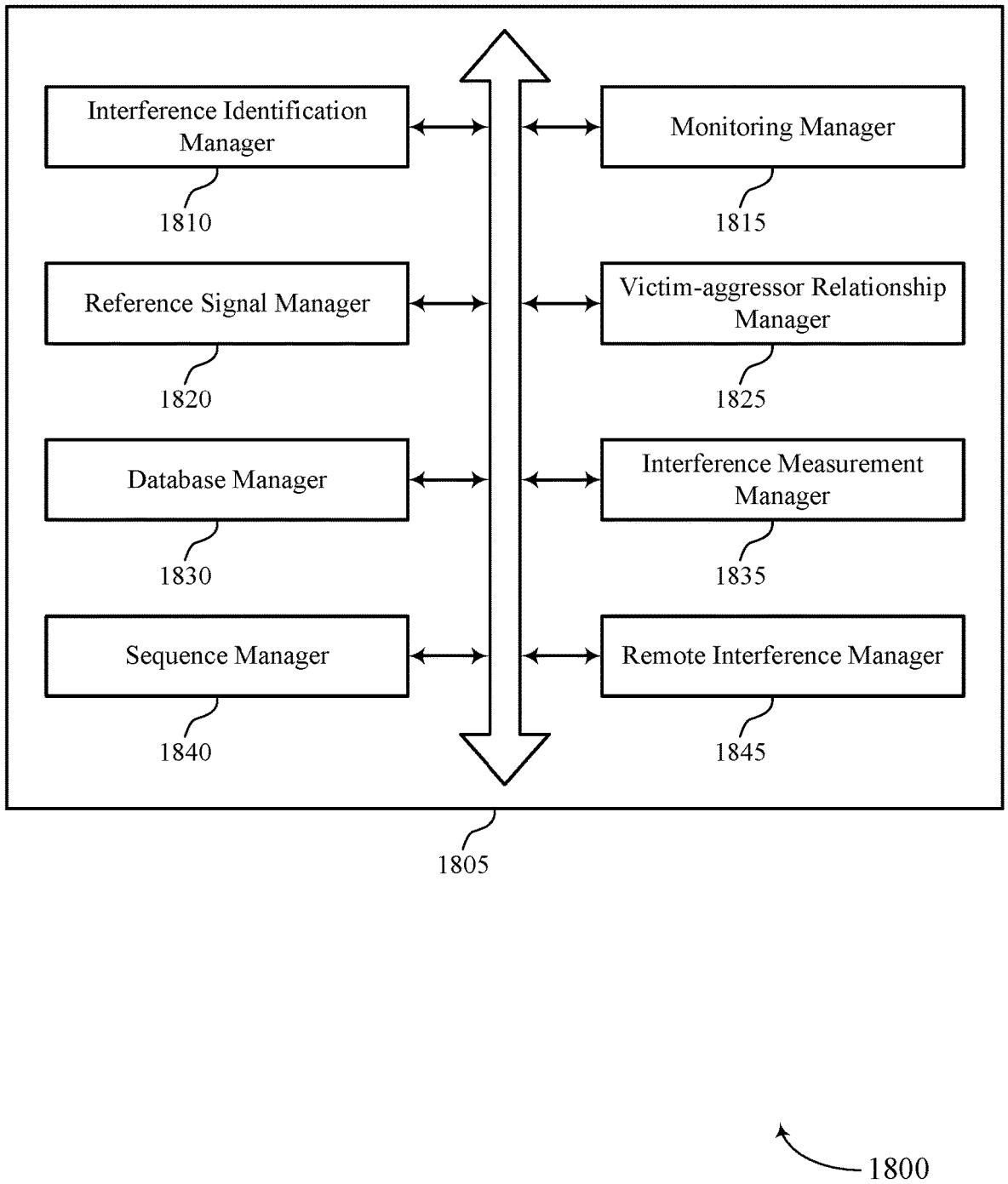
FIG. 18 shows a block diagram of a communications manager that supports enhancement by victim-aggressor relationship in accordance with aspects of the present disclosure.

FIG. 18 shows a block diagram 1800 of a communications manager 1805 that supports enhancement by aggressor victim relation in accordance with aspects of the present disclosure. The communications manager 1805 may be an example of aspects of a communications manager 1615, a communications manager 1715, or a communications manager 1910 described herein. The communications manager 1805 may include an interference identification manager 1810, a monitoring manager 1815, a reference signal manager 1820, a victim-aggressor relationship manager 1825, a database manager 1830, an interference measurement manager 1835, a sequence manager 1840, and a remote interference manager 1845. Each of these modules may communicate, directly or indirectly, with one another (e.g., via one or more buses).

The interference identification manager 1810 may identify that downlink transmissions (e.g., from at least one other base station) are causing interference to reception of uplink transmissions from a first UE served by the first base station.

The monitoring manager 1815 may trigger at least one remote base station (the at least one other base station causing interference, or a different base station) to perform reference signal monitoring based on a previously detected victim-aggressor relationship between the first base station and the at least one remote base station.

In some examples, the monitoring manager 1815 may monitor for a first reference signal transmission from the second base station based on the request. In some examples, the monitoring manager 1815 may monitor for the second reference signal transmission based on the reference signal request. In some examples, the monitoring manager 1815 may adjust a priority in which the first base station monitors for the first reference signal transmission relative to a second reference signal transmission from a third base station based on the request.

In some examples, the monitoring manager 1815 may adjust a periodicity at which the first base station monitors for the first reference signal transmission based on the request. In some examples, the monitoring manager 1815 may adjust a periodicity at which the first base station monitors for the first reference signal transmission based on failing to detect the first reference signal transmission within a defined amount of time. In some examples, the monitoring manager 1815 may de-prioritize monitoring for the first reference signal transmission based on failing to detect the first reference signal transmission within a defined amount of time. In some examples, the monitoring manager 1815 may receive the request from a user equipment served by the first base station, the request indicating that the user equipment detected the first reference signal transmission.

The reference signal manager 1820 may transmit a first reference signal transmission based on at least one remote base station being triggered to perform reference signal monitoring due to a previously detected victim-aggressor relationship between the first base station and the at least one remote base station. In some examples, the reference signal manager 1820 may receive a request to perform reference signaling monitoring based on a previously detected victim-aggressor relationship between the first base station and a second base station. In some examples, the reference signal manager 1820 may transmit, via wireless channel or a backhaul link, a request to the at least one remote base station based on an indication.

In some examples, the reference signal manager 1820 may transmit a reference signal request for triggering the at least one remote base station to transmit a second reference signal transmission. In some examples, the reference signal manager 1820 may transmit, via a wireless channel or a backhaul link, the reference signal request to the at least one remote base station based on the indication. In some examples, the reference signal manager 1820 may transmit, via a backhaul link, the reference signal request to a network controller for identifying the at least one remote base station based on the previously detected victim-aggressor relationship and for instructing the at least one remote base station to transmit the second reference signal transmission.

In some examples, the reference signal manager 1820 may detect an identifier assigned to the at least one remote base station based on a second reference signal transmission from the at least one remote base station, where the transmitting the measurement is based on the identifier. In some examples, receiving a second reference signal transmission that includes an identifier of a second remote base station of the at least one remote base station. In some examples, receiving a second reference signal transmission that includes an identifier of a second remote base station of the at least one remote base station. In some examples, receiving a second reference signal transmission that includes an identifier of a second remote base station of the at least one remote base station, where the identifier is unique to the first remote base station. In some examples, receiving a second reference signal transmission that includes an identifier of a second remote base station of the at least one remote base station, where the identifier is shared by a set of remote base stations.

In some examples, the reference signal manager 1820 may transmit the first reference signal transmission in accordance with the reference sequence configuration. In some examples, the reference signal manager 1820 may receive the request from the second base station via a wireless channel or a backhaul link. In some examples, the reference signal manager 1820 may receive the request from a network controller via a backhaul link.

In some examples, the reference signal manager 1820 may receive, via a wireless channel or a backhaul link, a reference signal request for triggering the first base station to transmit a second reference signal transmission. In some examples, the reference signal manager 1820 may transmit the second reference signal transmission based on the reference signal request. In some examples, the reference signal manager 1820 may determine not to transmit a subsequent reference signal transmission based on determining that interference channel information has not been received from the second base station within a defined amount of time. In some examples, transmitting a second reference signal transmission that includes an identifier of the first base station.

In some examples, the reference signal manager 1820 may transmit the second reference signal transmission in accordance with the reference sequence configuration. In some cases, the second reference signal transmission includes an identifier of the first base station. In some cases, the identifier is unique to the first remote base station. In some cases, the identifier is shared by a set of remote base stations.

The victim-aggressor relationship manager 1825 may retrieve, from a database, an indication of the previously detected victim-aggressor relationship. In some examples, the victim-aggressor relationship manager 1825 may transmit, via a backhaul link, a request to a network controller for identifying the at least one remote base station based on the previously detected victim-aggressor relationship and for instructing the at least one remote base station to perform reference signal monitoring. In some examples, the victim-aggressor relationship manager 1825 may receive, from the at least one remote base station, a relationship update indicating information related to the previously detected victim-aggressor relationship.

In some examples, the victim-aggressor relationship manager 1825 may determine a relationship update for information related to the previously detected victim-aggressor relationship based at least in part on the detected identifier. In some examples, the victim-aggressor relationship manager 1825 may classify the second remote base station as an aggressor to the first remote base station based on the identifier. In some examples, the victim-aggressor relationship manager 1825 may classify the first base station as an aggressor to the second remote base station based on the identifier.

In some examples, the victim-aggressor relationship manager 1825 may classify the second remote base station as an aggressor to the first remote base station based on the identifier and a downlink transmission power of the second remote base station satisfying a threshold. In some examples, the victim-aggressor relationship manager 1825 may classify the second remote base station as an aggressor to the first remote base station based on the identifier and a number of remote base stations associated with the identifier. In some examples, the victim-aggressor relationship manager 1825 may classify the second remote base station as having a first relation type to the first base station based on the identifier.

In some examples, the victim-aggressor relationship manager 1825 may classify the first base station as having a second relation type to the second remote base station based on the identifier. In some examples, the victim-aggressor relationship manager 1825 may classify the second remote base station as an aggressor based on the interference power level, the interference pattern, or both. In some examples, the victim-aggressor relationship manager 1825 may transmit a relationship update indicating information related to the previously detected victim-aggressor relationship.

The database manager 1830 may update a database record of the previously detected victim-aggressor relationship in a local database, a network controller database, or both, based on the relationship update. In some examples, the database may be a network controller database, and updating the database record may include sending report information associated with the detected reference signal to the network controller database. In some examples, the database manager 1830 may update a database record related to the previously detected victim-aggressor relationship in a local database, a network controller database, or both, based on the relationship update.

The interference measurement manager 1835 may generate a measurement of an interference channel based on receiving the second reference signal transmission. In some examples, the interference measurement manager 1835 may transmit, via a backhaul link, the measurement to the at least one remote base station. In some examples, the interference measurement manager 1835 may monitor an interference power level, an interference pattern, or both, of a second reference signal transmission of a second remote base station of the at least one remote base station. In some examples, the interference measurement manager 1835 may receive interference channel information based on transmitting the second reference signal transmission.

The sequence manager 1840 may receive a reference sequence configuration from a network controller. In some examples, the sequence manager 1840 may receive a reference sequence configuration from a network controller.

The remote interference manager 1845 may perform remote interference management based on detecting the first reference signal transmission. In some examples, the remote interference manager 1845 may perform remote interference management based on the interference channel information.

Figure 19:
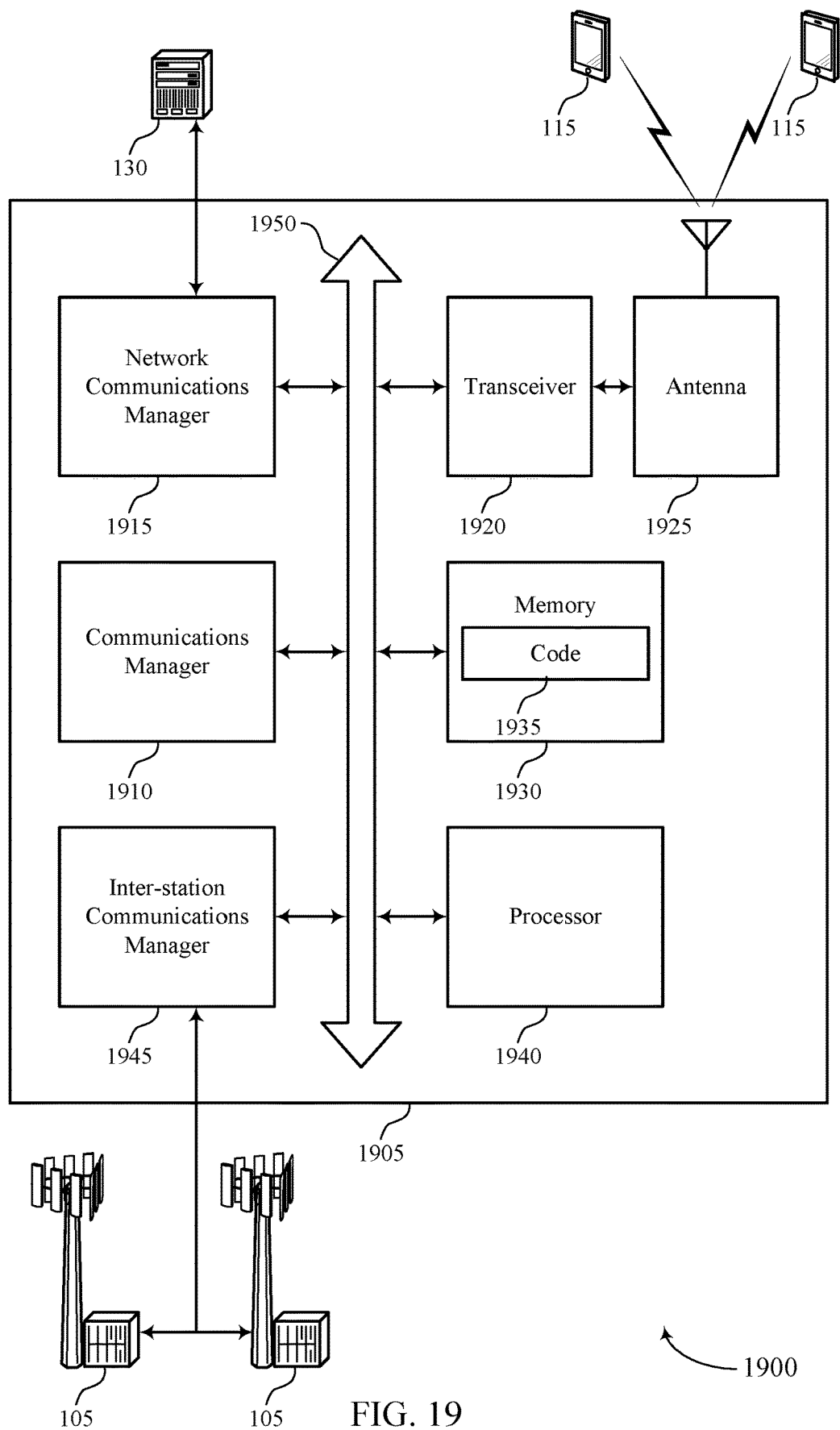
FIG. 19 shows a diagram of a system including a device that supports enhancement by victim-aggressor relationship in accordance with aspects of the present disclosure.

FIG. 19 shows a diagram of a system 1900 including a device 1905 that supports enhancement by aggressor victim relation in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may identify that downlink transmissions (e.g., from at least one other base station) are causing interference to reception of uplink transmissions from a first UE served by the first base station, and transmit a first reference signal transmission based on at least one remote base station (e.g., the at least one other base station causing the remote interference, or a different base station) being triggered to perform reference signal monitoring due to a previously detected victim-aggressor relationship between the first base station and the at least one remote base station. The communications manager 1910 may also receive a request to perform reference signaling monitoring based on a previously detected victim-aggressor relationship between the first base station and a second base station and monitor for a first reference signal transmission from the second base station based on the request.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting enhancement by aggressor victim relation).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
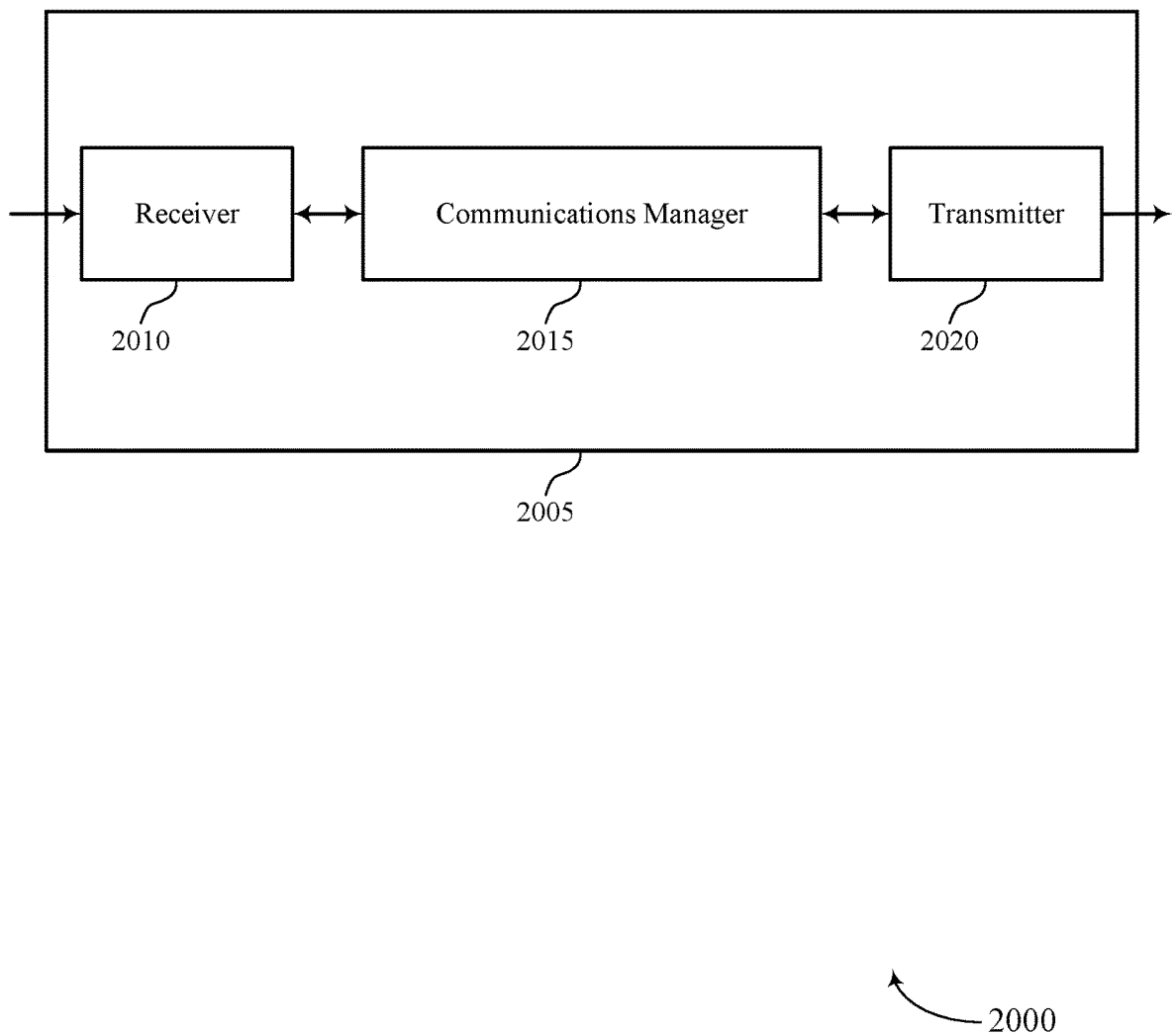
FIGS. 20 and 21 show block diagrams of devices that support enhancement by victim-aggressor relationship in accordance with aspects of the present disclosure.

FIG. 20 shows a block diagram 2000 of a device 2005 that supports enhancement by aggressor victim relation in accordance with aspects of the present disclosure. The device 2005 may be an example of aspects of a network entity as described herein. The device 2005 may include a receiver 2010, a communications manager 2015, and a transmitter 2020. The device 2005 may also include a processor. Each of these components may be in communication with one another (e.g., via one or more buses). In some examples, communications manager 2015 may be implemented by a modem. Communications manager 2015 may communicate with transmitter 2020 via a first interface. Communications manager 2015 may output signals for transmission via the first interface. Communications manager 2015 may interface with receiver 2010 via a second interface. Communications manager 1115 may obtain signals (e.g., transmitted from a UE 115) via the second interface. In some examples, the modem may implement, via the first interface and the second interface, the techniques and methods described herein. Such techniques may result in decreased interference, improved overall system efficiency, more efficient power usage for a chipset, improved use of computational resources, and improved user experience.

The receiver 2010 may receive information such as packets, user data, or control information associated with various information channels (e.g., control channels, data channels, and information related to enhancement by aggressor victim relation, etc.). Information may be passed on to other components of the device 2005. The receiver 2010 may be an example of aspects of the transceiver 2320 described with reference to FIG. 23. The receiver 2010 may utilize a single antenna or a set of antennas.

The communications manager 2015 may receive, from a first base station, a request to trigger reference signal monitoring by at least one remote base station, identify a previously detected victim-aggressor relationship between the first base station and the at least one remote base station, and transmit a monitoring request instructing the at least one remote base station to perform reference signal monitoring. The communications manager 2015 may be an example of aspects of the communications manager 2310 described herein.

The communications manager 2015, or its sub-components, may be implemented in hardware, code (e.g., software or firmware) executed by a processor, or any combination thereof. If implemented in code executed by a processor, the functions of the communications manager 2015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 2015, or its sub-components, may be physically located at various positions, including being distributed such that portions of functions are implemented at different physical locations by one or more physical components. In some examples, the communications manager 2015, or its sub-components, may be a separate and distinct component in accordance with various aspects of the present disclosure. In some examples, the communications manager 2015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2020 may transmit signals generated by other components of the device 2005. In some examples, the transmitter 2020 may be collocated with a receiver 2020 in a transceiver module. For example, the transmitter 2020 may be an example of aspects of the transceiver 2320 described with reference to FIG. 23. The transmitter 2020 may utilize a single antenna or a set of antennas.

Figure 21:
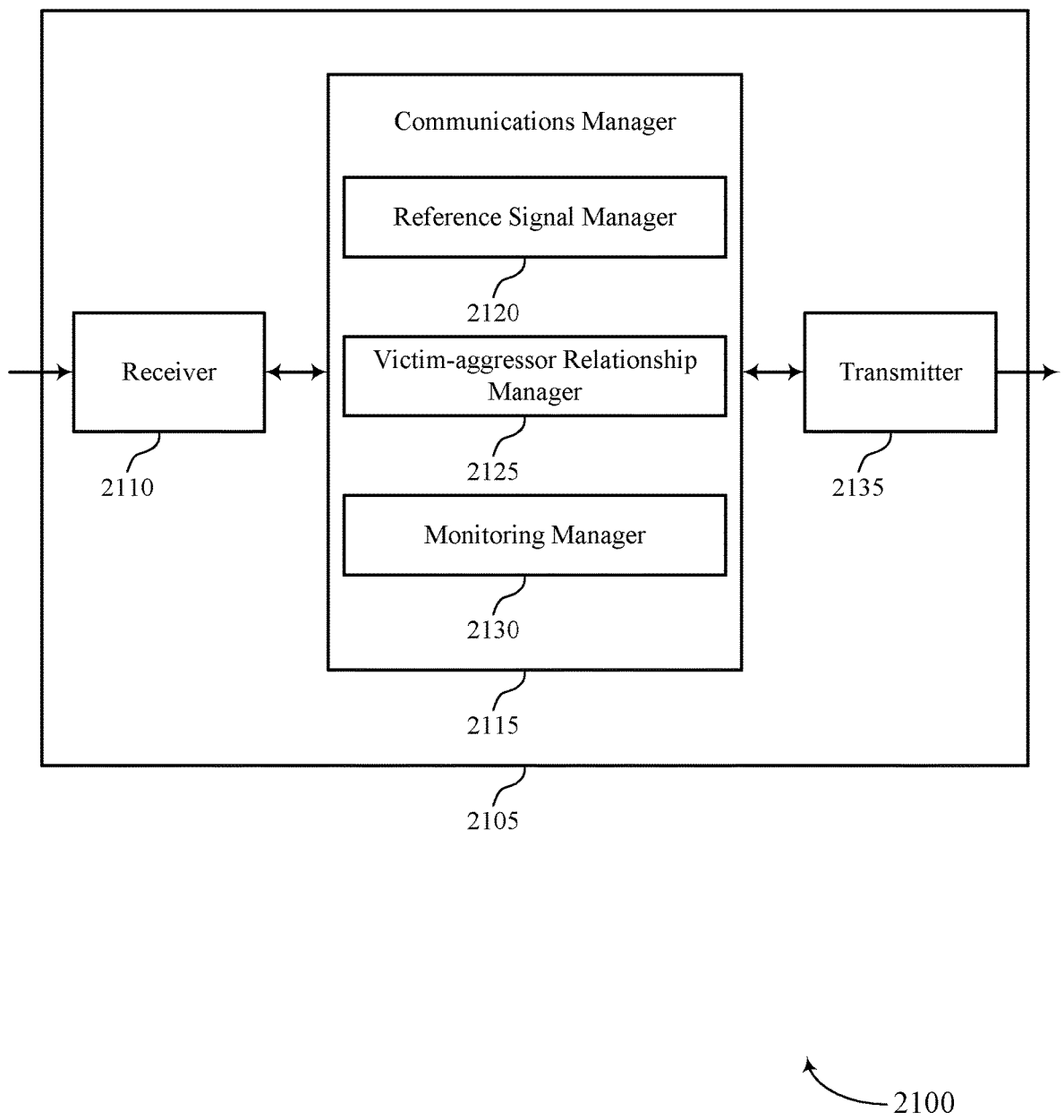

FIG. 21 shows a block diagram 2100 of a device 2105 that supports enhancement by aggressor victim relation in accordance with aspects of the present disclosure. The device 2105 may be an example of aspects of a device 2005 or a base station 105 as described herein. The device 2105 may include a receiver 2110, a communications manager 2115, and a transmitter 2135. The device 2105 may also include a processor. Each of these components may be in communication with one another (e.g., via one or more buses).

The receiver 2110 may receive information such as packets, user data, or control information associated with various information channels (e.g., control channels, data channels, and information related to enhancement by aggressor victim relation, etc.). Information may be passed on to other components of the device 2105. The receiver 2110 may be an example of aspects of the transceiver 2320 described with reference to FIG. 23. The receiver 2110 may utilize a single antenna or a set of antennas.

The communications manager 2115 may be an example of aspects of the communications manager 2015 as described herein. The communications manager 2115 may include a reference signal manager 2120, a victim-aggressor relationship manager 2125, and a monitoring manager 2130. The communications manager 2115 may be an example of aspects of the communications manager 2310 described herein.

The reference signal manager 2120 may receive, from a first base station, a request to trigger reference signal monitoring by at least one remote base station.

The victim-aggressor relationship manager 2125 may identify a previously detected victim-aggressor relationship between the first base station and the at least one remote base station.

The monitoring manager 2130 may transmit a monitoring request instructing the at least one remote base station to perform reference signal monitoring.

The transmitter 2135 may transmit signals generated by other components of the device 2105. In some examples, the transmitter 2135 may be collocated with a receiver 2135 in a transceiver module. For example, the transmitter 2135 may be an example of aspects of the transceiver 2320 described with reference to FIG. 23. The transmitter 2110 may utilize a single antenna or a set of antennas.

Figure 22:
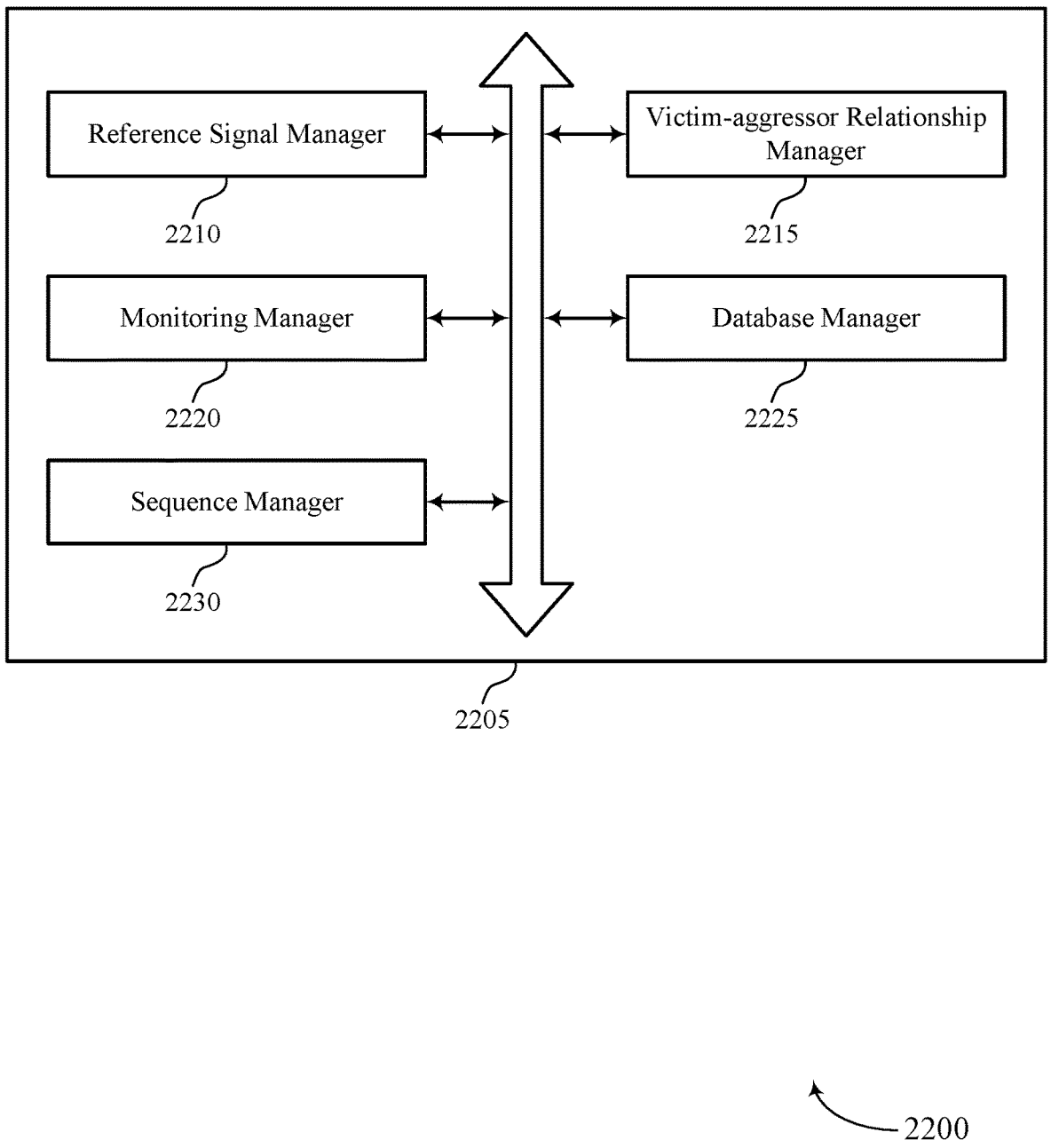
FIG. 22 shows a block diagram of a communications manager that supports enhancement by victim-aggressor relationship in accordance with aspects of the present disclosure.

FIG. 22 shows a block diagram 2200 of a communications manager 2205 that supports enhancement by aggressor victim relation in accordance with aspects of the present disclosure. The communications manager 2205 may be an example of aspects of a communications manager 2015, a communications manager 2115, or a communications manager 2310 described herein. The communications manager 2205 may include a reference signal manager 2210, a victim-aggressor relationship manager 2215, a monitoring manager 2220, a database manager 2225, and a sequence manager 2230. Each of these modules may communicate, directly or indirectly, with one another (e.g., via one or more buses).

The reference signal manager 2210 may receive, from a first base station, a request to trigger reference signal monitoring by at least one remote base station. In some examples, the reference signal manager 2210 may transmit a reference signal request for triggering the at least one remote base station to transmit a reference signal transmission. In some examples, the reference signal manager 2210 may configure the first base station with a first identifier for transmission in a first reference signal transmission.

In some examples, the reference signal manager 2210 may configure the at least one remote base station with a second identifier for transmission in a second reference signal transmission. In some examples, the reference signal manager 2210 may configure the first base station to transmit a first reference signal transmission in first time and frequency resources. In some examples, the reference signal manager 2210 may configure the third base station to transmit a second reference signal transmission in second time and frequency resources. In some cases, the first time and frequency resources are distinct from the second time and frequency resources.

The victim-aggressor relationship manager 2215 may identify a previously detected victim-aggressor relationship between the first base station and the at least one remote base station. In some examples, the victim-aggressor relationship manager 2215 may receive, from the at least one remote base station or the first base station, a relationship update indicating information related to the previously detected victim-aggressor relationship. In some examples, the victim-aggressor relationship manager 2215 may identify a second previously detected victim-aggressor relationship between a third base station and the at least one remote base station. The monitoring manager 2220 may transmit a monitoring request instructing the at least one remote base station to perform reference signal monitoring.

The database manager 2225 may retrieve, from a database, an indication of the previously detected victim-aggressor relationship, where transmitting the monitoring request is based on the indication. In some examples, the database manager 2225 may update a database record related to the previously detected victim-aggressor relationship in a database based on the relationship update.

The sequence manager 2230 may allocate a first reference signal sequence to the first base station and a second reference signal sequence to the third base station based on the previously detected victim-aggressor relationship and the second previously detected victim-aggressor relationship.

Figure 23:
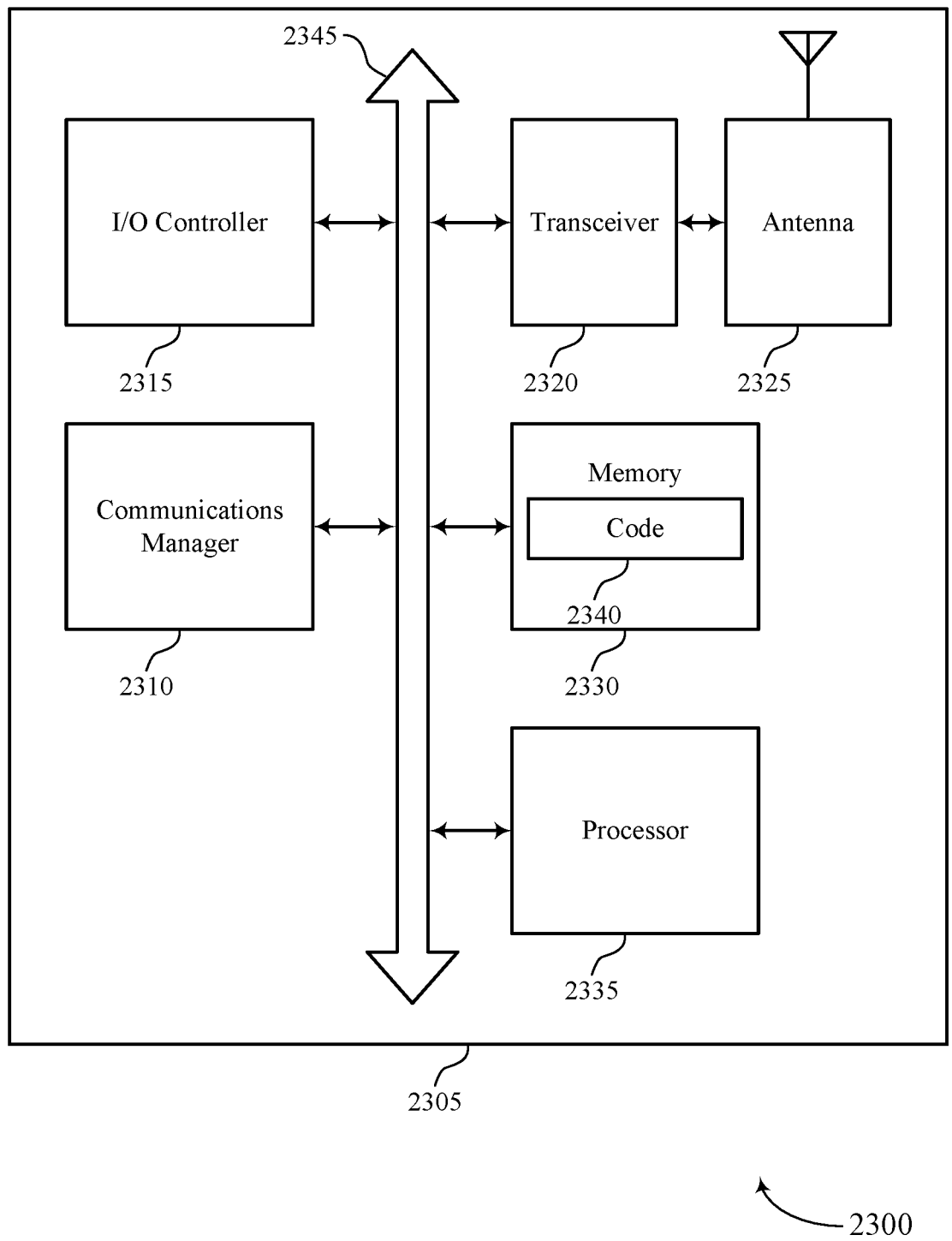
FIG. 23 shows a diagram of a system including a device that supports enhancement by victim-aggressor relationship in accordance with aspects of the present disclosure.

FIG. 23 shows a diagram of a system 2300 including a device 2305 that supports enhancement by aggressor victim relation in accordance with aspects of the present disclosure. The device 2305 may be an example of or include the components of device 2005, device 2105, or a network entity as described herein. The device 2305 may include components for bi-directional voice and data communications including components for transmitting and receiving communications, including a communications manager 2310, an I/O controller 2315, a transceiver 2320, an antenna 2325, memory 2330, and a processor 2335. These components may be in electronic communication via one or more buses (e.g., bus 2345).

The communications manager 2310 may receive, from a first base station, a request to trigger reference signal monitoring by at least one remote base station, identify a previously detected victim-aggressor relationship between the first base station and the at least one remote base station, and transmit a monitoring request instructing the at least one remote base station to perform reference signal monitoring.

The I/O controller 2315 may manage input and output signals for the device 2305. The I/O controller 2315 may also manage peripherals not integrated into the device 2305. In some cases, the I/O controller 2315 may represent a physical connection or port to an external peripheral. In some cases, the I/O controller 2315 may utilize an operating system such as iOS®, ANDROID®, MS-DOS®, MS-WINDOWS®, OS/2®, UNIX®, LINUX®, or another known operating system. In other cases, the I/O controller 2315 may represent or interact with a modem, a keyboard, a mouse, a touchscreen, or a similar device. In some cases, the I/O controller 2315 may be implemented as part of a processor. In some cases, a user may interact with the device 2305 via the I/O controller 2315 or via hardware components controlled by the I/O controller 2315.

The transceiver 2320 may communicate bi-directionally, via one or more antennas, wired, or wireless links as described above. For example, the transceiver 2320 may represent a wireless transceiver and may communicate bi-directionally with another wireless transceiver. The transceiver 2320 may also include a modem to modulate the packets and provide the modulated packets to the antennas for transmission, and to demodulate packets received from the antennas.

In some cases, the wireless device may include a single antenna 2325. However, in some cases the device may have more than one antenna 2325, which may be capable of concurrently transmitting or receiving multiple wireless transmissions.

The memory 2330 may include RAM and ROM. The memory 2330 may store computer-readable, computer-executable code 2340 including instructions that, when executed, cause the processor to perform various functions described herein. In some cases, the memory 2330 may contain, among other things, a BIOS which may control basic hardware or software operation such as the interaction with peripheral components or devices.

The processor 2335 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2335 may be configured to operate a memory array using a memory controller. In other cases, a memory controller may be integrated into the processor 2335. The processor 2335 may be configured to execute computer-readable instructions stored in a memory (e.g., the memory 2330) to cause the device 2305 to perform various functions (e.g., functions or tasks supporting enhancement by aggressor victim relation).

The code 2340 may include instructions to implement aspects of the present disclosure, including instructions to support wireless communications. The code 2340 may be stored in a non-transitory computer-readable medium such as system memory or other type of memory. In some cases, the code 2340 may not be directly executable by the processor 2335 but may cause a computer (e.g., when compiled and executed) to perform functions described herein.

Figure 24:
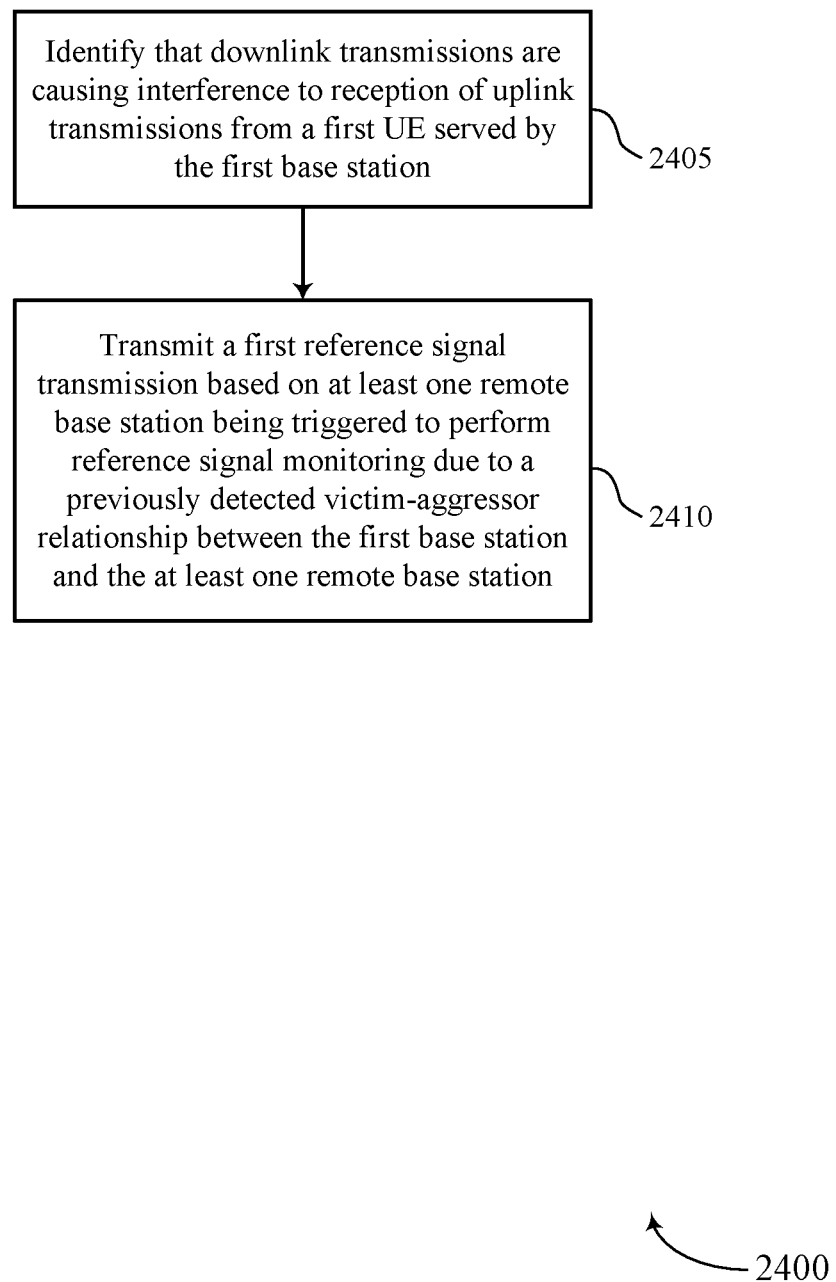
FIGS. 24 through 30 show flowcharts illustrating methods that support enhancement by victim-aggressor relationship in accordance with aspects of the present disclosure.

FIG. 24 shows a flowchart illustrating a method 2400 that supports enhancement by aggressor victim relation in accordance with aspects of the present disclosure. The operations of method 2400 may be implemented by a base station 105 or its components as described herein. For example, the operations of method 2400 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 2405, the base station may identify that downlink transmissions (e.g., from at least one other base station) are causing interference to reception of uplink transmissions from a first UE served by the first base station. The operations of 2405 may be performed according to the methods described herein. In some examples, aspects of the operations of 2405 may be performed by an interference identification manager as described with reference to FIGS. 16 through 19.

At 2410, the base station may transmit a first reference signal transmission based on at least one remote base station being triggered to perform reference signal monitoring due to a previously detected victim-aggressor relationship between the first base station and the at least one remote base station. The operations of 2415 may be performed according to the methods described herein. In some examples, aspects of the operations of 2415 may be performed by a reference signal manager as described with reference to FIGS. 16 through 19.

Figure 25:
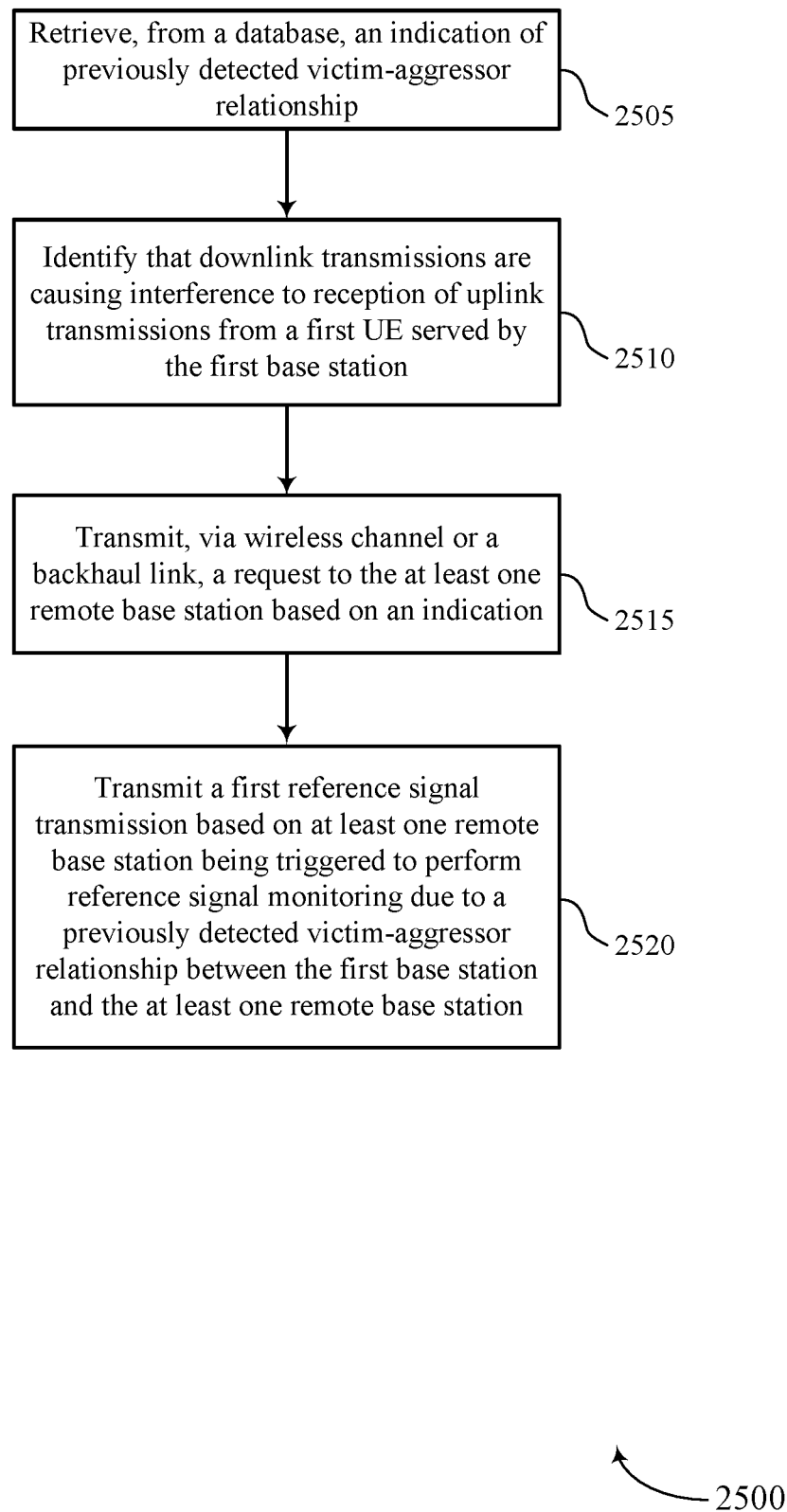

FIG. 25 shows a flowchart illustrating a method 2500 that supports enhancement by aggressor victim relation in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 2505, the base station may retrieve, from a database, an indication of previously detected victim-aggressor relationship. The operations of 2505 may be performed according to the methods described herein. In some examples, aspects of the operations of 2505 may be performed by a victim-aggressor relationship manager as described with reference to FIGS. 16 through 19.

At 2510, the base station may identify that downlink transmissions (e.g., from at least one other base station) are causing interference to reception of uplink transmissions from a first UE served by the first base station. The operations of 2510 may be performed according to the methods described herein. In some examples, aspects of the operations of 2510 may be performed by an interference identification manager as described with reference to FIGS. 16 through 19.

At 2515, the base station may transmit, via wireless channel or a backhaul link, a request to the at least one remote base station based on an indication. The operations of 2515 may be performed according to the methods described herein. In some examples, aspects of the operations of 2515 may be performed by a reference signal manager as described with reference to FIGS. 16 through 19.

At 2520, the base station may transmit a first reference signal transmission based on at least one remote base station being triggered to perform reference signal monitoring due to a previously detected victim-aggressor relationship between the first base station and the at least one remote base station. The operations of 2520 may be performed according to the methods described herein. In some examples, aspects of the operations of 2520 may be performed by a reference signal manager as described with reference to FIGS. 16 through 19.

Figure 26:
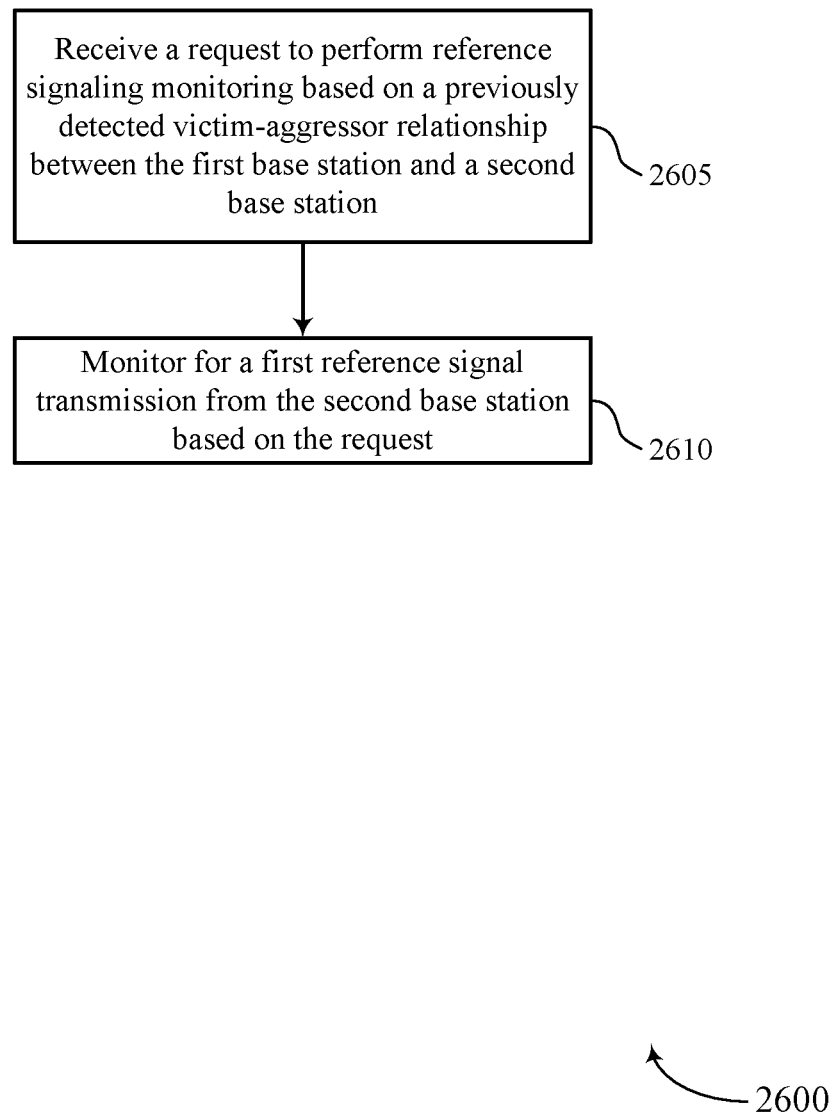

FIG. 26 shows a flowchart illustrating a method 2800 that supports enhancement by aggressor victim relation in accordance with aspects of the present disclosure. The operations of method 2800 may be implemented by a base station 105 or its components as described herein. For example, the operations of method 2800 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 2805, the base station may receive a request to perform reference signaling monitoring based on a previously detected victim-aggressor relationship between the first base station and a second base station. The operations of 2805 may be performed according to the methods described herein. In some examples, aspects of the operations of 2805 may be performed by a reference signal manager as described with reference to FIGS. 16 through 19.

At 2810, the base station may monitor for a first reference signal transmission from the second base station based on the request. The operations of 2810 may be performed according to the methods described herein. In some examples, aspects of the operations of 2810 may be performed by a monitoring manager as described with reference to FIGS. 16 through 19.

Figure 27:
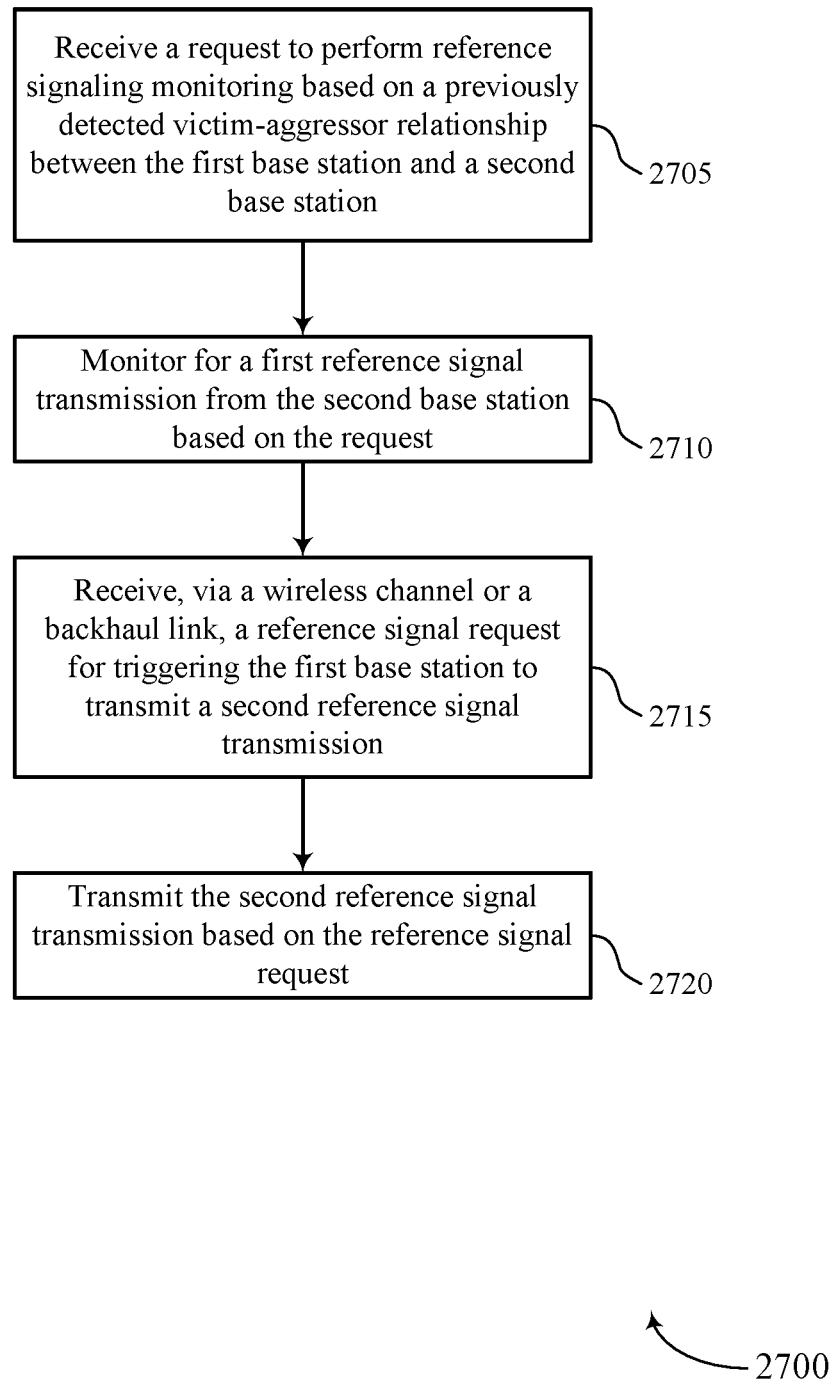

FIG. 27 shows a flowchart illustrating a method 2700 that supports enhancement by aggressor victim relation in accordance with aspects of the present disclosure. The operations of method 2700 may be implemented by a base station 105 or its components as described herein. For example, the operations of method 2700 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 2705, the base station may receive a request to perform reference signaling monitoring based on a previously detected victim-aggressor relationship between the first base station and a second base station. The operations of 2705 may be performed according to the methods described herein. In some examples, aspects of the operations of 2705 may be performed by a reference signal manager as described with reference to FIGS. 16 through 19.

At 2710, the base station may monitor for a first reference signal transmission from the second base station based on the request. The operations of 2710 may be performed according to the methods described herein. In some examples, aspects of the operations of 2710 may be performed by a monitoring manager as described with reference to FIGS. 16 through 19.

At 2715, the base station may receive, via a wireless channel or a backhaul link, a reference signal request for triggering the first base station to transmit a second reference signal transmission. The operations of 2715 may be performed according to the methods described herein. In some examples, aspects of the operations of 2715 may be performed by a reference signal manager as described with reference to FIGS. 16 through 19.

At 2720, the base station may transmit the second reference signal transmission based on the reference signal request. The operations of 2720 may be performed according to the methods described herein. In some examples, aspects of the operations of 2720 may be performed by a reference signal manager as described with reference to FIGS. 16 through 19.

Figure 28:
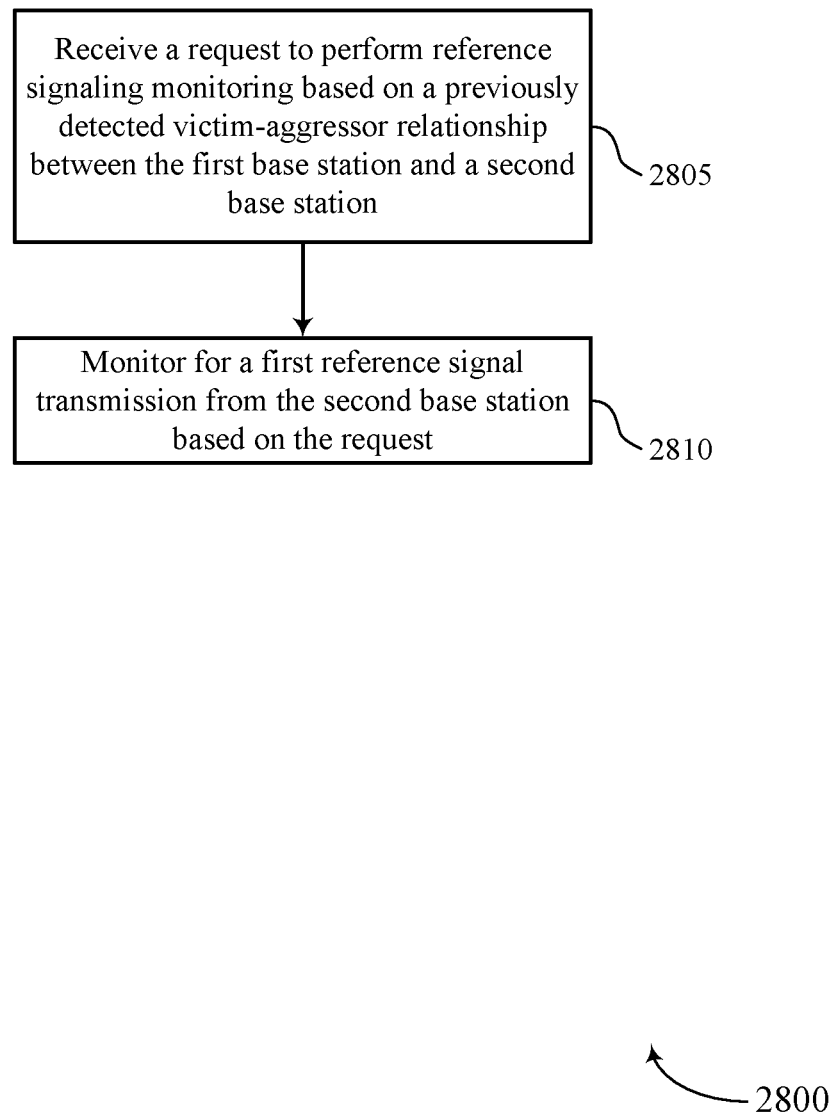

FIG. 28 shows a flowchart illustrating a method 2800 that supports enhancement by aggressor victim relation in accordance with aspects of the present disclosure. The operations of method 2800 may be implemented by a base station 105 or its components as described herein. For example, the operations of method 2800 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 2805, the base station may receive a request to perform reference signaling monitoring based on a previously detected victim-aggressor relationship between the first base station and a second base station. The operations of 2805 may be performed according to the methods described herein. In some examples, aspects of the operations of 2805 may be performed by a reference signal manager as described with reference to FIGS. 16 through 19.

At 2810, the base station may monitor for a first reference signal transmission from the second base station based on the request. The operations of 2810 may be performed according to the methods described herein. In some examples, aspects of the operations of 2810 may be performed by a monitoring manager as described with reference to FIGS. 16 through 19.

Figure 29:
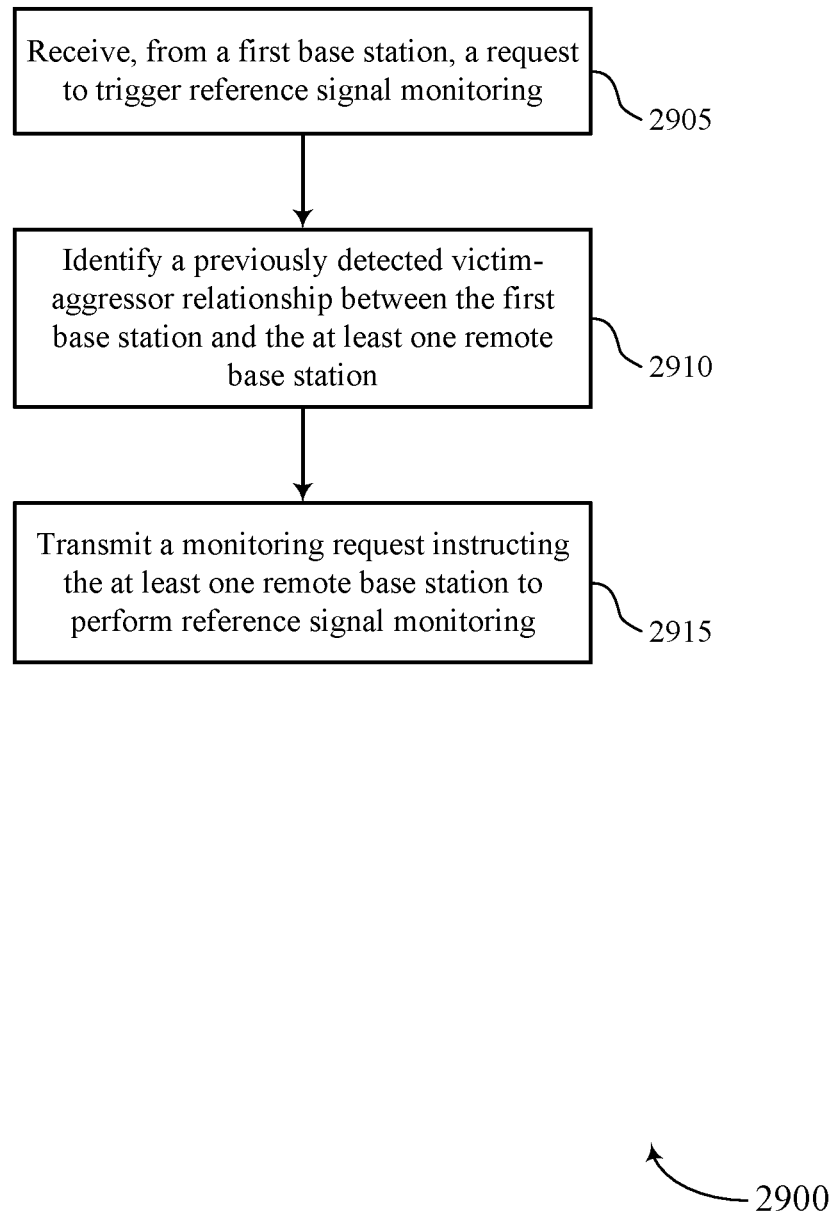

FIG. 29 shows a flowchart illustrating a method 2900 that supports enhancement by aggressor victim relation in accordance with aspects of the present disclosure. The operations of method 2900 may be implemented by a network entity or its components as described herein. For example, the operations of method 2900 may be performed by a communications manager as described with reference to FIGS. 20 through 23. In some examples, a network entity may execute a set of instructions to control the functional elements of the network entity to perform the functions described below. Additionally, or alternatively, a network entity may perform aspects of the functions described below using special-purpose hardware.

At 2905, the network entity may receive, from a first base station, a request to trigger reference signal monitoring by at least one remote base station. The operations of 2905 may be performed according to the methods described herein. In some examples, aspects of the operations of 2905 may be performed by a reference signal manager as described with reference to FIGS. 20 through 23.

At 2910, the network entity may identify a previously detected victim-aggressor relationship between the first base station and the at least one remote base station. The operations of 2910 may be performed according to the methods described herein. In some examples, aspects of the operations of 2910 may be performed by a victim-aggressor relationship manager as described with reference to FIGS. 20 through 23.

At 2915, the network entity may transmit a monitoring request instructing the at least one remote base station to perform reference signal monitoring. The operations of 2915 may be performed according to the methods described herein. In some examples, aspects of the operations of 2915 may be performed by a monitoring manager as described with reference to FIGS. 20 through 23.

Figure 30:
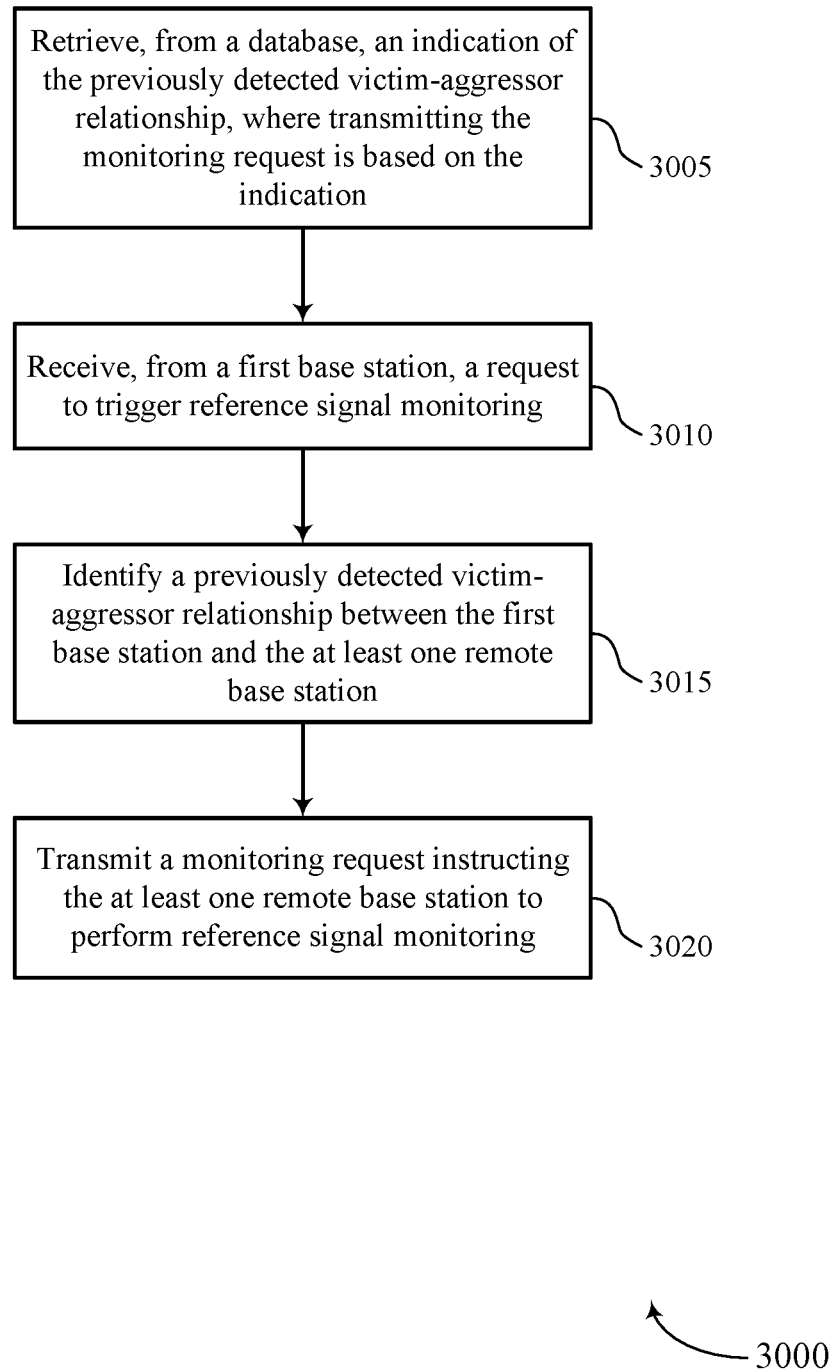

FIG. 30 shows a flowchart illustrating a method 3000 that supports enhancement by aggressor victim relation in accordance with aspects of the present disclosure. The operations of method 3000 may be implemented by a network entity or its components as described herein. For example, the operations of method 3000 may be performed by a communications manager as described with reference to FIGS. 20 through 23. In some examples, a network entity may execute a set of instructions to control the functional elements of the network entity to perform the functions described below. Additionally, or alternatively, a network entity may perform aspects of the functions described below using special-purpose hardware.

At 3005, the network entity may retrieve, from a database, an indication of the previously detected victim-aggressor relationship, where transmitting the monitoring request is based on the indication. The operations of 3005 may be performed according to the methods described herein. In some examples, aspects of the operations of 3005 may be performed by a database manager as described with reference to FIGS. 20 through 23.

At 3010, the network entity may receive, from a first base station, a request to trigger reference signal monitoring by at least one remote base station. The operations of 3010 may be performed according to the methods described herein. In some examples, aspects of the operations of 3010 may be performed by a reference signal manager as described with reference to FIGS. 20 through 23.

At 3015, the network entity may identify a previously detected victim-aggressor relationship between the first base station and the at least one remote base station. The operations of 3015 may be performed according to the methods described herein. In some examples, aspects of the operations of 3015 may be performed by a victim-aggressor relationship manager as described with reference to FIGS. 20 through 23.

At 3020, the network entity may transmit a monitoring request instructing the at least one remote base station to perform reference signal monitoring. The operations of 3020 may be performed according to the methods described herein. In some examples, aspects of the operations of 3020 may be performed by a monitoring manager as described with reference to FIGS. 20 through 23.

It should be noted that the methods described herein describe possible implementations, and that the operations and the steps may be rearranged or otherwise modified and that other implementations are possible. Further, aspects from two or more of the methods may be combined.

Aspects of the following embodiments may be combined with any of the previous embodiments or aspects described herein.

Embodiment 1: A method for wireless communications base station, comprising: identifying that downlink transmissions are causing interference to reception of uplink transmissions from a first UE served by the first base station and transmitting a first reference signal transmission based on at least one remote base station being triggered to perform reference signal monitoring due to a previously detected victim-aggressor relationship between the first base station and the at least one remote base station.

Embodiment 2: The method of embodiment 1, comprising: detecting an identifier assigned to the at least one remote base station based on receiving a second reference signal transmission from the at least one remote base station.

Embodiment 3: The method of embodiment 2, further comprising: determining a relationship update for information related to the previously detected victim-aggressor relationship based on the detected identifier, and updating a database record of the previously detected victim-aggressor relationship in a local database, a network controller database, or both, based on the relationship update. In some examples, the database may be a network controller database, and updating the database record may include sending report information associated with the detected reference signal to a network controller for updating the network controller database.

Embodiment 4: The method of any of embodiments 1 to 3, further comprising: receiving a second reference signal transmission that includes an identifier of a second remote base station of the at least one remote base station, classifying the second remote base station as having a first relation type to the first base station based on the identifier, and classifying the first base station as having a second relation type to the second remote base station based on the identifier.

Embodiment 5: The method of any of embodiments 1 to 4, further comprising: receiving a second reference signal transmission that includes an identifier of a second remote base station of the at least one remote base station, where the identifier may be unique to the first remote base station.

Embodiment 6: The method of any of embodiments 1 to 4, further comprising: receiving a second reference signal transmission that includes an identifier of a second remote base station of the at least one remote base station, where the identifier may be shared by a set of remote base stations.

Embodiment 7: The method of any of embodiments 1 to 6, further comprising: monitoring an interference power level, an interference pattern, or both, of a second reference signal transmission of a second remote base station of the at least one remote base station, and classifying the second remote base station as an aggressor based on the interference power level, the interference pattern, or both.

Embodiment 8: The method of any of embodiments 1 to 7, further comprising: retrieving, from a database, an indication of the previously detected victim-aggressor relationship, and transmitting, via wireless channel or a backhaul link, a request to the at least one remote base station based on an indication.

Embodiment 9: The method of any of embodiments 1 to 8, further comprising: transmitting, via a backhaul link, a request to a network controller for identifying the at least one remote base station based on the previously detected victim-aggressor relationship and for instructing the at least one remote base station to perform reference signal monitoring.

Embodiment 10: The method of any of embodiments 1 to 9, further comprising: receiving, from the at least one remote base station, a relationship update indicating information related to the previously detected victim-aggressor relationship, and updating a database record of the previously detected victim-aggressor relationship in a local database, a network controller database, or both, based on the relationship update.

Embodiment 11: The method of any of embodiments 1 to 10, further comprising: transmitting a reference signal request for triggering the at least one remote base station to transmit a second reference signal transmission.

Embodiment 12: The method of embodiment 11, further comprising: retrieving, from a database, an indication of the previously detected victim-aggressor relationship, and transmitting, via a wireless channel or a backhaul link, the reference signal request to the at least one remote base station based on the indication.

Embodiment 13: The method of any of embodiments 11 to 12, further comprising: transmitting, via a backhaul link, the reference signal request to a network controller for identifying the at least one remote base station based on the previously detected victim-aggressor relationship and for instructing the at least one remote base station to transmit the second reference signal transmission.

Embodiment 14: The method of any of embodiments 11 to 13, further comprising: monitoring for the second reference signal transmission based on the reference signal request, generating a measurement of an interference channel based on receiving the second reference signal transmission, and transmitting, via a backhaul link, the measurement to the at least one remote base station.

Embodiment 15: The method of any of embodiments 1 to 14, further comprising: receiving a second reference signal transmission that includes an identifier of a second remote base station of the at least one remote base station, and classifying the second remote base station as an aggressor to the first remote base station based on the identifier.

Embodiment 16: The method of embodiment 15, further comprising: classifying the first base station as an aggressor to the second remote base station based on the identifier.

Embodiment 17: The method of any of embodiments 15 to 16, further comprising: classifying the second remote base station as an aggressor to the first remote base station based on the identifier and a downlink transmission power of the second remote base station satisfying a threshold.

Embodiment 18: The method of any of embodiments 15 to 17, further comprising: classifying the second remote base station as an aggressor to the first remote base station based on the identifier and a number of remote base stations associated with the identifier.

Embodiment 19: The method of any of embodiments 1 to 18, further comprising: receiving a reference sequence configuration from a network controller, and transmitting the first reference signal transmission in accordance with the reference sequence configuration.

Embodiment 20: An apparatus comprising at least one means for performing a method of any of embodiments 1 to 19.

Embodiment 21: An apparatus for wireless communications comprising a processor; memory in electronic communication with the processor; and instructions stored in the memory and executable by the processor to cause the apparatus to perform a method of any of embodiments 1 to 19.

Embodiment 22: A non-transitory computer-readable medium storing code for wireless communications, the code comprising instructions executable by a processor to perform a method of any of embodiments 1 to 19.

Embodiment 23: A method of wireless communication by a first base station operating in a time division duplex (TDD) system, comprising: receiving a request to perform reference signaling monitoring based on a previously detected victim-aggressor relationship between the first base station and a second base station and monitoring for a first reference signal transmission from the second base station based on the request.

Embodiment 24: The method of embodiment 23, wherein monitoring for the first reference signal transmission further comprises: performing remote interference management based on detecting the first reference signal transmission.

Embodiment 25: The method of any of embodiments 23 to 24, further comprising: adjusting a priority in which the first base station monitors for the first reference signal transmission relative to a second reference signal transmission from a third base station based on the request.

Embodiment 26: The method of any of embodiments 23 to 25, wherein monitoring for the first reference signal transmission further comprises: adjusting a periodicity at which the first base station monitors for the first reference signal transmission based on the request.

Embodiment 27: The method of any of embodiments 23 to 26, wherein monitoring for the first reference signal transmission further comprises: adjusting a periodicity at which the first base station monitors for the first reference signal transmission based on failing to detect the first reference signal transmission within a defined amount of time.

Embodiment 28: The method of any of embodiments 23 to 27 wherein monitoring for the first reference signal transmission further may comprises: monitoring for the first reference signal transmission based on failing to detect the first reference signal transmission within a defined amount of time.

Embodiment 29: The method of any of embodiments 23 to 28, wherein receiving the request to perform reference signaling monitoring further may comprises: receiving the request from a user equipment served by the first base station, the request indicating that the user equipment detected the first reference signal transmission.

Embodiment 30: The method of any of embodiments 23 to 29, wherein receiving the request to perform reference signaling monitoring further comprises: receiving the request from the second base station via a wireless channel or a backhaul link.

Embodiment 31: The method of any of embodiments 23 to 30, wherein receiving the request to perform reference signaling monitoring further comprises: receiving the request from a network controller via a backhaul link.

Embodiment 32: The method of any of embodiments 23 to 31, further comprising: transmitting a relationship update indicating information related to the previously detected victim-aggressor relationship, and updating a database record related to the previously detected victim-aggressor relationship in a local database, a network controller database, or both, based on the relationship update.

Embodiment 33: The method of any of embodiments 23 to 32, further comprising: receiving, via a wireless channel or a backhaul link, a reference signal request for triggering the first base station to transmit a second reference signal transmission, and transmitting the second reference signal transmission based on the reference signal request.

Embodiment 34: The method of embodiment 33, further comprising: receiving interference channel information based on transmitting the second reference signal transmission, and performing remote interference management based on the interference channel information.

Embodiment 35: The method of any of embodiments 33 to 34, further comprising: the second reference signal transmission includes an identifier of the first base station.

Embodiment 36: The method of any of embodiments 33 to 35, further comprising: determining not to transmit a subsequent reference signal transmission based on determining that interference channel information may have not been received from the second base station within a defined amount of time.

Embodiment 37: The method of any of embodiments 23 to 36, further comprising: transmitting a second reference signal transmission that includes an identifier of the first base station.

Embodiment 38: The method of embodiment 37, wherein the identifier may be unique to the first remote base station.

Embodiment 39: The method of embodiment 37, wherein the identifier may be shared by a set of remote base stations.

Embodiment 40: The method of any of embodiments 37 to 39, further comprising: transmitting the second reference signal transmission further may include operations, features, means, or instructions for receiving a reference sequence configuration from a network controller, and transmitting the second reference signal transmission in accordance with the reference sequence configuration.

Embodiment 41: An apparatus comprising at least one means for performing a method of any of embodiments 23 to 40.

Embodiment 42: An apparatus for wireless communications comprising a processor; memory in electronic communication with the processor; and instructions stored in the memory and executable by the processor to cause the apparatus to perform a method of any of embodiments 23 to 40.

Embodiment 43: A non-transitory computer-readable medium storing code for wireless communications, the code comprising instructions executable by a processor to perform a method of any of embodiments 23 to 40.

Embodiment 44: A method of wireless communication by a network controller operating in a TDD system, comprising: receiving, from a first base station, a request to trigger reference signal monitoring by at least one remote base station, identifying a previously detected victim-aggressor relationship between the first base station and the at least one remote base station, and transmitting a monitoring request instructing the at least one remote base station to perform reference signal monitoring.

Embodiment 45: The method of embodiment 44, further comprising: configuring the first base station with a first identifier for transmission in a first reference signal transmission, and configuring the at least one remote base station with a second identifier for transmission in a second reference signal transmission.

Embodiment 46: The method of any of embodiments 44 to 45, further comprising: identifying the previously detected victim-aggressor relationship further may include operations, features, means, or instructions for retrieving, from a database, an indication of the previously detected victim-aggressor relationship, where transmitting the monitoring request may be based on the indication.

Embodiment 47: The method of any of embodiments 44 to 46, further comprising: receiving, from the at least one remote base station or the first base station, a relationship update indicating information related to the previously detected victim-aggressor relationship, and updating a database record related to the previously detected victim-aggressor relationship in a database based on the relationship update.

Embodiment 48: The method of any of embodiments 44 to 47, further comprising: transmitting a reference signal request for triggering the at least one remote base station to transmit a reference signal transmission.

Embodiment 49: The method of any of embodiments 44 to 48, further comprising: configuring the first base station with a first identifier for transmission in a first reference signal transmission, and configuring the at least one remote base station with a second identifier for transmission in a second reference signal transmission.

Embodiment 50: The method of any of embodiments 44 to 49, further comprising: identifying a second previously detected victim-aggressor relationship between a third base station and the at least one remote base station, and allocating a first reference signal sequence to the first base station and a second reference signal sequence to the third base station based on the previously detected victim-aggressor relationship and the second previously detected victim-aggressor relationship.

Embodiment 51: The method of embodiment 50, further comprising: configuring the first base station to transmit a first reference signal transmission in first time and frequency resources, and configuring the third base station to transmit a second reference signal transmission in second time and frequency resources.

Embodiment 52: The method of embodiment 51, wherein the first time and frequency resources may be distinct from the second time and frequency resources.

Embodiment 53: An apparatus comprising at least one means for performing a method of any of embodiments 44 to 52.

Embodiment 54: An apparatus for wireless communications comprising a processor; memory in electronic communication with the processor; and instructions stored in the memory and executable by the processor to cause the apparatus to perform a method of any of embodiments 44 to 52.

Embodiment 55: A non-transitory computer-readable medium storing code for wireless communications, the code comprising instructions executable by a processor to perform a method of any of embodiments 44 to 52.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first base station operating in a time division duplex (TDD) system, comprising:
   identifying that downlink transmissions from at least one other base station are causing interference to reception of uplink transmissions from a first user equipment (UE) served by the first base station; and
   transmitting a first reference signal transmission based at least in part on at least one remote base station being triggered to perform reference signal monitoring due to a previously detected victim-aggressor relationship between the first base station and the at least one remote base station.

2. The method of claim 1, further comprising:
   detecting an identifier assigned to the at least one remote base station based at least in part on receiving a second reference signal transmission from the at least one remote base station.

3. The method of claim 2, further comprising:
   determining a relationship update for information related to the previously detected victim-aggressor relationship based at least in part on the detected identifier; and
   updating a database record of the previously detected victim-aggressor relationship in a local database, a network controller database, or both, based at least in part on the relationship update.

4. The method of claim 3, wherein updating the database record comprises:
   sending report information associated with the detected reference signal to a network controller for updating the network controller database.

5. The method of claim 1, further comprising:
   receiving a second reference signal transmission that comprises an identifier of a second remote base station of the at least one remote base station;
   classifying the second remote base station as having a first relation type to the first base station based at least in part on the identifier; and
   classifying the first base station as having a second relation type to the second remote base station based at least in part on the identifier.

6. The method of claim 1, further comprising:
   receiving a second reference signal transmission that comprises an identifier of a second remote base station of the at least one remote base station, wherein the identifier is unique to the first remote base station.

7. The method of claim 1, further comprising:
   receiving a second reference signal transmission that comprises an identifier of a second remote base station of the at least one remote base station, wherein the identifier is shared by a plurality of remote base stations.

8. The method of claim 1, further comprising:
   monitoring an interference power level, an interference pattern, or both, of a second reference signal transmission of a second remote base station of the at least one remote base station; and
   classifying the second remote base station as an aggressor based at least in part on the interference power level, the interference pattern, or both.

9. The method of claim 1, wherein triggering the at least one remote base station to perform reference signal monitoring further comprises:
   retrieving, from a database, an indication of the previously detected victim-aggressor relationship; and
   transmitting, via wireless channel or a backhaul link, a request to the at least one remote base station based at least in part on an indication.

10. The method of claim 1, wherein triggering the at least one remote base station to perform reference signal monitoring further comprises:
    transmitting, via a backhaul link, a request to a network controller for identifying the at least one remote base station based at least in part on the previously detected victim-aggressor relationship and for instructing the at least one remote base station to perform reference signal monitoring.

11. The method of claim 1, further comprising:
    receiving, from the at least one remote base station, a relationship update indicating information related to the previously detected victim-aggressor relationship; and
    updating a database record of the previously detected victim-aggressor relationship in a local database, a network controller database, or both, based at least in part on the relationship update.

12. The method of claim 1, further comprising:
    transmitting a reference signal request for triggering the at least one remote base station to transmit a second reference signal transmission.

13. The method of claim 12, wherein transmitting the reference signal request further comprises:
    retrieving, from a database, an indication of the previously detected victim-aggressor relationship; and
    transmitting, via a wireless channel or a backhaul link, the reference signal request to the at least one remote base station based at least in part on the indication.

14. The method of claim 12, wherein transmitting the reference signal request further comprises:
    transmitting, via a backhaul link, the reference signal request to a network controller for identifying the at least one remote base station based at least in part on the previously detected victim-aggressor relationship and for instructing the at least one remote base station to transmit the second reference signal transmission.

15. The method of claim 12, further comprising:
    monitoring for the second reference signal transmission based at least in part on the reference signal request;
    generating a measurement of an interference channel based at least in part on receiving the second reference signal transmission; and
    transmitting, via a backhaul link, the measurement to the at least one remote base station.

16. The method of claim 1, further comprising:
    receiving a second reference signal transmission that comprises an identifier of a second remote base station of the at least one remote base station; and classifying the second remote base station as an aggressor to the first remote base station based at least in part on the identifier.

17. The method of claim 16, further comprising:
classifying the first base station as an aggressor to the second remote base station based at least in part on the identifier.

18. The method of claim 16, wherein classifying the second remote base station further comprises:
classifying the second remote base station as an aggressor to the first remote base station based at least in part on the identifier and a downlink transmission power of the second remote base station satisfying a threshold.

19. The method of claim 16, wherein classifying the second remote base station further comprises:
classifying the second remote base station as an aggressor to the first remote base station based at least in part on the identifier and a number of remote base stations associated with the identifier.

20. The method of claim 1, wherein transmitting the first reference signal transmission further comprises:
receiving a reference sequence configuration from a network controller; and
transmitting the first reference signal transmission in accordance with the reference sequence configuration.

21. A method for wireless communication by a first base station operating in a time division duplex (TDD) system, comprising:
receiving a request to perform reference signaling monitoring based at least in part on a previously detected victim-aggressor relationship between the first base station and a second base station; and
monitoring for a first reference signal transmission from the second base station based at least in part on the request.

22. The method of claim 21, further comprising:
transmitting a relationship update indicating information related to the previously detected victim-aggressor relationship; and
updating a database record related to the previously detected victim-aggressor relationship in a local database, a network controller database, or both, based at least in part on the relationship update.

23. The method of claim 21, further comprising:
receiving, via a wireless channel or a backhaul link, a reference signal request for triggering the first base station to transmit a second reference signal transmission; and
transmitting the second reference signal transmission based at least in part on the reference signal request.

24. The method of claim 23, wherein the second reference signal transmission comprises an identifier of the first base station.

25. The method of claim 21, further comprising:
transmitting a second reference signal transmission that comprises an identifier of the first base station.

26. The method of claim 23, wherein the identifier is unique to the first remote base station.

27. A method for wireless communication by a network controller operating in a time division duplex (TDD) system, comprising:
receiving, from a first base station, a request to trigger reference signal monitoring by at least one remote base station;
identifying a previously detected victim-aggressor relationship between the first base station and the at least one remote base station; and
transmitting a monitoring request instructing the at least one remote base station to perform reference signal monitoring.

28. The method of claim 27, further comprising:
configuring the first base station with a first identifier for transmission in a first reference signal transmission; and
configuring the at least one remote base station with a second identifier for transmission in a second reference signal transmission.

29. The method of claim 27, further comprising:
receiving, from the at least one remote base station or the first base station, a relationship update indicating information related to the previously detected victim-aggressor relationship; and
updating a database record related to the previously detected victim-aggressor relationship in a database based at least in part on the relationship update.

30. An apparatus for wireless communication by a first base station operating in a time division duplex (TDD) system, comprising:
a processor,
memory in electronic communication with the processor; and
instructions stored in the memory and executable by the processor to cause the apparatus to:
identify that downlink transmissions from at least one other base station are causing interference to reception of uplink transmissions from a first user equipment (UE) served by the first base station; and
transmit a first reference signal transmission based at least in part on at least one remote base station being triggered to perform reference signal monitoring due to a previously detected victim-aggressor relationship between the first base station and the at least one remote base station.

* * * * *